US012565439B2

(12) United States Patent
Dittmann et al.

(10) Patent No.: US 12,565,439 B2
(45) Date of Patent: Mar. 3, 2026

(54) METHOD FOR PRODUCING AN OPTICAL ELEMENT OF GLASS

(71) Applicant: Docter Optics SE, Neustadt an der Orla (DE)

(72) Inventors: Christoph Dittmann, Neustadt an der Orla (DE); Annegret Diatta, Neustadt an der Orla (DE); Alexander Kuppe, Neustadt an der Orla (DE); Ralf Polle, Neustadt an der Orla (DE); Toni Schnoor, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 271 days.

(21) Appl. No.: 18/339,359

(22) Filed: Jun. 22, 2023

(65) Prior Publication Data

US 2023/0416133 A1     Dec. 28, 2023

(30) Foreign Application Priority Data

Jun. 23, 2022    (DE) .......................... 102022115725.3

(51) Int. Cl.
C03B 11/00 (2006.01)

(52) U.S. Cl.
CPC ........ C03B 11/005 (2013.01); C03B 2215/66 (2013.01)

(58) Field of Classification Search
CPC .......... F21S 41/20–295; C03B 11/005; C03B 2215/66
See application file for complete search history.

(56) References Cited

U.S. PATENT DOCUMENTS

| | | | | |
|---|---|---|---|---|
| 821,610 | A | | 5/1906 | Cox |
| 3,116,991 | A | * | 1/1964 | Le Clere ............... C03C 21/006 |
| | | | | 216/99 |
| 4,666,496 | A | | 5/1987 | Fecik |
| 4,756,737 | A | | 7/1988 | Yoshimura et al. |
| 4,904,293 | A | * | 2/1990 | Garnier ................. C03C 21/007 |
| | | | | 65/22 |
| 5,120,343 | A | | 6/1992 | Monji et al. |
| 5,227,917 | A | | 7/1993 | Kubo et al. |

(Continued)

FOREIGN PATENT DOCUMENTS

| | | |
|---|---|---|
| CN | 205049796 | 2/2016 |
| CN | 105819674 | 8/2016 |

(Continued)

OTHER PUBLICATIONS

JP-H06279063-A (Mizutani) Oct. 4, 1994 (English language translation). [online] [retrieved Jul. 21, 2025]. Retrieved from: Clarivate Analytics. (Year: 1994).*

(Continued)

*Primary Examiner* — Erin Snelting
(74) *Attorney, Agent, or Firm* — Carter, DeLuca & Farrell LLP

(57) ABSTRACT

The disclosure relates to a method for producing an optical element (202), wherein a blank of transparent material is heated and/or provided and, after heating and/or after being provided between a first mold (UF) and at least one second mold (OF), is press molded, for example on both sides, to form the optical element (202) and is then exposed to a treatment atmosphere.

24 Claims, 39 Drawing Sheets

(56) References Cited

U.S. PATENT DOCUMENTS

| | | | |
|---|---|---|---|
| 6,055,828 A * | 5/2000 | Rivera | C03C 23/006 |
| | | | 427/532 |
| 6,114,039 A | 9/2000 | Rifqi | |
| 6,130,777 A | 10/2000 | Yamashita et al. | |
| 6,638,450 B2 | 10/2003 | Richard | |
| 7,798,688 B2 | 9/2010 | Hamkens | |
| 8,998,435 B2 | 4/2015 | Brick | |
| 2001/0033726 A1 | 10/2001 | Shie et al. | |
| 2002/0153624 A1 | 10/2002 | Tumlin et al. | |
| 2003/0001301 A1 | 1/2003 | Duroux et al. | |
| 2004/0244421 A1 | 12/2004 | Kato et al. | |
| 2005/0054514 A1 | 3/2005 | Ishioka et al. | |
| 2006/0072208 A1 | 4/2006 | Bonitz et al. | |
| 2008/0315162 A1 | 12/2008 | Berzon | |
| 2009/0000336 A1 | 1/2009 | Rosler | |
| 2009/0029117 A1 | 1/2009 | Aoi et al. | |
| 2009/0323502 A1 | 12/2009 | Murata et al. | |
| 2010/0246008 A1 | 9/2010 | Murata et al. | |
| 2011/0266576 A1 | 11/2011 | Engl et al. | |
| 2012/0040044 A1 | 2/2012 | Uehira et al. | |
| 2013/0221551 A1 | 8/2013 | Genda | |
| 2013/0239619 A1 | 9/2013 | Wintzer et al. | |
| 2013/0242590 A1 | 9/2013 | Fedosik et al. | |
| 2013/0250595 A1 | 9/2013 | Fedosik et al. | |
| 2013/0250596 A1 | 9/2013 | Fedosik et al. | |
| 2013/0250597 A1 | 9/2013 | Fedosik et al. | |
| 2013/0258694 A1 | 10/2013 | Fedosik et al. | |
| 2014/0033767 A1 | 2/2014 | Wintzer et al. | |
| 2014/0042650 A1 | 2/2014 | Muhle et al. | |
| 2014/0286032 A1 | 9/2014 | Fedosik et al. | |
| 2014/0332991 A1 | 11/2014 | Giessauf et al. | |
| 2014/0347876 A1 | 11/2014 | Fedosik et al. | |
| 2015/0036976 A1 | 2/2015 | Wintzer et al. | |
| 2015/0109810 A1 | 4/2015 | Wintzer et al. | |
| 2015/0124472 A1 | 5/2015 | Wintzer et al. | |
| 2015/0224723 A1 | 8/2015 | Hamkens | |
| 2015/0292701 A1 | 10/2015 | Wintzer et al. | |
| 2015/0300587 A1 | 10/2015 | Scheibner et al. | |
| 2015/0330590 A1 | 11/2015 | Wintzer et al. | |
| 2015/0369436 A1 | 12/2015 | Wintzer et al. | |
| 2016/0082679 A1 | 3/2016 | Kikuchi | |
| 2017/0327402 A1 | 11/2017 | Makoto | |
| 2018/0251395 A1 | 9/2018 | Akiba et al. | |
| 2018/0283639 A1 | 10/2018 | Tessmer et al. | |
| 2018/0328558 A1 | 11/2018 | Okubo | |
| 2019/0041656 A1 | 2/2019 | Iwata | |
| 2019/0331310 A1 | 10/2019 | Wintzer et al. | |
| 2020/0195823 A1 | 6/2020 | Furutake | |
| 2021/0130738 A1 | 5/2021 | Rougemont | |
| 2022/0177345 A1 | 6/2022 | Dittmann et al. | |
| 2022/0289612 A1 | 9/2022 | Diatta et al. | |
| 2022/0298050 A1 | 9/2022 | Kuppe et al. | |
| 2022/0373151 A1 | 11/2022 | Zhang et al. | |
| 2023/0016184 A1 * | 1/2023 | Etchepare | C03C 23/00 |

FOREIGN PATENT DOCUMENTS

| | | | | | |
|---|---|---|---|---|---|
| DE | 1 099 964 | | 2/1961 | | |
| DE | 2906858 | | 9/1980 | | |
| DE | 36 02 262 | | 5/1987 | | |
| DE | 299 14 114 | | 11/1999 | | |
| DE | 69701714 | | 5/2000 | | |
| DE | 102 26 471 | | 1/2004 | | |
| DE | 10 2005 009 556 | | 9/2005 | | |
| DE | 10116139 | B4 | 4/2006 | | |
| DE | 102006034431 | A1 | 1/2008 | | |
| DE | 102008054029 | | 5/2010 | | |
| DE | 10100515 | B4 | 12/2010 | | |
| DE | 102011114636 | A1 | 4/2013 | | |
| DE | 10 2012 205 196 | | 10/2013 | | |
| DE | 20 2014 100462 | | 3/2014 | | |
| DE | 10 2015 001609 | | 8/2016 | | |
| DE | 10 2015 007 832 | | 12/2016 | | |
| DE | 102016102408 | A1 | 6/2017 | | |
| DE | 10 2017 105 888 | | 9/2018 | | |
| DE | 10 2015 012 324 | | 6/2019 | | |
| DE | 10 2008 034153 | | 8/2019 | | |
| DE | 10 2020 115078 | | 1/2021 | | |
| DE | 102021130715 | A1 | 6/2022 | | |
| DE | 102021105560 | A1 | 9/2022 | | |
| EP | 1954642 | B1 | 4/2009 | | |
| EP | 2402140 | | 1/2012 | | |
| EP | 2666620 | | 11/2013 | | |
| EP | 3312501 | | 4/2018 | | |
| EP | 3520983 | | 8/2019 | | |
| EP | 3575362 | | 12/2019 | | |
| JP | 01072822 | | 3/1989 | | |
| JP | H06166526 | | 6/1994 | | |
| JP | H06-286754 | | 10/1994 | | |
| JP | H06279063 | A * | 10/1994 | | C03C 23/008 |
| JP | H07330347 | A | 12/1995 | | |
| JP | 2002160256 | | 6/2002 | | |
| JP | 2003048728 | A | 2/2003 | | |
| JP | 2003246630 | | 9/2003 | | |
| JP | 2004009379 | | 1/2004 | | |
| JP | 2006062359 | | 3/2006 | | |
| JP | 4400798 | | 1/2010 | | |
| JP | 2010046895 | | 3/2010 | | |
| JP | 2018118900 | | 8/2019 | | |
| JP | 2019135202 | | 8/2019 | | |
| KR | 20160028901 | | 3/2016 | | |
| KR | 101971276 | | 4/2019 | | |
| WO | 2004/096724 | | 11/2004 | | |
| WO | 2009/036739 | | 3/2009 | | |
| WO | 2009/109209 | | 9/2009 | | |
| WO | 2012/072192 | | 6/2012 | | |
| WO | 2012072187 | A2 | 6/2012 | | |
| WO | 2012072188 | A1 | 6/2012 | | |
| WO | 2012072189 | A2 | 6/2012 | | |
| WO | 2012072190 | A2 | 6/2012 | | |
| WO | 2012072191 | A2 | 6/2012 | | |
| WO | 2012072192 | A1 | 6/2012 | | |
| WO | 2012072193 | A2 | 6/2012 | | |
| WO | 2012130352 | A1 | 10/2012 | | |
| WO | 2013068053 | A1 | 5/2013 | | |
| WO | 2013068063 | A1 | 5/2013 | | |
| WO | 2013123954 | A1 | 8/2013 | | |
| WO | 2013135259 | A1 | 9/2013 | | |
| WO | 2013159847 | A1 | 10/2013 | | |
| WO | 2013170923 | A1 | 11/2013 | | |
| WO | 2013178311 | A1 | 12/2013 | | |
| WO | 2014072003 | A1 | 5/2014 | | |
| WO | 2014114307 | A1 | 7/2014 | | |
| WO | 2014114308 | A1 | 7/2014 | | |
| WO | 2014114309 | A1 | 7/2014 | | |
| WO | 2014131426 | A1 | 9/2014 | | |
| WO | 2014/161014 | | 10/2014 | | |
| WO | 2017059945 | A1 | 4/2017 | | |
| WO | 2017/207079 | | 12/2017 | | |
| WO | 2017215775 | A1 | 12/2017 | | |
| WO | 2019/072326 | | 4/2019 | | |
| WO | 2019/179571 | | 9/2019 | | |
| WO | 2019243343 | A1 | 12/2019 | | |
| WO | 2021/008657 | | 1/2021 | | |
| WO | 2021008647 | | 1/2021 | | |
| WO | 2021008647 | A1 | 1/2021 | | |

OTHER PUBLICATIONS

Audi Matrix LED-Scheinwerfer, https://web.archive.org/web20150109234745/http://audi.de/content/de/brand/de/vorsprung_durch_technik/content/2013/08/Audi-A8, Jun. 28, 2022, 3 pages.

Wiley, Bosch Automotive Handbook, 9th Edition, Robert Bosch, GmbH, Sep. 2014, p. 1040, 3 pages.

AL&S World, Digital Light: Millions of Pixels on the Road, https://www.rt.ai.world/en/news/article/digital-light-millions-of-pixels-on-the-road/, Oct. 31, 2018, 11 pages.

Schafer, Patrick "Hella bringt neues SSL-HD-Matrix Lichtsystem auf den Markt", Sep. 18, 2019, Springer Professional, 3 pages.

Authors' Collective, "Glass Technology", Glastechnik, Leipzig 1972, 12 pages.

(56)                    References Cited

OTHER PUBLICATIONS

Vollmer, Alfred, "Matrix-LED-und Laserlicht bietet viele Vorteile", all-electronics, https://www.all-electronics.de/automotive-transportation/matrix-led-under-laserlicht-bietet-viele-vorteile.html, Apr. 15, 2014, 12 pages.

Hella, Unser Digital Light SSL/HD-Lichtsystem: ein neuer Meilenstein der automobilen Lichttechnik, https://www.hella.com/techworld/de/Lounge/Unser-Digital-Light-SSL-HD-Lichtsystem-ein-neuer-Meilenstein-der-automobilen-Lichttechnik, Nov. 26, 2019, 11 pages.

Veb Jena Glaswerk Schott & Gen, "Structure and Nature of Glass", 1st Edition, Sep. 1, 1974, 3 pages.

International Preliminary Report on Patentability Issued Sep. 22, 2020 in PCT/DE2019/100249.

International Search Report and Written Opinion Issued May 20, 2019 for PCT/DE2019/100249.

German OA Issued Jul. 13, 2021 in DE 10 2020 127 638.9.

International Preliminary Report on Patentability Issued Jan. 18, 2022 in PCT/DE2020/10478.

International Search Report and Written Opinion Issued Sep. 16, 2020 for PCT/DE2020/100478.

German OA Issued Mar. 20, 2020 in DE 10 2019 119 040.1.

German OA Issued Feb. 19, 2020 in DE 10 2019 119 042.8.

International Preliminary Report on Patentability Issued Jan. 18, 2022 in PCT/DE2020/100609.

International Search Report and Written Opinion Issued Oct. 16, 2020 for PCT/DE2020/100609.

International Search Report and Written Opinion Issued Apr. 8, 2021 for PCT/DE2020/101007.

International Preliminary Report on Patentability Issued May 17, 2022 for PCT/DE2020/101007.

Search Report Issued Nov. 22, 2021 for DE 10 2021 105 560.1.

International Preliminary Report on Patentability Issued Apr. 12, 2022 for PCT/DE2020/100860.

International Search Report Issued Jan. 26, 2021 for PCT/DE2020/100860.

International Search Report and Written Opinion Issued May 6, 2021 for PCT/DE2021/100035.

International Preliminary Report on Patentability Issued Jul. 19, 2022 in PCT/DE2021/100035.

International Search Report and Written Opinion Issued May 25, 2021 for PCT/DE2021/100136.

International Preliminary Report on Patentability Issued in Corresponding PCT Application No. PCT/DE2021/100136 Dated Aug. 23, 2022.

International Search Report and Written Opinion Issued on Feb. 4, 2022 for PCT/DE2021/100840.

International Search Report and Written Opinion Issued Feb. 1, 2022 for Corresponding PCT Application No. PCT/DE2021/100858.

Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.

Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.

Von Alfred Vollmer, "Matrix-LED- und Laserlicht bietet viele Vorteile", https://www.all-electronics.de/automotive-transportation/matrix-led-und-laserlicht-bietet-viele-vorteile.html, Apr. 15, 2014.

SSL|HD: hochintegriertes HD-LED-Lichtsystem von Hella, https://www.highlight-web.de/5874/hella-ssl-hd/, Sep. 13, 2019.

Hopmann, Christian et al., "Technologie des Spritzgießens" Lern- und Arbeitsbuch, 2017, pp. 19, 29, 57-59, 64-70.

International Preliminary Report on Patentability Issued May 8, 2023 for PCT/DE2021/100858.

* cited by examiner

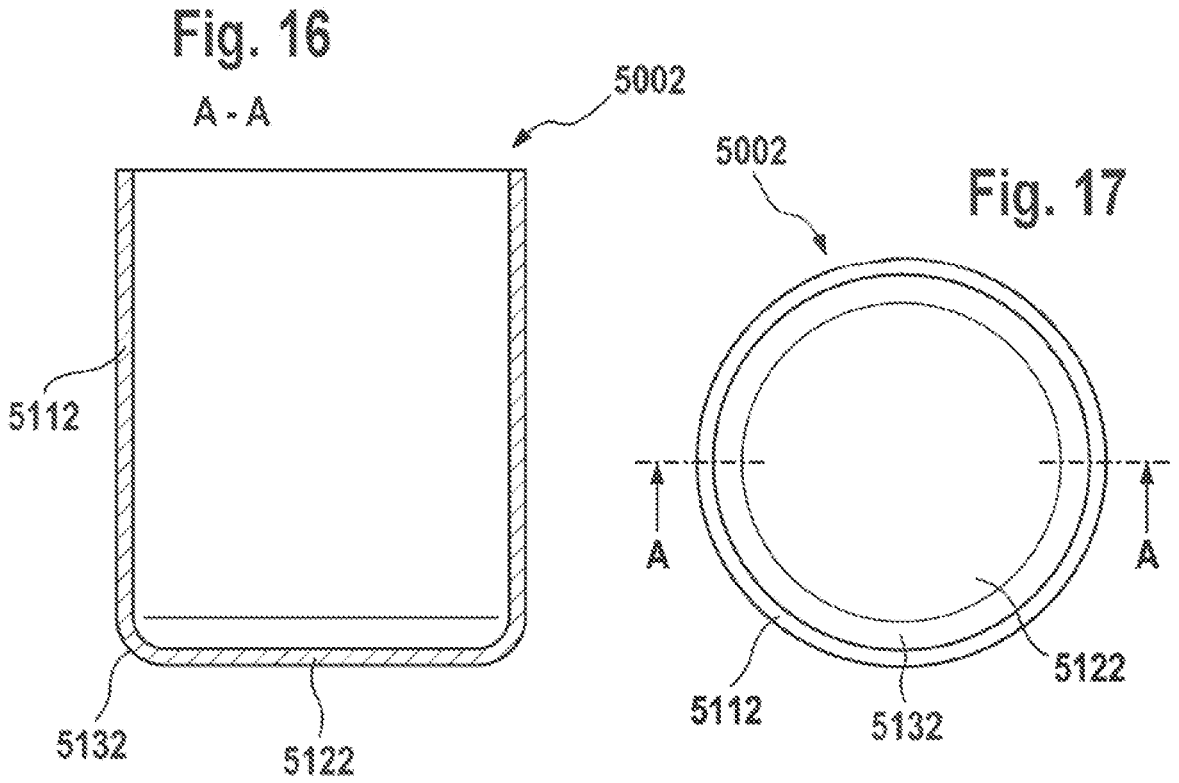
Fig. 16
A - A
Fig. 17
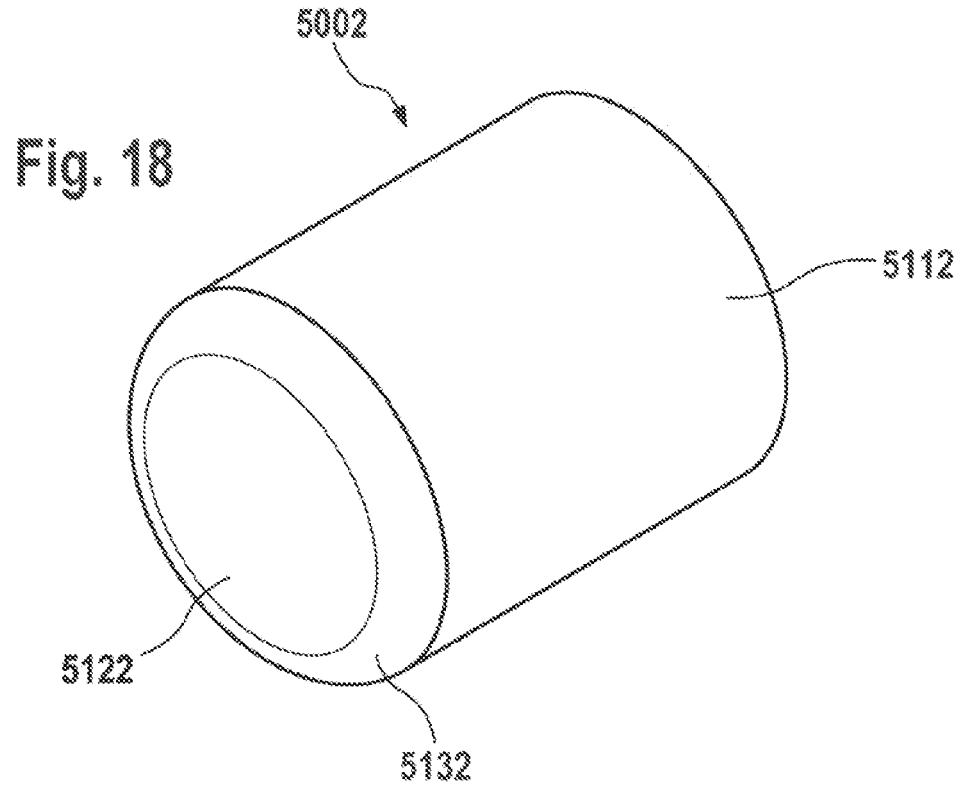
Fig. 18

Figure 33:
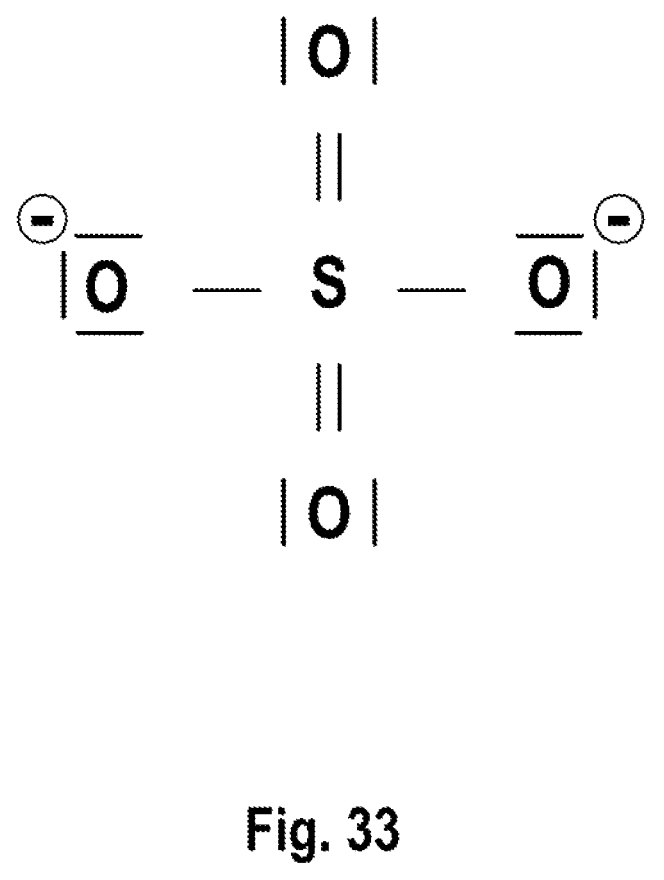

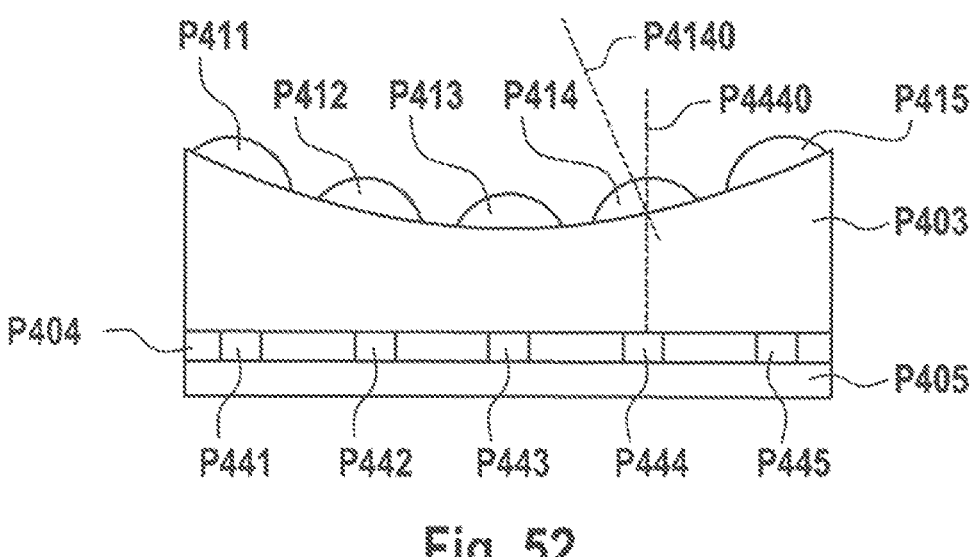
Fig. 52
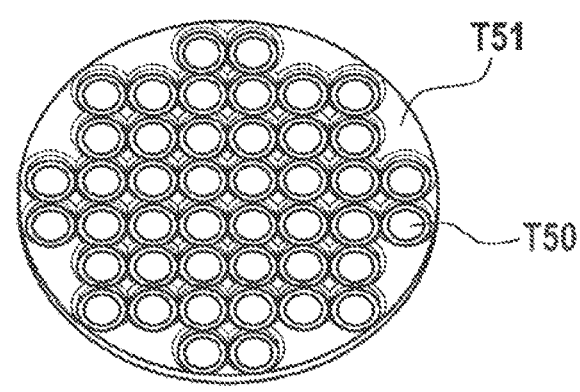
Fig. 53
Fig. 54

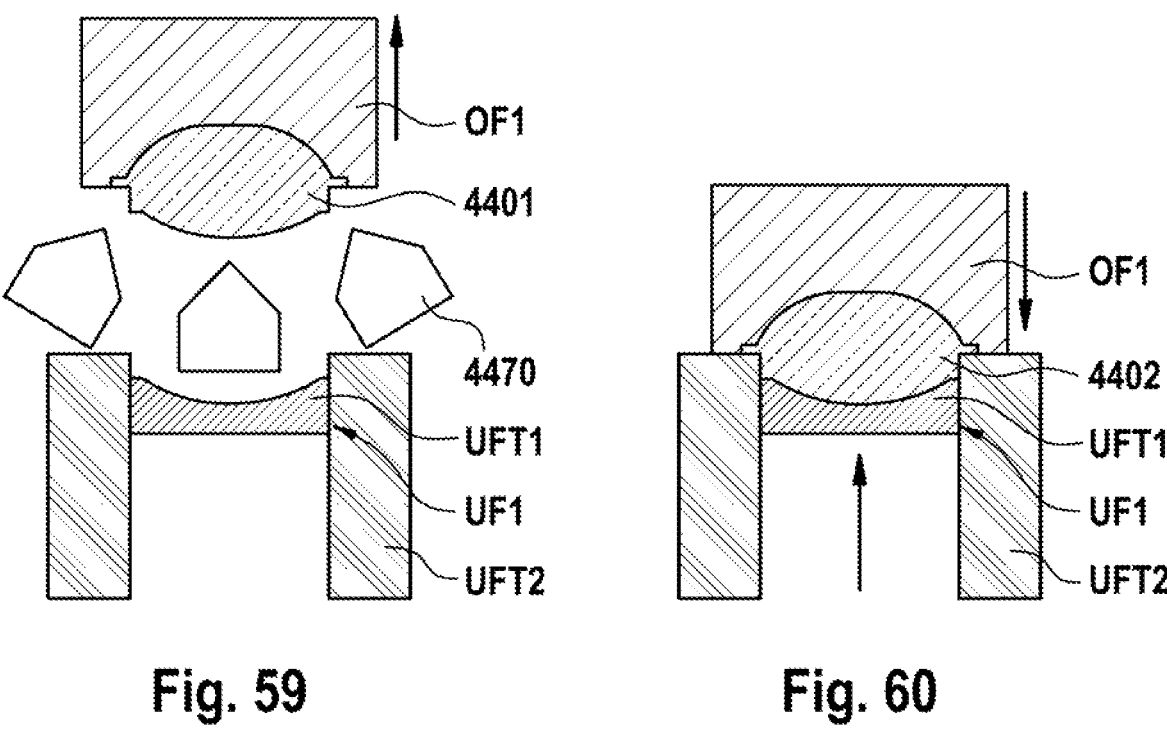
Fig. 59
Fig. 60
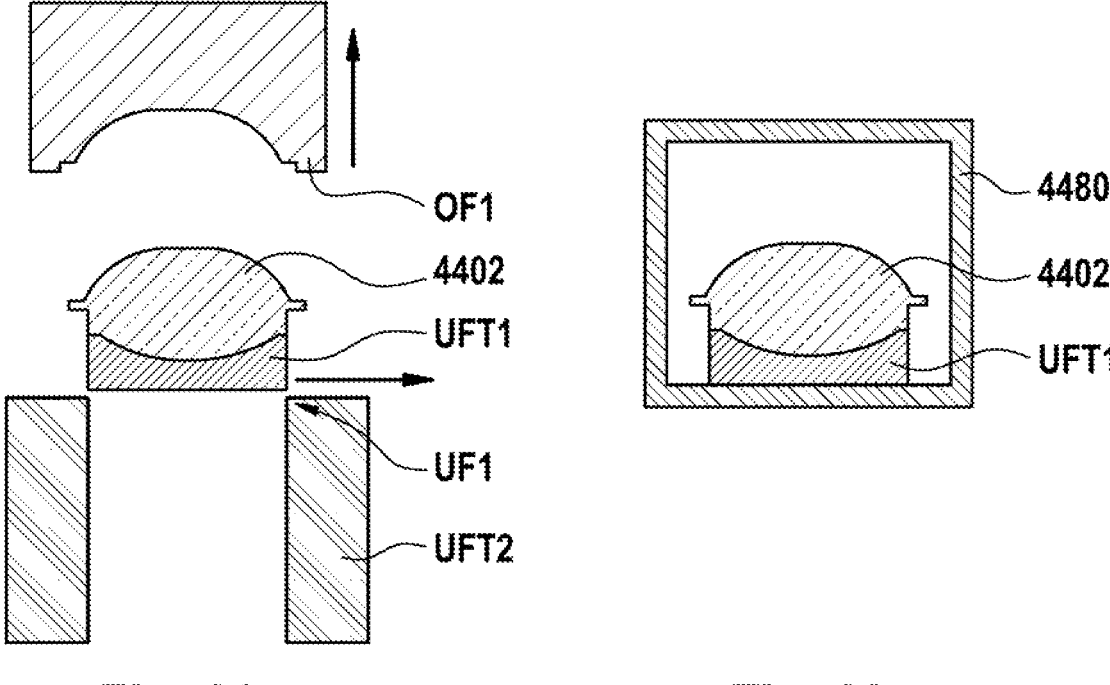
Fig. 61
Fig. 62

METHOD FOR PRODUCING AN OPTICAL ELEMENT OF GLASS

PRIORITY CLAIM

This application claims priority of the German patent application DE 10 2022 115 725.3 filed on Jun. 23, 2022, which is explicitly incorporated herein by reference in its entirety.

FIELD OF THE DISCLOSURE

The disclosure relates to a method for producing an optical element of glass, wherein a blank of transparent material is heated and/or provided and, after heating and/or after being provided between a first mold and at least one second mold is press molded, for example on both sides, to form the optical element.

BACKGROUND

Such a process is disclosed, for example, in WO 2021/008647 A1.

In addition to demands for particularly precise optical properties, the desire has manifested itself to press headlight lenses from borosilicate glass or glass systems similar to borosilicate glass in order to achieve increased weather resistance or hydrolytic resistance (chemical resistance). Standards or assessment methods regarding hydrolytic resistance (chemical resistance) are for example Hella Normtest N67057 and climatic test/humidity frost test. High hydrolytic resistance is also classified as Type 1, for example. In light of the requirement for borosilicate glass headlight lenses with corresponding hydrolytic resistance, the desire arises of pressing headlight lenses made of borosilicate glass or similar glass systems with the same hydrolytic resistance (chemical resistance). In departure from this desire, an alternative process is proposed for manufacturing an optical element or headlight lens from glass, for example from alkali-containing silicate-based glass systems or from soda-lime glass, in which a surface of the headlight lens is treated. In order to ensure precise optical properties, it is desirable to achieve a particular contour accuracy with simultaneous surface quality, i.e. low roughness Ra.

SUMMARY OF THE DISCLOSURE

The disclosure relates to a method of manufacturing an optical element or a headlight lens, wherein it is provided, inter alia, that a blank of glass, for example of alkali-containing silicate-based glass systems or of soda-lime glass (soda-lime silicate glass), is heated and/or provided and, after heating and/or after providing between a first mold, for example for molding and/or for press-molding a first optically effective surface of the optical element, and at least one second mold, for example for molding and/or for press-molding a second optically effective surface of the optical element, is press-molded to the optical element, for example on both sides, wherein a surface treatment agent is provided, wherein the surface treatment agent is evaporated to generate a treatment atmosphere, and wherein the first optically effective surface and/or the second optically effective surface (after press-molding) is exposed to the treatment atmosphere.

BRIEF DESCRIPTION OF THE DRAWINGS

FIG. 13 shows an embodiment of a cooling path in principle, FIG. 16 shows a cross-section through the protective cap according to FIG. 14, FIG. 17 shows a view into the interior of the protective cap according to FIG. 14, FIG. 18 shows a perspective view of the protective cap according to FIG. 14.

3

Figure 25:
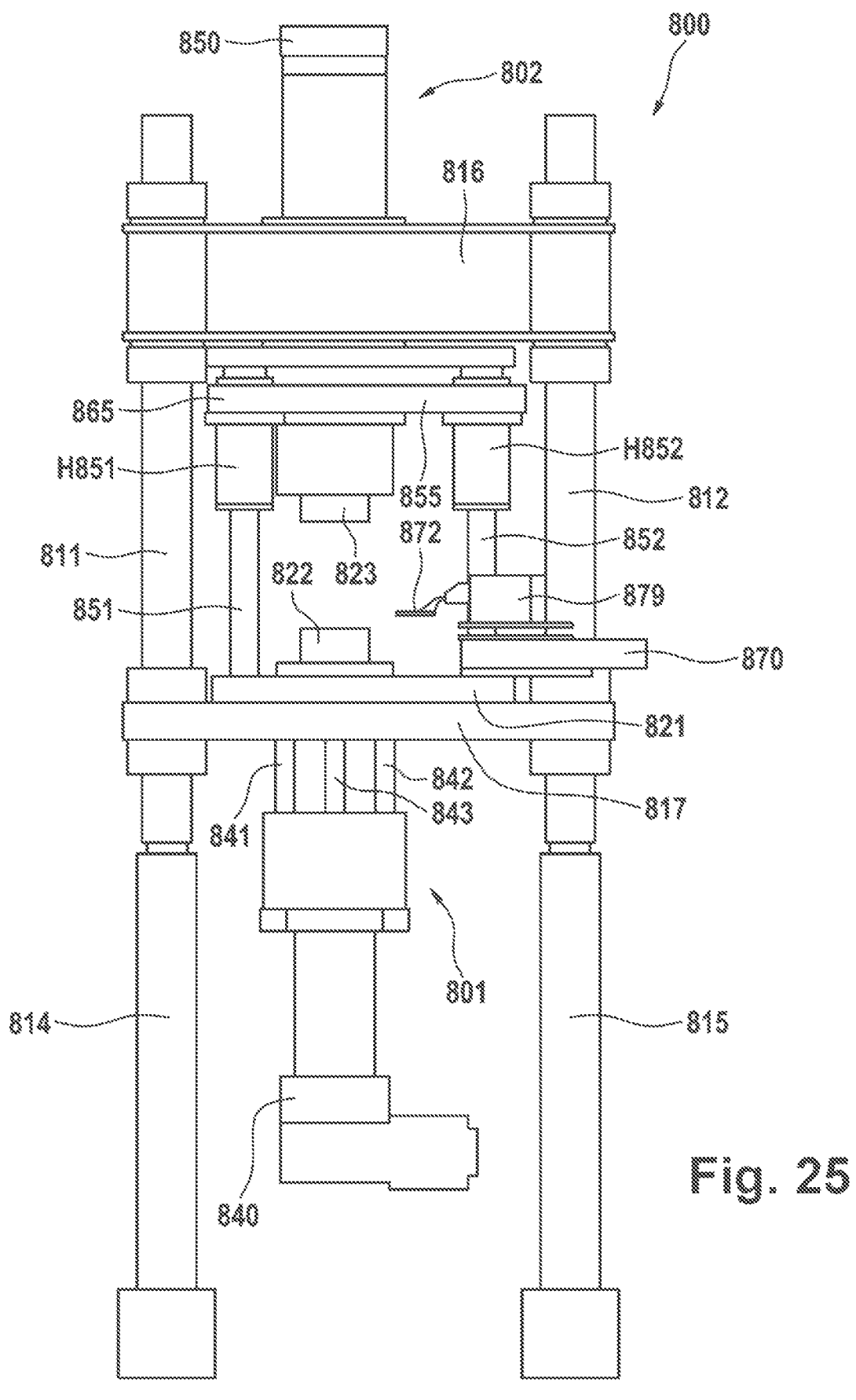
Figure 26:
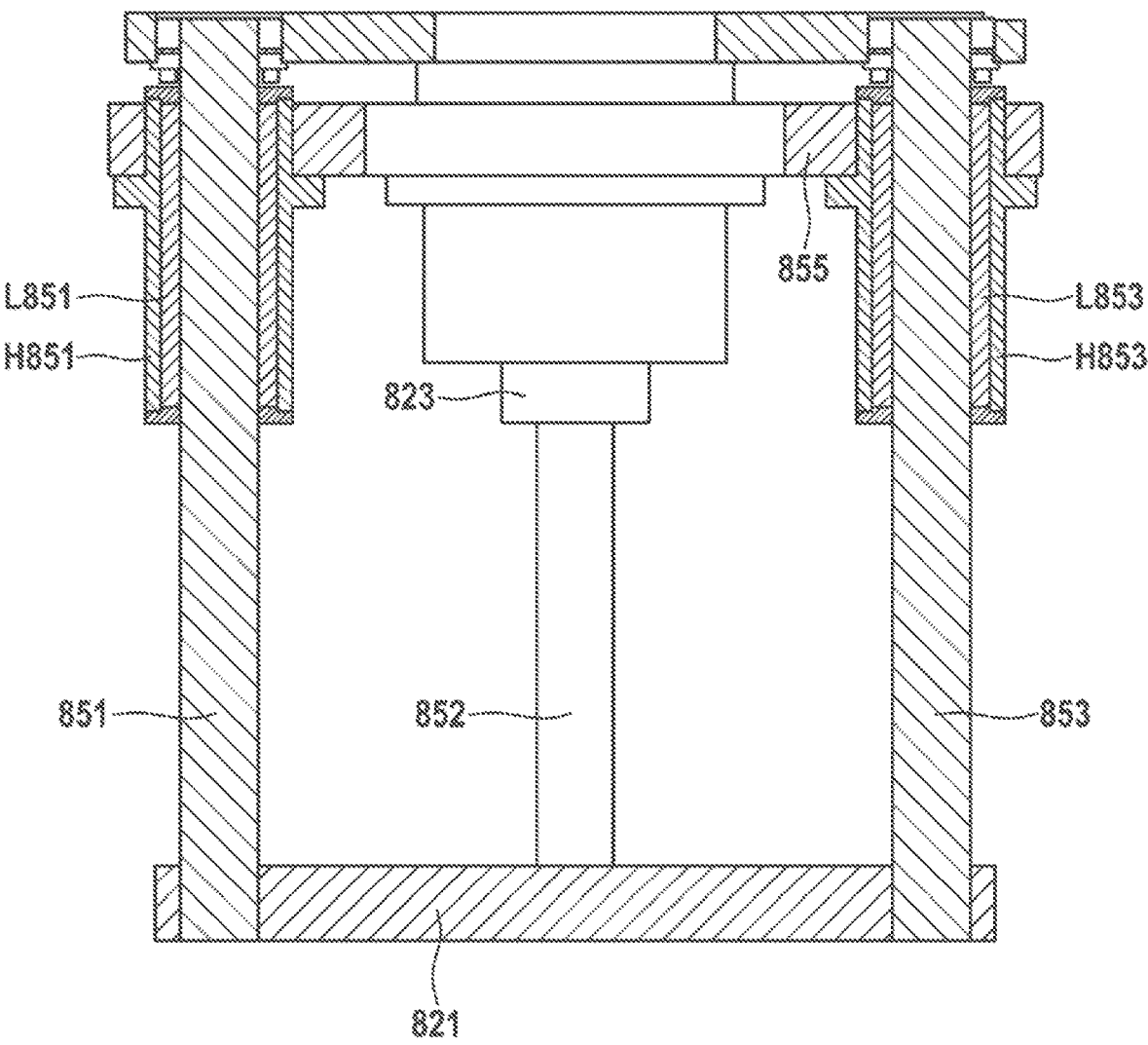

FIG. 25 shows another embodiment of a pressing station,

FIG. 26 shows a detail of a pressing station and

Figure 24:
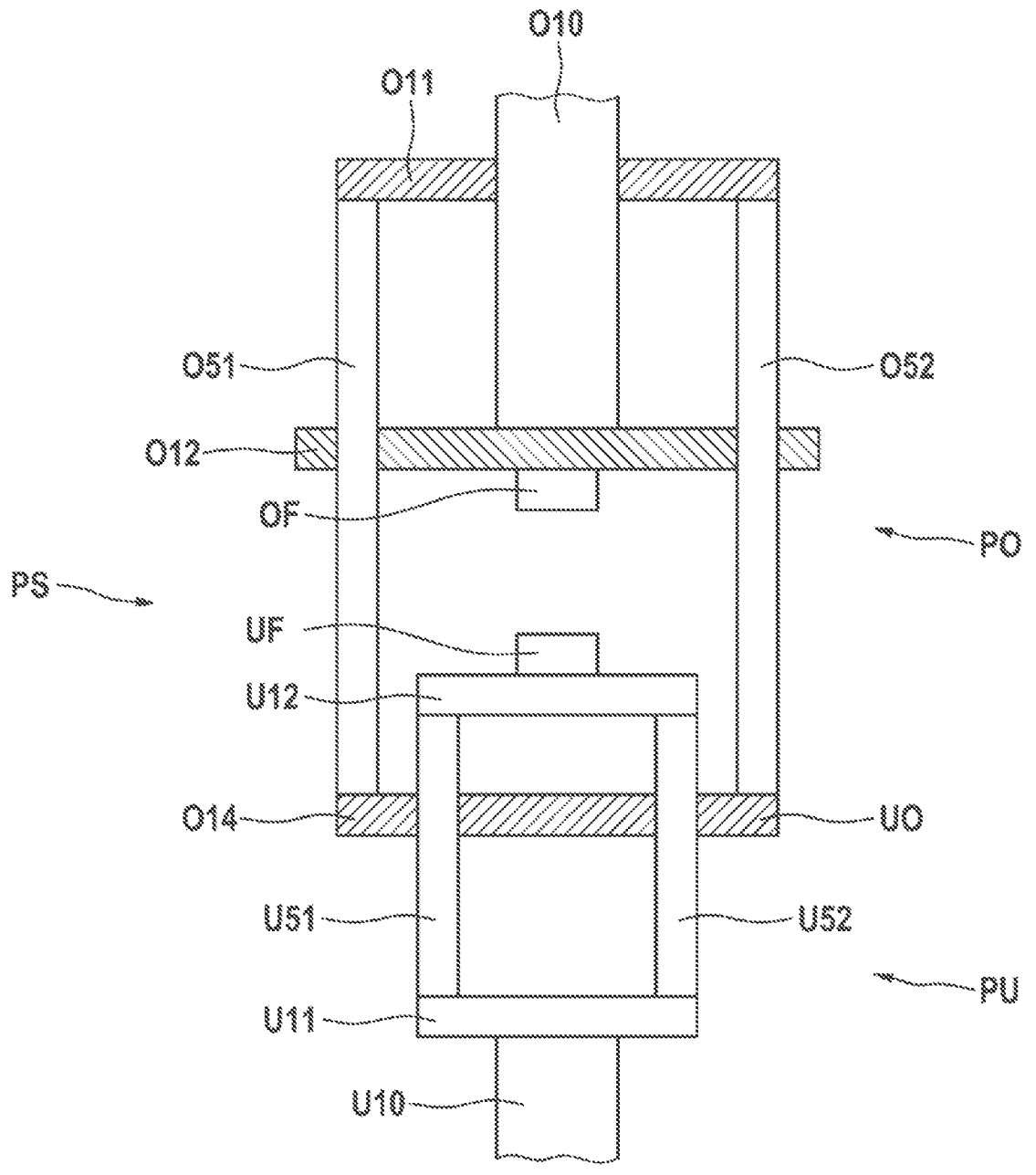
FIG. 24 shows a schematic view of a pressing station for pressing a headlight lens from a heated blank.
Figure 27:
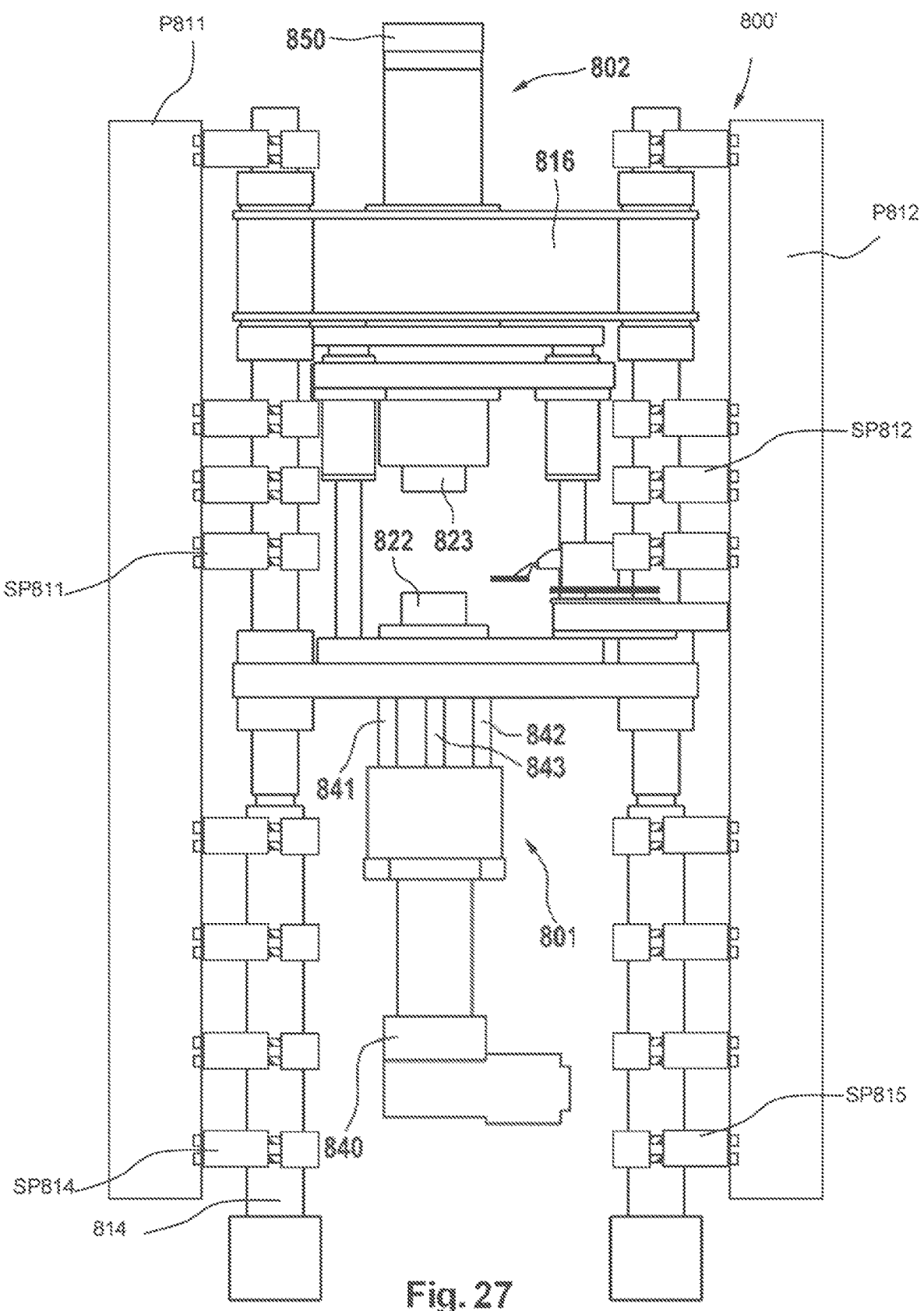
Figure 28:
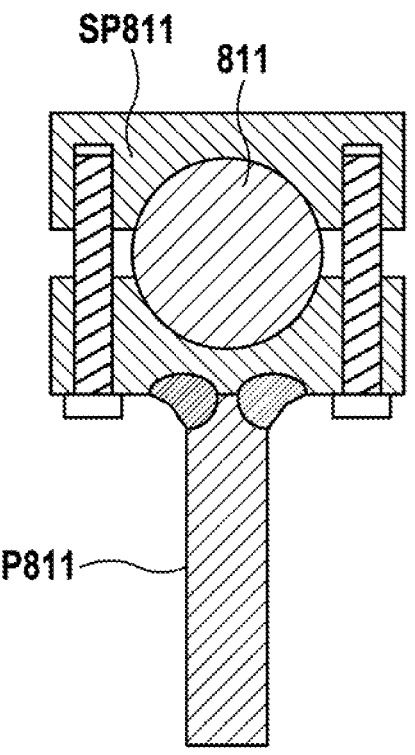
Figure 29:
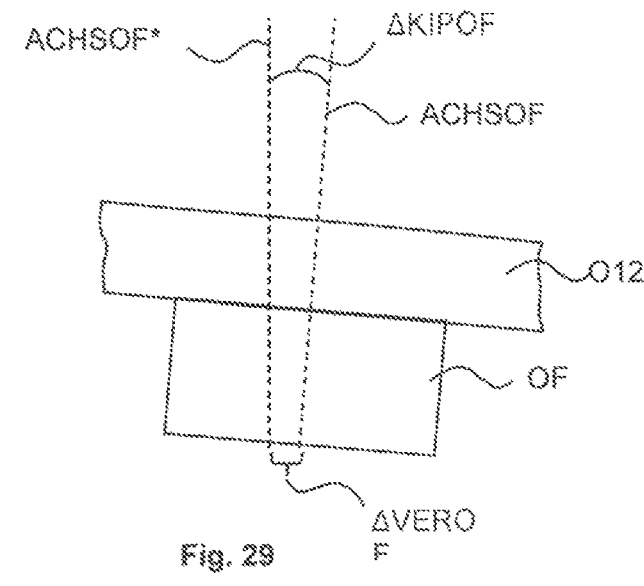
Figure 30:
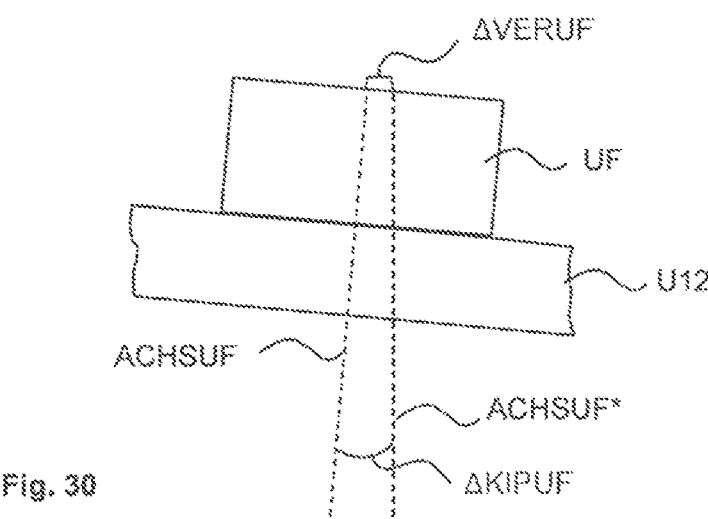
Figure 31:
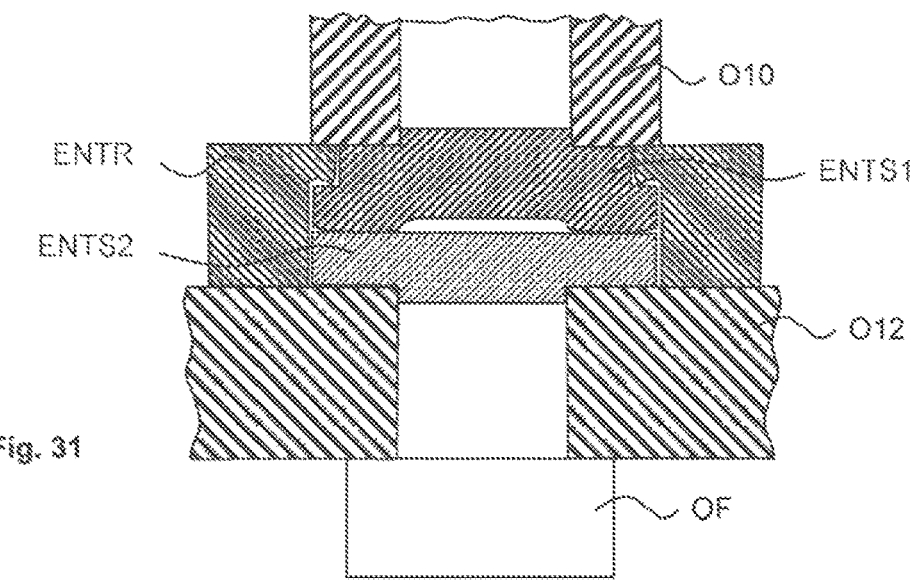
Figure 32:
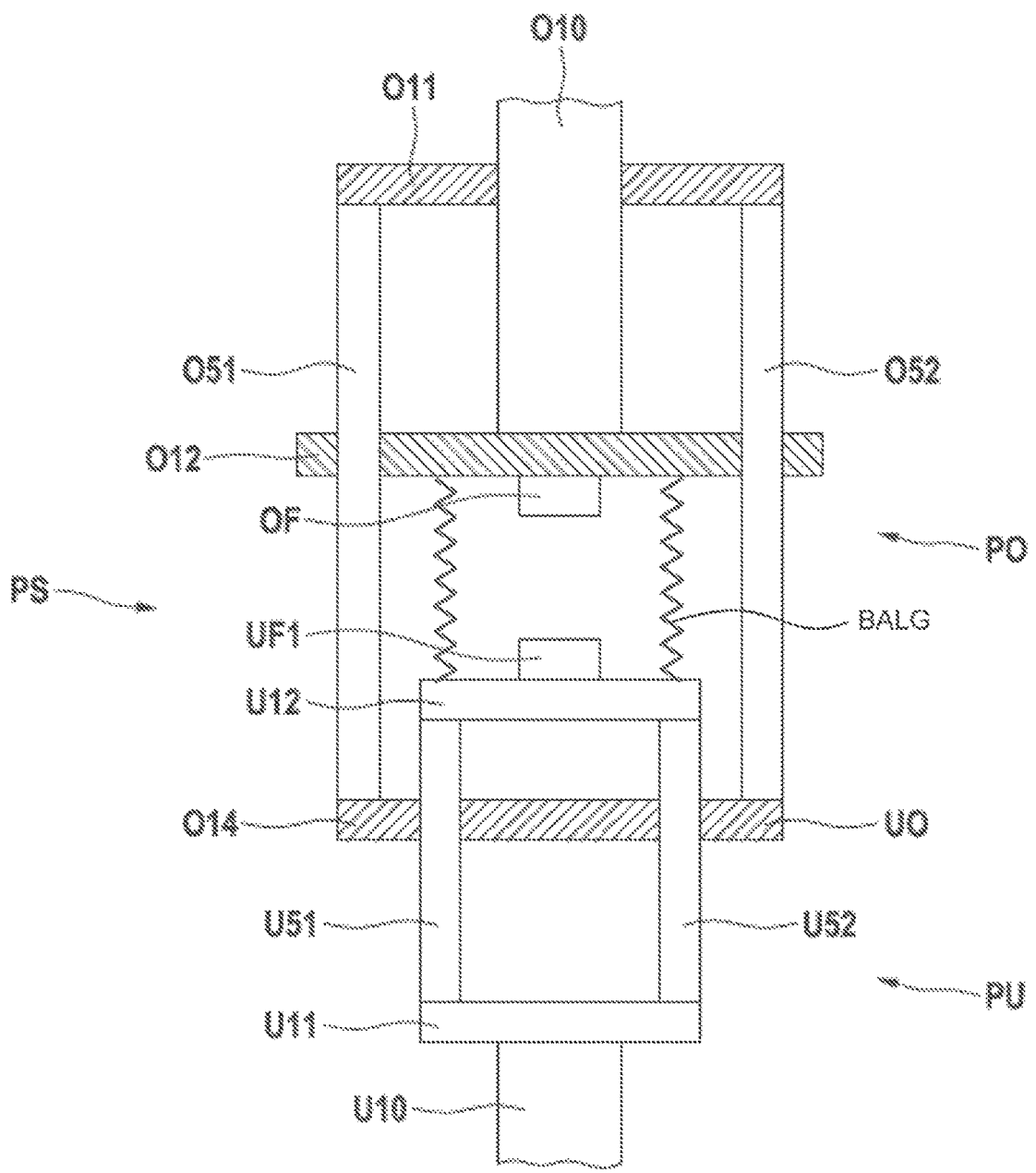
Figure 34:
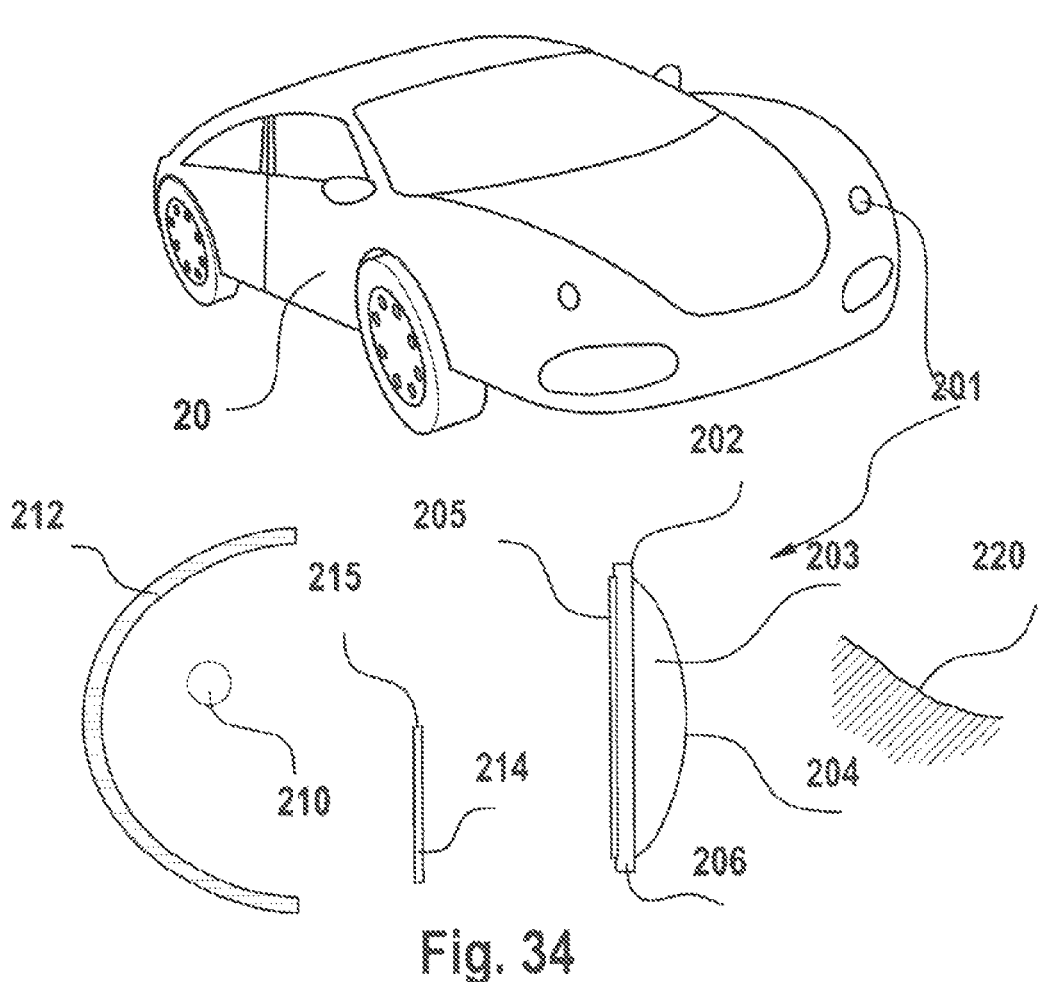
Figure 35:
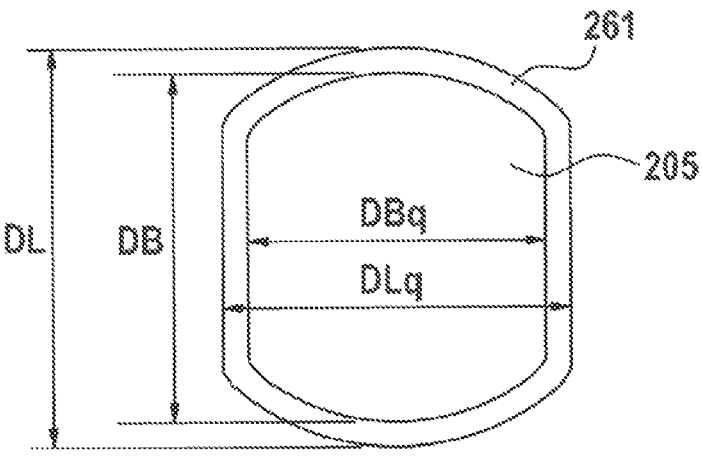
Figure 36:
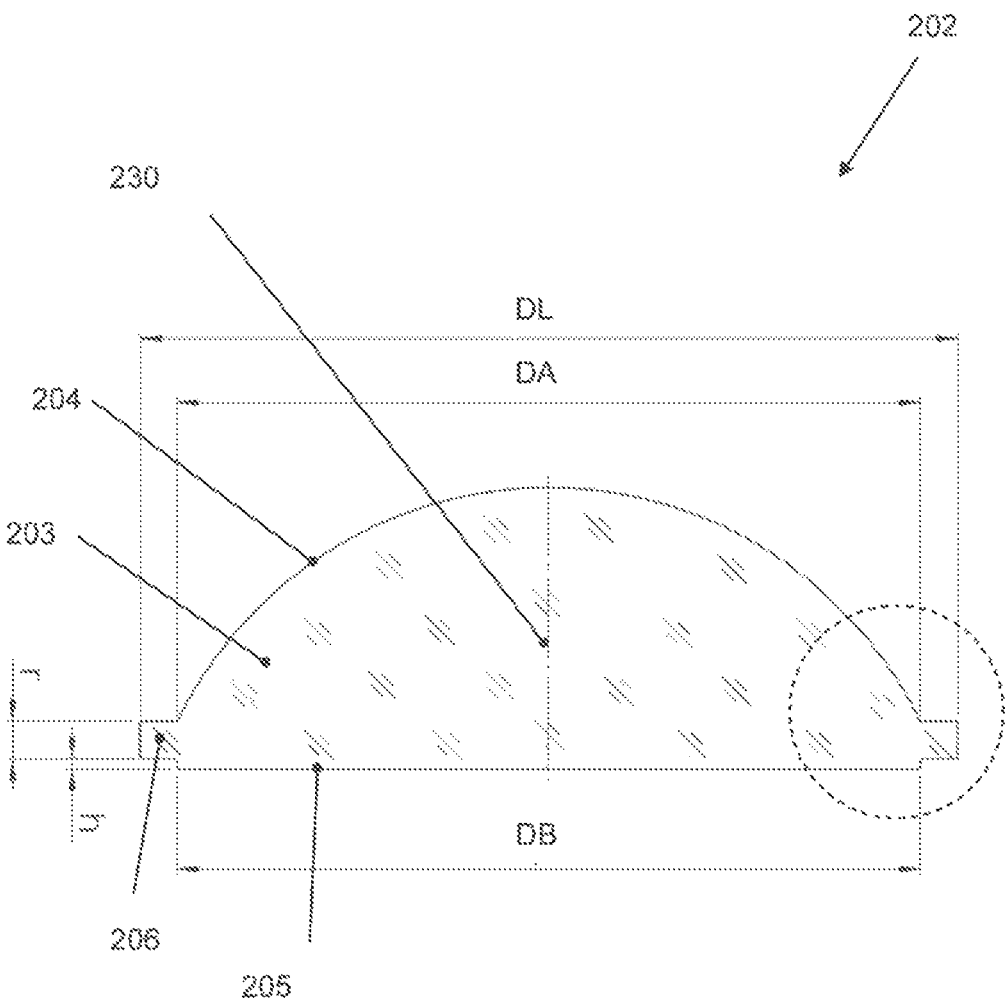

FIG. 27 shows a schematic view of a pressing station modified with respect to the pressing station according to FIG. 24 for pressing a headlight lens from a heated blank, FIG. 28 shows a detailed view of the pressing station according to FIG. 27, FIG. 29 shows a schematic view for explaining tilt and radial offset in relation to the upper mold, FIG. 30 shows a schematic view for explaining tilt and radial offset in relation to the lower mold, FIG. 31 shows an embodiment of a decoupling element with respect to torsion, FIG. 32 shows an embodiment of a modification of the pressing station according to FIG. 24, FIG. 25, FIG. 26, FIG. 27 and FIG. 28 for pressing under vacuum or nearvacuum or negative pressure explained by means of a modified representation of the schematic view according to FIG. 24, FIG. 33 shows a structural formula for sulfate, FIG. 34 shows a schematic view of a motor vehicle headlight (projection headlight) with a headlight lens, FIG. 35 shows a headlight lens according to FIG. 34 in a view from below, FIG. 36 shows a cross-sectional view of the lens according to FIG. 35

Figure 1:
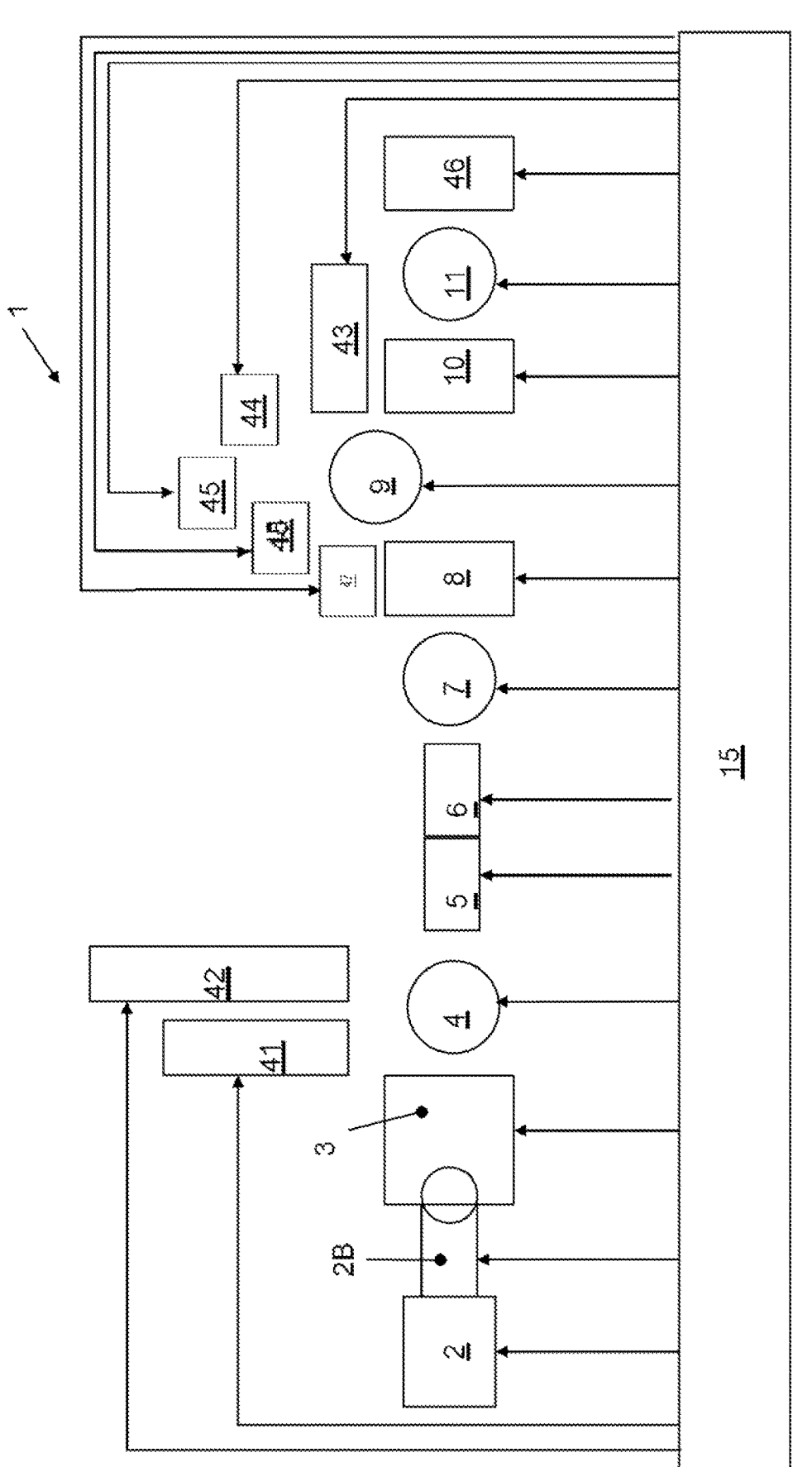
FIG. 1 shows a schematic view of a device for producing motor vehicle headlight lenses or lens-like free forms for motor vehicle headlights or optical elements made of glass.
Figure 37:
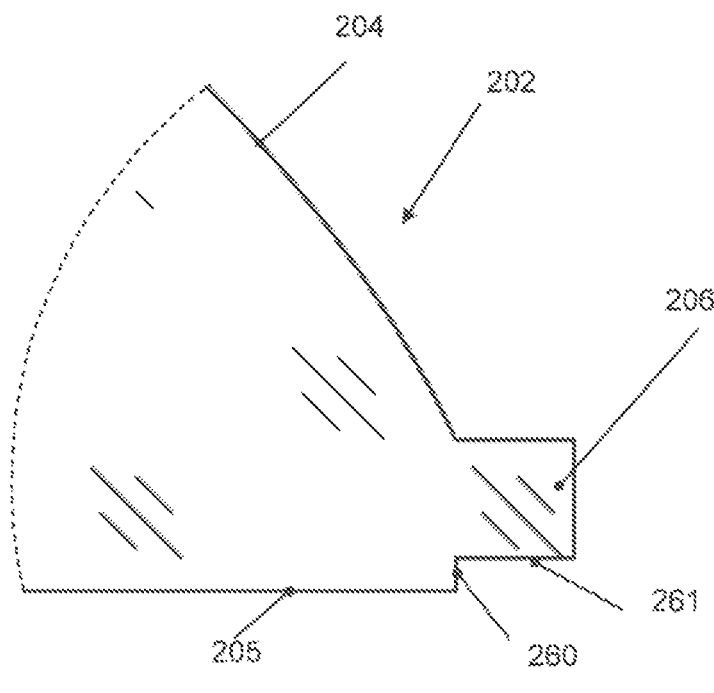
Figure 38:
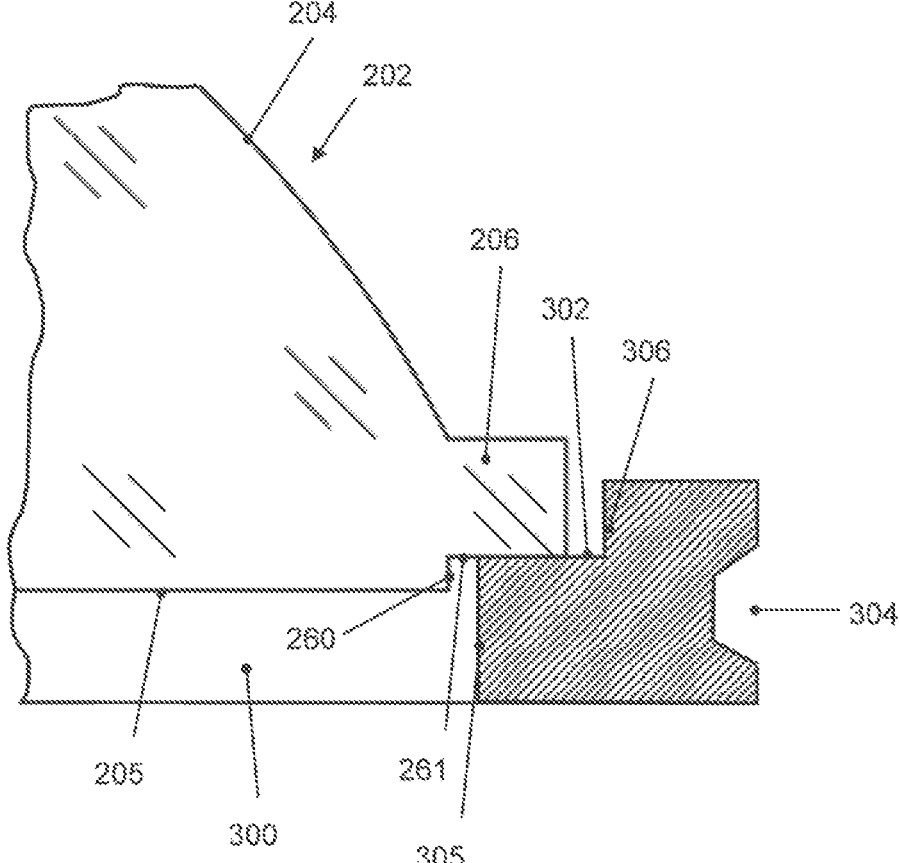
Figure 39:
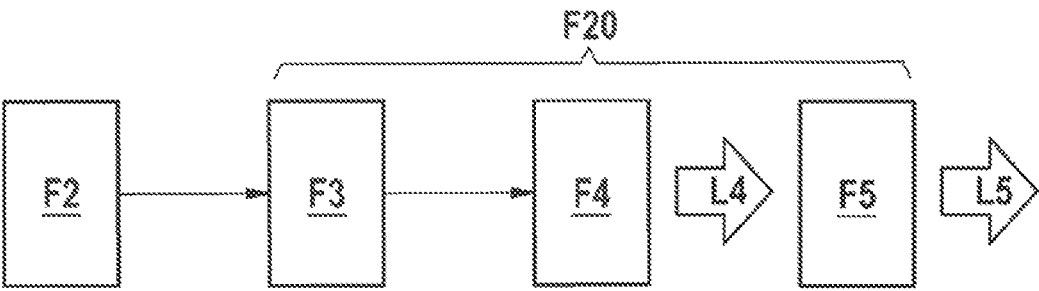
Figure 40:
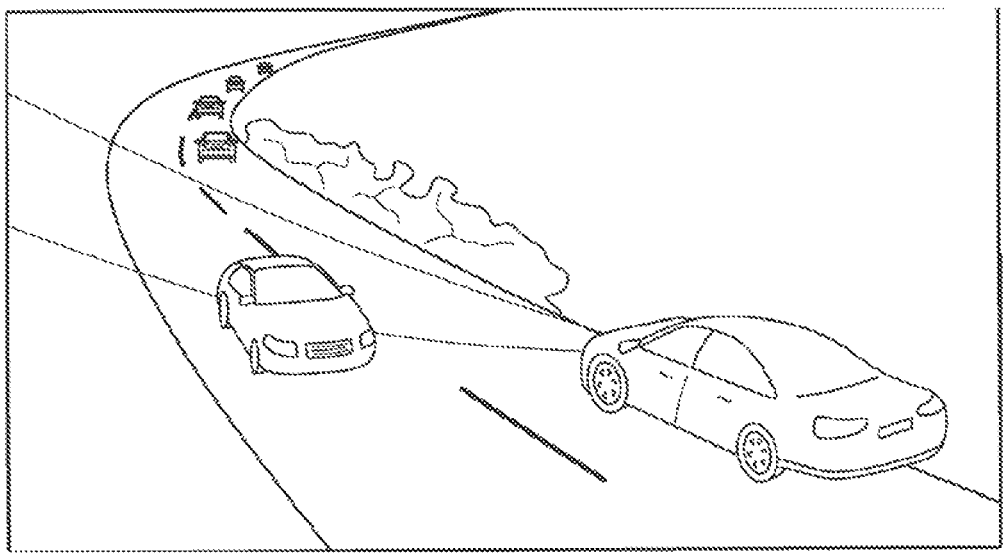
Figure 41:
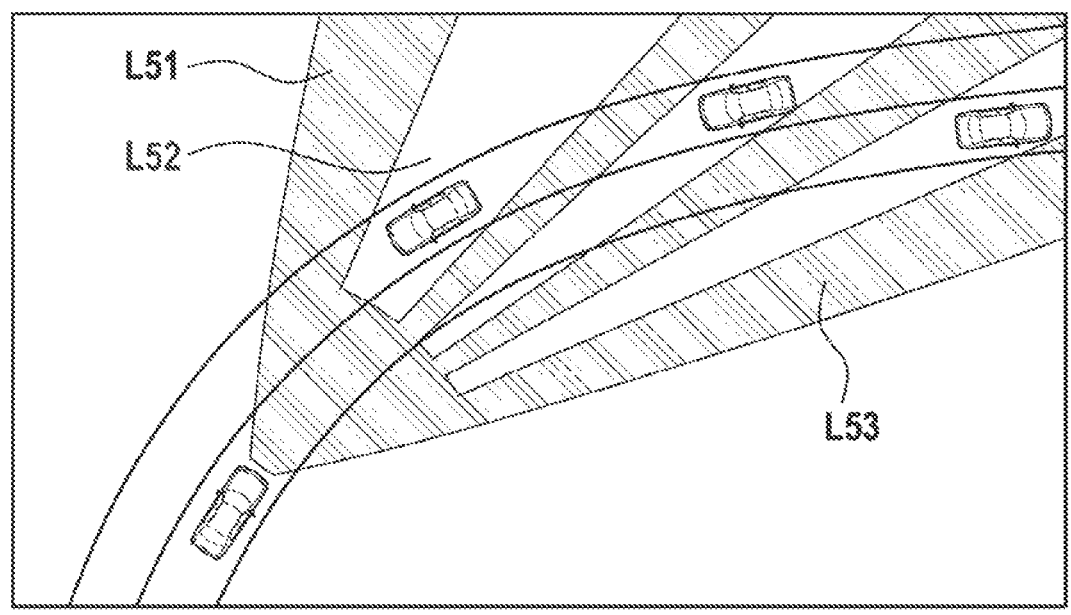
Figure 42:
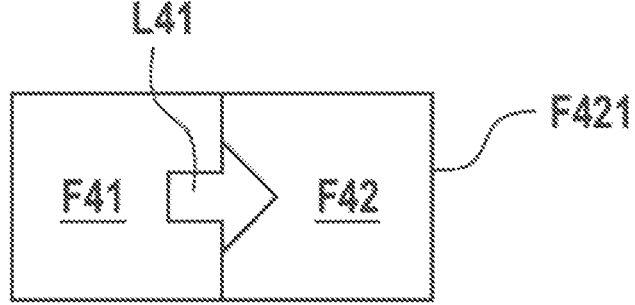

FIG. 37 shows a detail of the view according to FIG. 36,

FIG. 38 shows the detail according to FIG. 37 with a sectional view of the transport element (in cross-sectional view), FIG. 39 shows a schematic view of an embodiment of a vehicle headlight according to FIG. 1, FIG. 40 shows an embodiment of matrix light or adaptive high beam, FIG. 41 shows another embodiment of matrix light or adaptive high beam, FIG. 42 shows an embodiment of an illumination device of a vehicle headlight according to FIG. 39.

Figure 43:
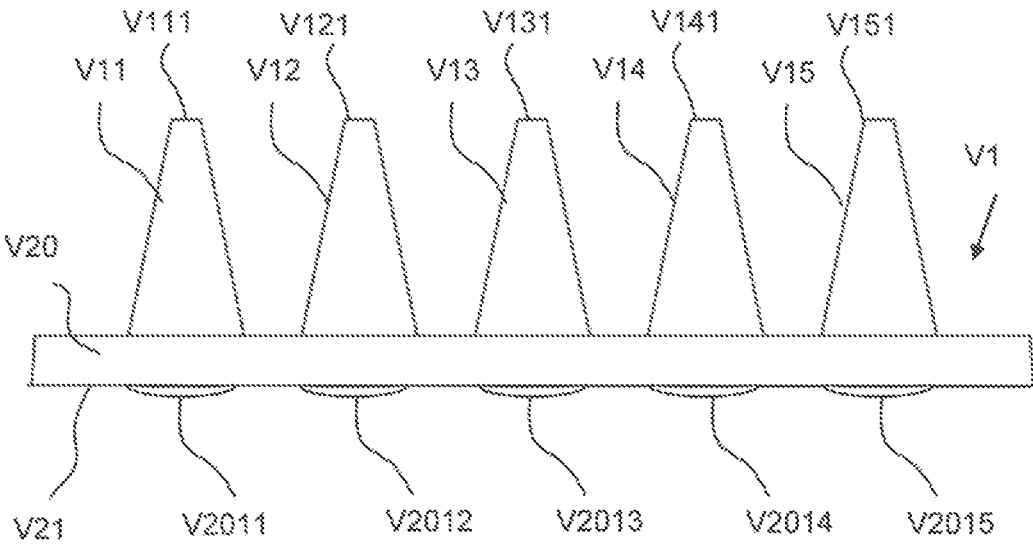
Figure 44:
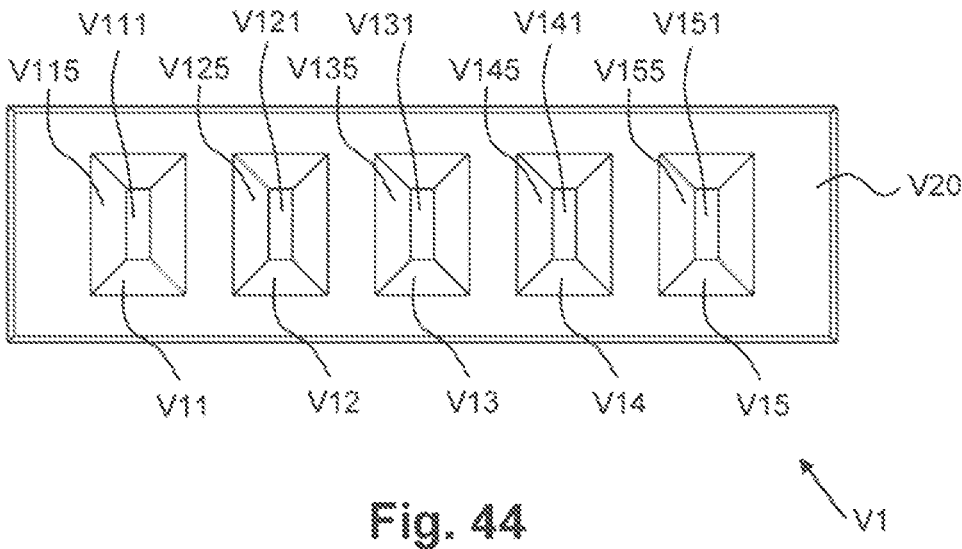
Figure 45:
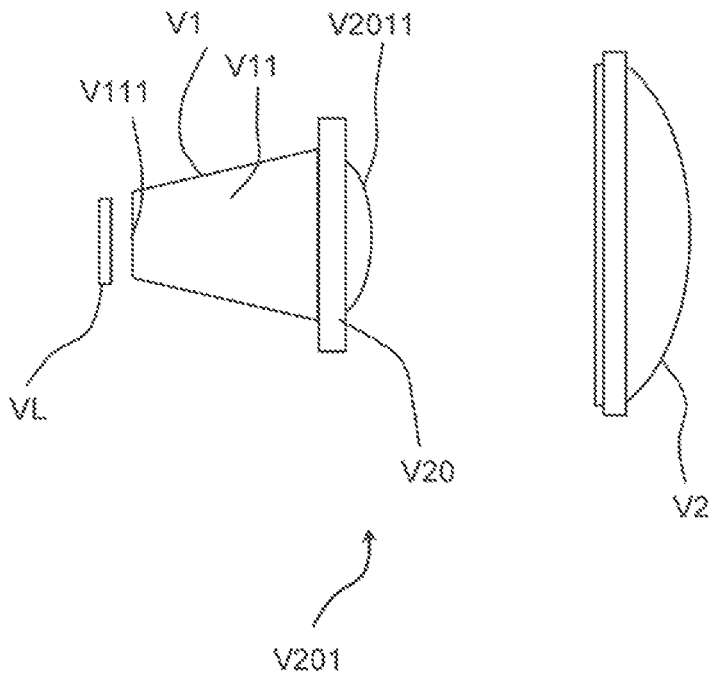
Figure 46:
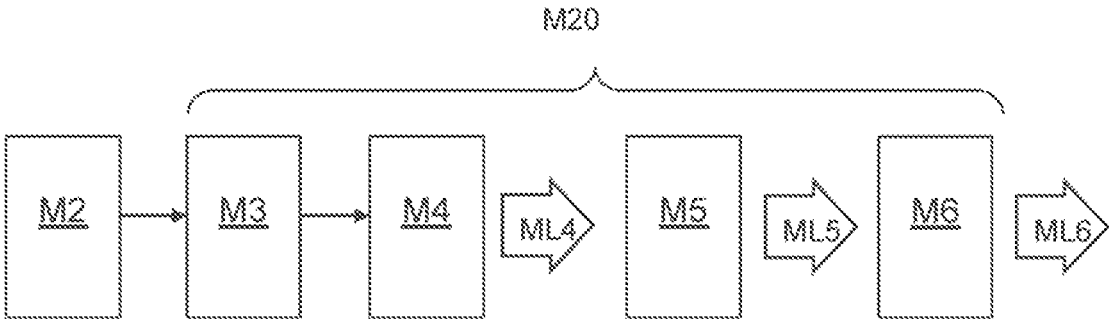
Figure 47:
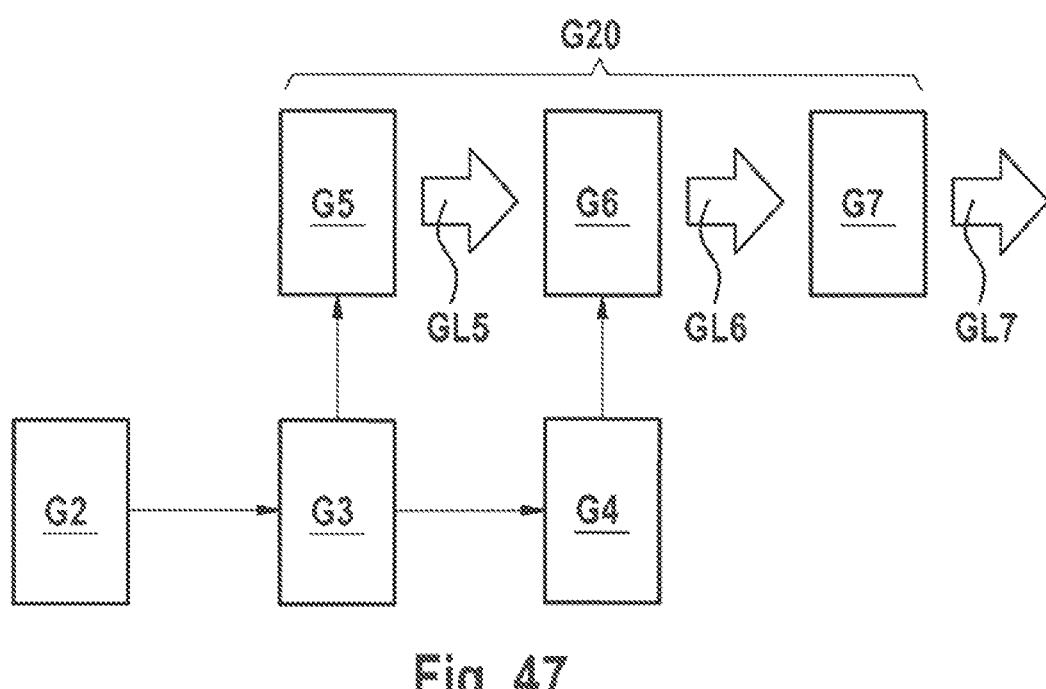
Figure 48:
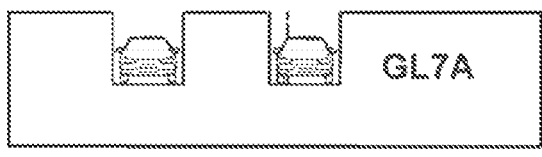

FIG. 43 shows an embodiment of an attachment optics array in a side view,

FIG. 44 shows the attachment optics array of FIG. 43 in a top view and,

FIG. 45 shows the use of an attachment optics array according to FIG. 43 and FIG. 44 in a motor vehicle headlight, FIG. 46 shows another embodiment of an alternative vehicle headlight, FIG. 47 shows another embodiment of an alternative vehicle headlight, FIG. 48 shows an example of the illumination by means of a headlight according to FIG. 47.

Figure 49:
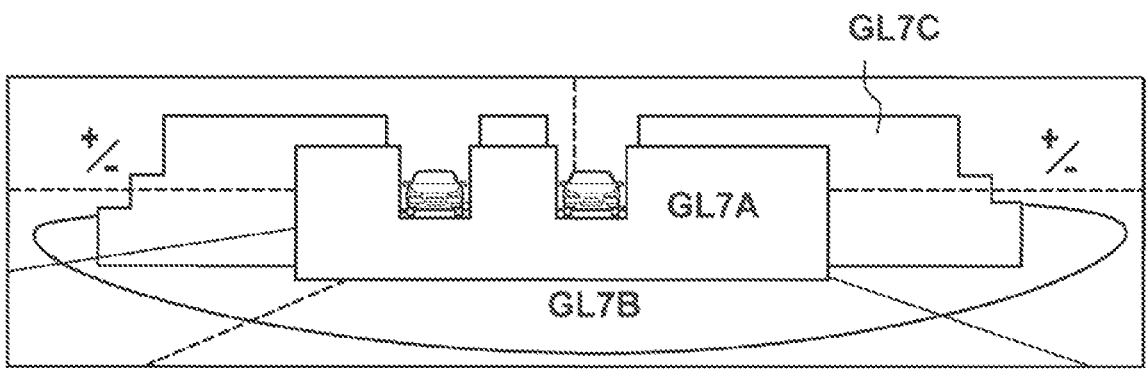
Figure 50:
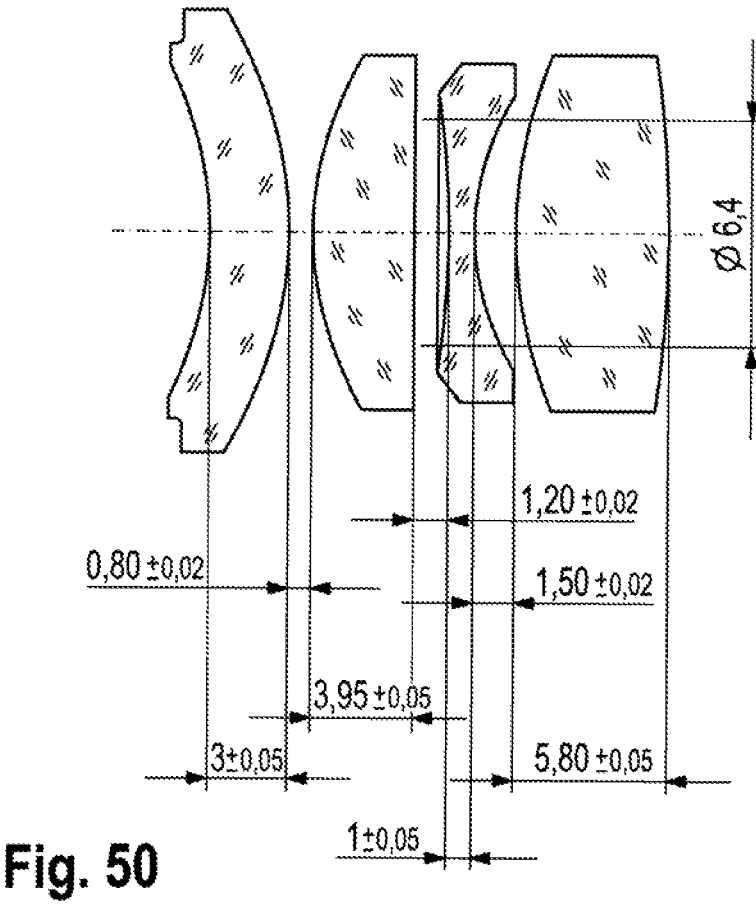
Figure 51:
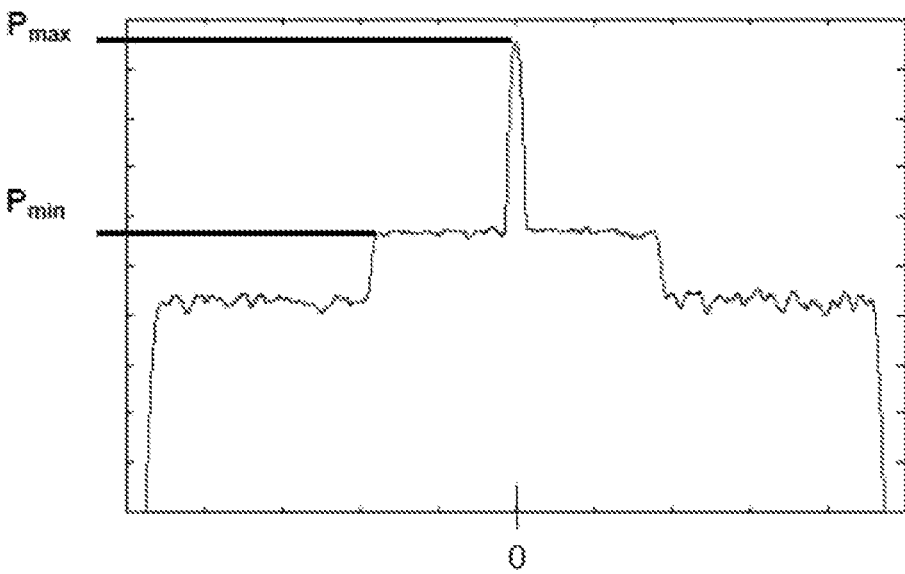

FIG. 49 shows an embodiment of a superimposed illumination using the illumination according to FIG. 48 and the illumination by two further headlight systems or subsystems, FIG. 50 shows an embodiment of an objective, and FIG. 51 shows light power plotted logarithmically versus the distance from a considered of an object.

Figure 14:
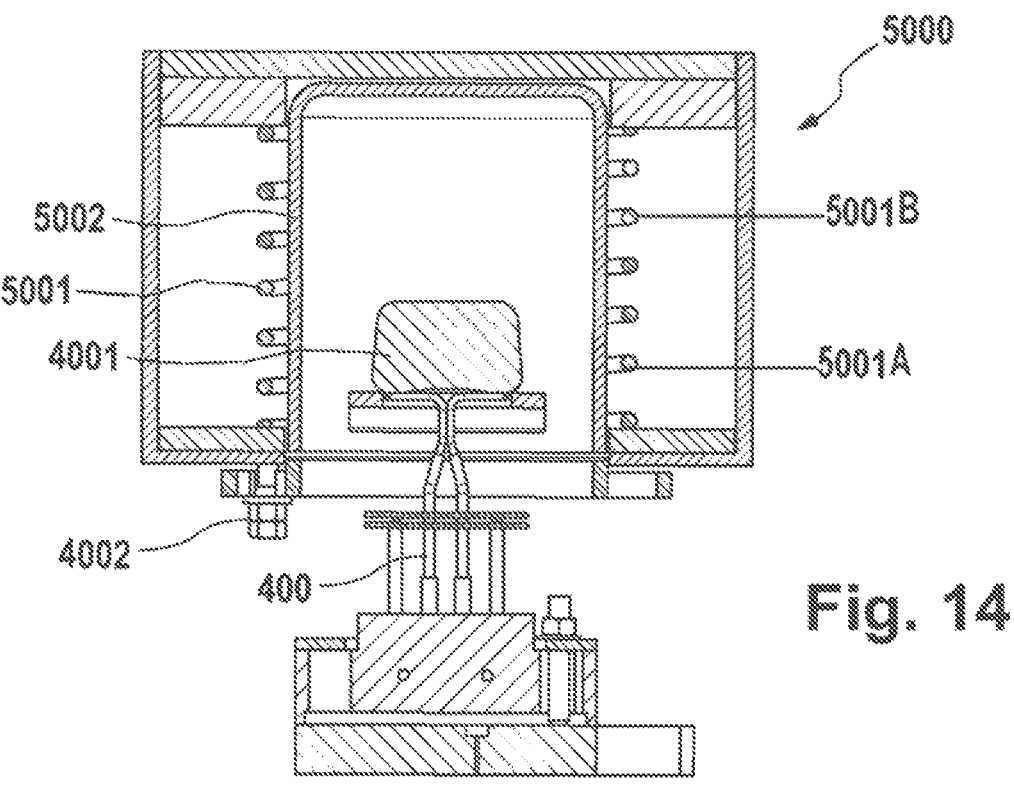
FIG. 14 shows a lance according to FIG. 3 in a hood-type annealing furnace with a protective cap for heating a gob.
Figure 55:
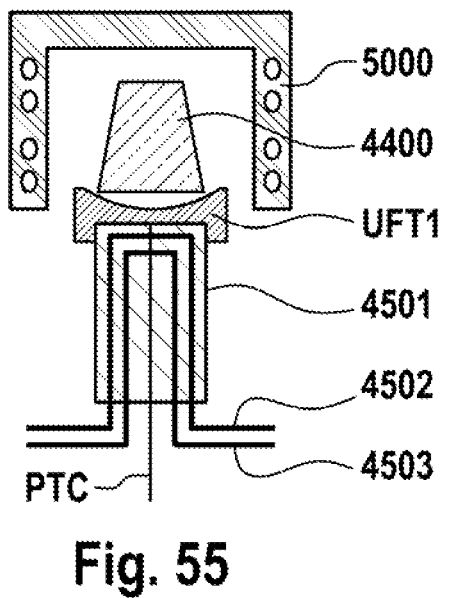

FIG. 52 shows a projection display using a microlens array having a curved base, FIG. 53 shows a clamping assembly with a flat preform, FIG. 54 shows a microlens array with a round carrier, FIG. 55 shows an embodiment, modified from the embodiment shown in FIG. 14, for heating a preform in a hood-type annealing furnace using a lower mold part and a cooling body,

4

Figure 56:
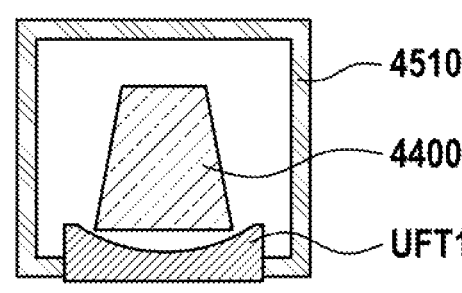
Figure 57:
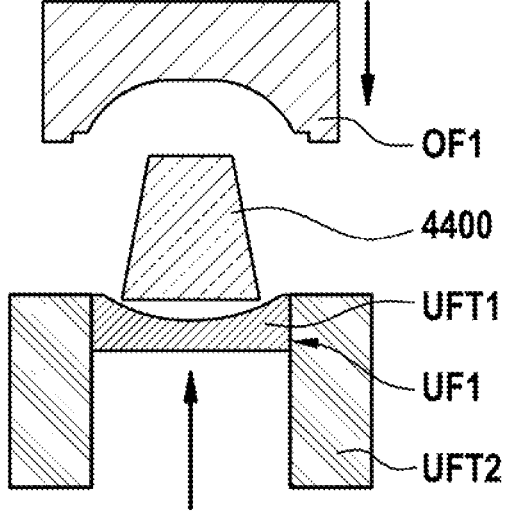
Figure 58:
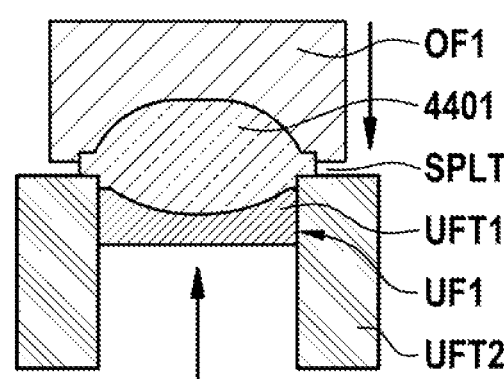

FIG. 56 shows an embodiment of transporting a heated preform in a housing to reduce cooling of a preform during transport from a hood-type annealing furnace to a pressing station, FIG. 57 shows an embodiment for pressing a preform using a lower mold comprising a first lower mold part and a second lower mold part, FIG. 58 shows pressing of an intermediate molded part from a preform by not completely moving a lower mold and an upper mold toward each other, or not completely closing a cavity formed by an upper mold and a lower mold, FIG. 59 shows an embodiment of heating a side of an intermediate molded part facing a lower mold.

FIG. 60 shows an embodiment of pressing an optical element from an intermediate molded part.

Figure 63:
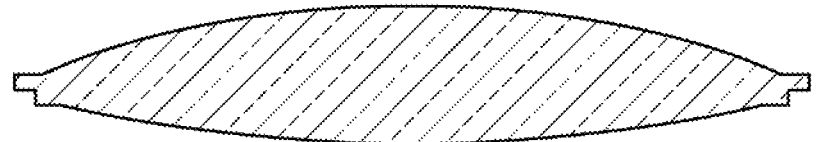
Figure 64:
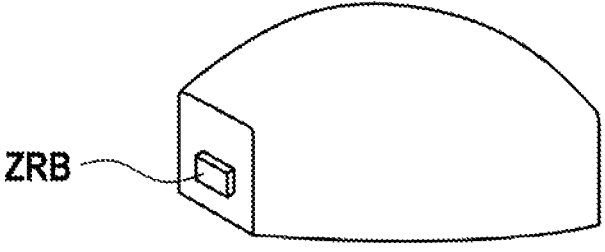

FIG. 61 shows an embodiment of moving apart a lower mold and an upper mold to open a cavity for pressing an optical element, FIG. 62 shows an embodiment of cooling an optical element in a cooling path, wherein the optical element rests on a lower mold part, FIG. 63 shows an embodiment of a biconvex lens, and FIG. 64 shows an embodiment of another lens.

DESCRIPTION OF THE SPECIFIC EMBODIMENTS

The disclosure relates to a method of manufacturing an optical element or a headlight lens according to the claims, wherein it is provided, inter alia, that a blank of glass, for example of alkali-containing silicate-based glass systems or of soda-lime glass (soda-lime silicate glass), is heated and/or provided and, after heating and/or after providing between a first mold, for example for molding and/or for press-molding a first optically effective surface of the optical element, and at least one second mold, for example for molding and/or for press-molding a second optically effective surface of the optical element, is press-molded to the optical element, for example on both sides, wherein a surface treatment agent is provided, wherein the surface treatment agent comprises a solvent and active solid (for example sulfate, for example ammonium sulfate) dissolved in the solvent, wherein the surface treatment agent and/or the solvent with the active solid dissolved therein is evaporated to generate a treatment atmosphere, and wherein the first optically effective surface and/or the second optically effective surface (after press-molding) is exposed to the treatment atmosphere. An active solid as defined in the present disclosure may comprise a single solid or a plurality of different components/solids.

It is provided, for example, that the proportion of active solid in the solvent is at least 10% by weight, for example at least 20% by weight. It is provided, for example, that the proportion of active solid in the solvent is not more than 50% by weight, for example not more than 40% by weight.

It is provided, for example, that the active solid comprises or consists (essentially) of sulfate. It is provided, for example, that the active solid comprises or consists (essentially) of ammonium sulfate.

For example, it is envisaged that the solvent comprises or consists (essentially) of water.

A solvent in the sense of the present disclosure comprises for example water or is essentially water, but may optionally also be a solvent mixture. A solvent is essentially water or consists essentially of water if the water content is at least 70% and/or not more than 90%.

For example, a surface is optically effective within the meaning of this disclosure if it changes the direction of the light passing through the surface during intended use with respect to its direction and/or its beam or bundle characteristic. For example, a surface is optically effective within the meaning of the present disclosure if, due to light refraction, it changes the direction of light passing through the surface during intended use with respect to its direction and/or its beam or bundle characteristics. For example, a surface, such as an edge, through which light is not intended to pass is not optically effective within the meaning of the present disclosure.

In an embodiment, the surface treatment agent is evaporated in a predetermined dosage or amount in an evaporation chamber to create the treatment atmosphere.

In a further embodiment, it is provided that the optically effective surface is exposed to the treatment atmosphere in a treatment chamber, wherein after evaporation or supply of the predetermined dosage or amount of surface treatment agent in and/or the evaporation chamber, a passage between the treatment chamber and the evaporation chamber is opened so that the treatment atmosphere flows into the treatment chamber, for example using the chimney effect.

In a further embodiment, it may be provided that the optically effective surface of the optical element or the headlight lens is exposed to the treatment atmosphere prior to cooling of the optical element in a cooling section for cooling with the addition of heat and/or according to a cooling regime.

For example, a dosage and/or addition of an amount of the surface treatment agent between 1 ml and 10 ml per cycle takes place. It is provided, for example, that not less than 3 ml and/or not more than 6 ml of the surface treatment agent are evaporated to generate a treatment atmosphere for an optical element or a headlight lens. The dosing tolerance per dosing or dosing unit is for example not less than 10% and/or not more than 30%.

The surface treatment agent is evaporated to form a treatment atmosphere, for example, by applying or dripping the surface treatment agent onto an evaporation plate. The evaporation plate for example has a temperature of not less than 280° C., for example a temperature above 300° C. It is particularly envisaged that the temperature of the evaporation plate is not more than 600° C. and/or not less than 280° C. A particularly suitable temperature range is (approximately) 600° C.±10%. When the surface treatment agent is evaporated to form a treatment atmosphere, the Leidenfrost effect occurs, for example. The Leidenfrost effect refers to the phenomenon whereby water droplets on a glowing plate do not evaporate immediately but move in a "dancing" manner because they move irregularly on the metal plate, carried by a layer of vapor that forms.

The cooling of the optical element or the headlight lens in the precooling takes place, for example, at a cooling rate of not less than 3° C. per second and/or not more than 5° C. per second.

In an embodiment, the optical element and/or the headlight lens is exposed to the treatment atmosphere at a temperature, for example of the surface, of the optical element and/or the headlight lens of about TG+50° C. to TG+80° C. or TG+90° C., respectively.

It may be provided that the evaporation chamber is thermally insulated.

During precooling, the optical element and/or the headlight lens is cooled by less than 20% and/or by at least 1%, in each case based on the temperature of the optical element or the headlight lens at the start of precooling in degrees Celsius.

In contrast to the treatment of hollow glass or flat glass disclosed in EP 1 954 642 B1 and DE 10 2016 102 408 A1, the present disclosure relates to the treatment of optically effective surfaces. Here, special requirements apply to the cooling, since not only mechanical damage, such as cracks, can lead to unusability, but also internal stresses caused by too rapid cooling.

For example, it is envisaged that the surface treatment is not followed by a mechanical polishing step, even after the optical element or headlight lens has cooled on a cooling section.

Soda-lime glass within the meaning of this disclosure comprises for example
60 to 75 wt.-% $SiO_2$ and
3 to 12 wt.-% CaO,
or
70 to 75 wt.-% $SiO_2$ and
3 to 12 wt.-% CaO.

Soda-lime glass within the meaning of this disclosure comprises for example
60 to 75 wt.-% $SiO_2$.
3 to 12 wt.-% $K_2O$ and
3 to 12 wt.-% CaO,
or
70 to 75 wt.-% $SiO_2$,
3 to 12 wt.-% $K_2O$ and
3 to 12 wt.-% CaO.

Soda-lime glass within the meaning of this disclosure comprises for example
60 to 75 wt.-% $SiO_2$,
3 to 12 wt.-% $Na_2O$,
3 to 12 wt.-% $K_2O$ and
3 to 12 wt.-% CaO,
or
70 to 75 wt.-% $SiO_2$,
3 to 12 wt.-% $Na_2O$.
3 to 12 wt.-% $K_2O$ and
3 to 12 wt.-% CaO.

Soda-lime glass within the meaning of this disclosure comprises for example
0.2 to 2 wt.-% $Al_2O_3$,
60 to 75 wt.-% $Si_2$.
3 to 12 wt.-% $Na_2O$,
3 to 12 wt.-% $K_2O$ and
3 to 12 wt.-% CaO, Soda-lime glass within the meaning of this disclosure comprises for example
0.2 to 2 wt.-% $Al_2O_3$.
0.1 to 1 wt.-% $Li_2O$.
60 to 75 wt.-% $SiO_2$,
3 to 12 wt.-% $Na_2O$,
3 to 12 wt.-% $K_2O$ and
3 to 12 wt.-% CaO,
or
0.2 to 2 wt.-% $Al_2O_3$,
0.1 to 1 wt.-% $Li_2O$.
70 to 75 wt.-% $SiO_2$,
3 to 12 wt.-% $Na_2O$,
3 to 12 wt.-% $K_2O$ and
3 to 12 wt.-% CaO, Soda-lime glass within the meaning of this disclosure comprises for example
0.2 to 2 wt.-% $Al_2O_3$,
0.1 to 1 wt.-% $Li_2O$,
0.3, for example 0.4, to 1.5 wt.-% $Sb_2O_3$,
60 to 75 wt.-% $SiO_2$.
3 to 12 wt.-% $Na_2O$, 3 to 12 wt.-% K$_2$O and
3 to 12 wt.-% CaO,
such as DOCTAN®, or
0.2 to 2 wt.-% Al$_2$O$_3$,
0.1 to 1 wt.-% Li$_2$O,
0.3, for example 0.4, to 1.5 wt.-% Sb$_2$O$_3$,
70 to 75 wt.-% SiO$_2$,
3 to 12 wt.-% Na$_2$O,
3 to 12 wt.-% K$_2$O and
3 to 12 wt.-% CaO.

It may be provided that at least one optically effective surface is fire-polished before treatment with surface treatment agent. In one embodiment, for example, only the underside is fire-polished. This is provided for example in conjunction with a design of the lower optically effective surface as a planar surface. It has been found suitable, if fire polishing is provided, to wait a waiting time before exposing the surface to the surface treatment agent. The waiting time is for example at least two seconds, for example at least three seconds, for example at least four seconds. In an embodiment, the fire polishing takes no longer than three seconds, for example no longer than two seconds. Waiting times or holding times may be for example for large lenses at least 20 s, for example, but for example no more than 50 s.

In an embodiment, the first optically effective surface and the second optically effective surface are exposed to the treatment atmosphere at least partially simultaneously (overlapping in time).

In a further embodiment, the temperature of the optical element and/or the temperature of the first optically effective surface and/or the temperature of the second optically effective surface when exposed to the treatment atmosphere is not less than TG or TG+20K, where TG denotes the glass transition temperature. In another embodiment, the temperature is not less than TG−50K.

In a further embodiment, the temperature of the optical element and/or the temperature of the first optically effective surface and/or the temperature of the second optically effective surface is not greater than TG+150 K, for example not greater than TG+100 K, when exposed to the treatment atmosphere.

In a further embodiment, the treatment of the optically effective surface with the surface treatment agent is carried out prior to cooling of the optical element in a cooling section for cooling according to a cooling regime.

For example, it is intended that residues from the surface treatment process are removed, for example washed off. This can be done for example with water without the addition of cleaning agents. The optical elements may have a (white) precipitate, for example the reaction product, after treatment with the surface treatment agent. For example, deionized water can be used to clean the optical elements. VE water is demineralized water. The abbreviation VE stands for "fully demineralized". Cleaning can be performed, for example, at a water temperature of 60° C. of the VE water. There is no need to use a detergent such as CEROWEG, which is known from WO 2019/243 343 A1.

For example, it is envisaged that the optical element or lens has a transmission of greater than 90% after washing and/or removal of residues from the surface treatment process.

In a further embodiment, an optically effective surface is exposed to the treatment atmosphere for no longer than 14 seconds.

For example, it is provided that the headlight lens or a headlight lens according to the disclosure consists of at least 90%, for example at least 95%, for example (essentially)

100% quartz glass at the surface after it has been exposed to the treatment atmosphere. For example, it is provided that the amount of cross-linking of oxygen ions to silicon ions at the surface of the headlight lens or optical element can be represented by the relationship $$\frac{Q(4)}{Q(4)+Q(3)} \geq 0.9$$

for example $$\frac{Q(4)}{Q(4)+Q(3)} \geq 0.95$$

In the above Q(3) denotes 3 oxygen ions crosslinking at tetrahedron corners of a silicon ion and Q(4) denotes 4 oxygen ions crosslinking at tetrahedron corners of a silicon ion. The proportion of quartz glass decreases from the optically effective surface in the direction towards the interior of the headlight lens or optical element, wherein at a depth (distance from the surface) of 5 µm it is provided for example that the proportion of the quartz glass is at least 10%, for example at least 3%. For example, it is provided that the amount of crosslinking of oxygen ions to silicon ions at a depth of 3 µm below the surface of the headlight lens or the optical element after being exposed to the treatment atmosphere can be represented by the relationship $$\frac{Q(4)}{Q(4)+Q(3)} \geq 0.1$$

for example $$\frac{Q(4)}{Q(4)+Q(3)} \geq 0.05$$

For example, it is provided that the quartz glass content at a depth (distance from the surface) of 5 µm is not more than 50%, for example not more than 25%. For example, it is provided that the amount of crosslinking of oxygen ions to silicon ions at a depth of 5 µm below the surface of the headlight lens or the optical element after being exposed to the treatment atmosphere can be represented by the relationship $$\frac{Q(4)}{Q(4)+Q(3)} \leq 0.5$$

for example $$\frac{Q(4)}{Q(4)+Q(3)} \leq 0.25$$

For example, no ion exchange is provided, especially no ion exchange before the surface treatment described. For example, no ion exchange is provided in the sense of the first phase as disclosed in DE 697 01 714 T2. Rather, for example, dealkalization alone takes place, in the use of the term similar to that used in DE 697 01 714 T2, but without adopting the parameters used there.

In a further embodiment, the first mold is moved by means of an actuator for moving the first mold in that the first mold and the actuator are connected by means of a first movable guide rod and at least one second movable guide rod, for example at least one third movable guide rod, wherein the first movable guide rod is guided in a recess of a fixed guide element and the second movable guide rod is guided in a recess of the fixed guide element and the optional third movable guide rod is guided in a recess of the fixed guide element, wherein for example it is provided that the deviation of the position of the mold orthogonal to the direction of movement of the mold is not more than 20 μm, for example not more than 15 μm, for example not more than 10 μm, from the target position of the mold orthogonal to the direction of movement of the mold.

In a further embodiment, the at least second mold is moved by means of an actuator for moving the second mold in a frame comprising a first fixed guide rod, at least one second fixed guide rod and, for example, at least one third fixed guide rod, wherein the first fixed guide rod, the at least second fixed guide rod and the optional at least third fixed guide rod are connected at one end by an actuator-side fixed connector and at the other end by a mold-side fixed connector, wherein the at least second mold is fixed to a movable guide element which comprises a recess through which the first fixed guide rod is guided, a further recess through which the at least second fixed guide rod is guided and optionally a further recess through which the optional third fixed guide rod is guided, wherein for example it is provided that the deviation of the position of the mold orthogonal to the movement direction of the mold is not more than 20 μm, for example not more than 15 μm, for example not more than 10 μm, from the target position of the mold orthogonal to the movement direction of the mold.

In an embodiment, it is provided for example that the first mold is moved by means of an actuator for moving the first mold in that the first mold and the actuator for moving the first mold are connected by means of a first movable guide rod and at least one second movable guide rod, for example at least one third movable guide rod, the first movable guide rod being guided in a recess of a fixed guide element, the second movable guide rod being guided in a recess of the fixed guide element, and the optional third movable guide rod being guided in a recess of the fixed guide element.

In a further embodiment, it is provided that the fixed guide element is the same as or is indirectly or directly fixed to the mold-side fixed connector.

In further embodiments, the first mold is a lower mold and/or the second mold is an upper mold.

In an embodiment, it is provided that the blank is placed on an annular or free-form support surface of a carrier body having a hollow cross section before pressing and is heated on the carrier body, for example in such a way that a temperature gradient is established in the blank in such a way that the blank is cooler in the interior than in its outer region. For example, it is provided that the support surface is cooled by means of a cooling medium flowing through the carrier body, whereby for example it is provided that the support surface spans a base surface which is not circular. For example, a geometry of the support surface or a geometry of the base surface of the support surface is provided which corresponds to the geometry of the blank (which is to be heated), the geometry being selected such that the blank rests on the outer region of its underside (underside base surface). The diameter of the underside or the underside base surface of the blank is at least 1 mm larger than the diameter of the base surface spanned (by the carrier body or its support surface). In this sense, it is particularly provided that the geometry of the surface of the blank facing the carrier body corresponds to the support surface or the base surface. This means for example that the part of the blank which rests on the carrier body or touches the carrier body during heating is arranged after the forming process or after the pressing or after the press molding in an edge region of the headlight lens which lies outside the optical path and which rests for example on a transport element (see further below) or its (corresponding) support surface.

An annular bearing surface may have small interruptions. For the purposes of the disclosure, a base surface is for example an imaginary surface (in the region of which the blank resting on the carrier body is not in contact with the carrier body) which lies in the plane of the support surface and is enclosed by this support surface, plus the support surface. For example, it is provided that the blank and the carrier body are matched to each other. This means for example that the blank rests with its edge region on the carrier body on its underside. An edge region of a blank can be understood to mean, for example, the outer 10% or the outer 5% of the blank or its underside.

A blank in the sense of the disclosure is for example a portioned glass part or a preform or a gob.

An optical element in the sense of the disclosure is for example a lens, for example a headlight lens or a lens-like freeform. An optical element in the sense of the disclosure is, for example, a lens or a lens-like free-form with, for example, a circumferential, interrupted or interrupted circumferential bearing edge. An optical element in the sense of the disclosure may be, for example, an optical element as described, for example, in WO 2017/059945 A1. WO 2014/114309 A1, WO 2014/114308 A1, WO 2014/114307 A1, WO 2014/072003 A1, WO 2013/178311 A1, WO 2013/170923 A1, WO 2013/159847 A1, WO 2013/123954 A1, WO 2013/135259 A1. WO 2013/068063 A1, WO 2013/068053 A1, WO 2012/130352 A1, WO 2012/072187 A2, WO 2012/072188 A1, WO 2012/072189 A2, WO 2012/072190 A2, WO 2012/072191 A2, WO 2012/072192 A1, WO 2012/072193 A2, WO 2017 215775 A1 is described. Each of these documents is incorporated by reference in its entirety. The claimed method is applied for example to non-symmetrical headlight lenses or to non-rotationally symmetrical headlight lenses. The claimed method is for example applied to headlight lenses with non-symmetrical contours or with non-rotationally symmetrical contours.

For example, the claimed method is used for headlight lenses without surface structures or without deliberately imprinted or shaped or provided surface structures or without (deliberately) soft-focus surface structures. The claimed method is for example used for headlight lenses without deterministic surface structures, such as disclosed in WO 2015/031925 A1, and for example without deterministic non-periodic surface structures, such as disclosed in DE 10 2011 114 636 A1. The claimed method or the disclosed method can also be used for optical elements or headlight lenses with surface structures.

In an embodiment, the base surface is polygonal or polygonal, but for example with rounded corners, it being provided for example that the underside base surface of the blank is also polygonal or polygonal, but for example with rounded corners. In a further embodiment, the base surface is triangular or triangular, for example, however, with rounded corners, wherein it is provided for example that the underside base surface of the blank is also triangular or triangular, for example, however, with rounded corners. In another embodiment, the base surface is rectangular or rectangular, for example, however, with rounded corners, it being provided for example that the lower side base surface of the blank is also rectangular or rectangular, for example, however, with rounded corners. In a further embodiment, the base surface is square, but for example with rounded corners, it being provided for example that the underside base surface of the blank is also square, but for example with rounded corners. In a further embodiment, the base surface is oval, it being provided for example that the underside base surface of the blank is also oval.

In a further embodiment, the carrier body is tubular at least in the region of the support surface. The carrier body consists (at least essentially), for example, of steel or high-alloy steel (i.e., for example, a steel in which the average mass content of at least one alloying element is ≥5%) or of a tube of steel or high-alloy steel. In a further embodiment, the diameter of the hollow cross-section of the carrier body or the inner diameter of the tube, at least in the region of the support surface, is not smaller than 0.5 mm and/or is not larger than 1 mm. In a further embodiment, the outer diameter of the carrier body or the tube outer diameter, at least in the region of the support surface, is not less than 2 mm and/or not greater than 4 mm, for example not greater than 3 mm. In a further embodiment, the radius of curvature of the support surface orthogonal to the direction of flow of the coolant is not less than 1 mm and/or not greater than 2 mm, for example not greater than 1.5 mm. In a further embodiment, the ratio of the diameter of the hollow cross-section of the carrier body at least in the region of the support surface to the outer diameter of the carrier body at least in the region of the support surface is not less than ¼ and/or not greater than ½. In a further embodiment, the carrier body is uncoated at least in the region of the support surface. In a further embodiment, coolant flows through the carrier body in the counter flow principle. In a further embodiment, the coolant is additionally or actively heated. In a further embodiment, the carrier body comprises at least two flow channels for the coolant flowing through, each of which extends only over a portion of the annular support surface, it being provided for example that two flow channels are connected with metallic filling material, for example solder, in a region in which they leave the support surface.

In a further embodiment, the optical element is placed on a transport element after press molding, exposed to the treatment atmosphere on the transport element, and then or subsequently passes through a cooling path with the transport element without touching an optical surface of the optical element. A cooling path in the sense of the disclosure serves for example for the controlled cooling of the optical element (for example with the addition of heat). Exemplary cooling regimes can be found in "Werkstoffkunde Glas", 1st edition, VEB Deutscher Verlag für Grundstoffindustrie. Leipzig VLN 152-915/55/75, LSV 3014, editorial deadline: Jan. 9, 1974, order number: 54107, e.g. page 130 and "Glastechnik—BG 1/1—Werkstoff Glas", VEB Deutscher Verlag für Grundstoffindustrie, Leipzig 1972, e.g. page 61ff (incorporated by reference in its entirety). Adherence to such a cooling regime is necessary to prevent internal stresses within the optical element or the headlight lens, which, although not visible during a visual inspection, in some cases significantly impair the photometric properties as an optical element or a headlight lens. These impairments cause a corresponding optical element or headlight lens to be unusable. Surprisingly, it has been found that exposing the hot optical element or the hot headlight lens to the treatment atmosphere according to the disclosure after press molding or after demolding following press molding changes the cooling regime, but that any resulting optical stresses are negligible. Also surprising is the fact that a corresponding headlight lens is within the optical tolerances specified above in terms of its optical properties, even though the refractive index is reduced due to the quartz glass content on the surface.

In an embodiment, the transport element is made of steel. For clarification, the transport element is not part of the lens (or headlight lens), or the lens (or headlight lens) and the transport element are not part of a common one-piece body.

In a further embodiment, the transport element is heated, for example inductively, before the optical element is picked up. In a further embodiment, the transport element is heated at a heating rate of at least 20 K/s, for example at least 30 K/s. In a further embodiment, the transport element is heated at a heating rate of not more than 50 K/s. In a further embodiment, the transport element is heated by a current-carrying winding/coil winding arranged above the transport element.

In a further embodiment, the optical element comprises a support surface which lies outside the intended light path for the optical element, wherein the support surface, for example only the support surface, is in contact with a corresponding support surface of the transport element when the optical element is placed on the transport element. In a further embodiment, the support surface of the optical element is located at the edge of the optical element. In a further embodiment, the transport element comprises at least one limiting surface for aligning the optical element on the transport element or for limiting or preventing movement of the optical element on the transport element. In one embodiment, the limiting surface or a limiting surface is provided above the corresponding support surface of the transport element. In a further embodiment, (at least) two boundary surfaces are provided, whereby it can be provided that one boundary surface lies below the corresponding support surface of the transport element and one boundary surface lies above the corresponding support surface of the transport element. In a further embodiment, the transport element is adapted, manufactured, for example milled, to the optical element or to the support surface of the optical element.

The transport element or the contact surface of the transport element is for example annular but for example not circular.

In further embodiments, the preform is made from molten glass, cast and/or molded. In a further embodiment, the mass of the preform is 20 g to 400 g.

In a further embodiment, the temperature gradient of the preform is adjusted such that the temperature of the core of the preform is above $10K+T_G$.

In a further embodiment, the preform is first cooled, for example with the addition of heat, and then heated in order to turn its temperature gradient, it being for example provided that the preform is heated in such a way that the temperature of the surface of the preform after heating is at least 100° K, for example at least 150° K, higher than the transformation temperature $T_G$ of the glass. The transformation temperature $T_G$ of the glass is the temperature at which the glass becomes hard. For the purposes of the disclosure, the transformation temperature $T_G$ of the glass is particularly intended to be the temperature of the glass at which the latter has a viscosity log in a range around 13.2 (corresponding to $10^{13.2}$ Pas), for example between 13 (corresponding to $10^{13}$ Pas) and 14.5 (corresponding to $10^{14.5}$ Pas). With respect to glass grade B270, the transformation temperature $T_G$ is approximately 530° C.

In a further embodiment, the temperature gradient of the preform is set such that the temperature of the upper surface of the preform is at least 30K, for example at least 50K, above the temperature of the lower surface of the preform. In a further embodiment, the temperature gradient of the preform is adjusted such that the temperature of the core of the preform is at least 50K below the temperature of the surface of the preform. In a further embodiment, the preform is cooled such that the temperature of the preform before heating is TG−80K to TG+30K. In a further embodiment, the temperature gradient of the preform is adjusted such that the temperature of the core of the preform is 450° C. to 550° C. For example, the temperature gradient is adjusted such that the temperature of the core of the preform is below $T_G$ or near $T_G$. In a further embodiment, the temperature gradient of the preform is adjusted such that the temperature of the surface of the preform is 700° C. to 900° C., for example 750° C. to 850° C. In a further embodiment, the preform is heated in such a way that its surface (for example immediately before pressing) assumes a temperature corresponding to the temperature at which the glass of the preform has a viscosity log between 5 (corresponding to $10^5$ Pas) and 8 (corresponding to $10^8$ Pas), for example a viscosity log between 5.5 (corresponding to $10^{5.5}$ Pas) and 7 (corresponding to $10^7$ Pas).

For example, it is provided that the preform is removed from a mold for forming or producing the preform before the temperature gradient is reversed. For example, it is provided that the reversal of the temperature gradient takes place outside a mold. For the purposes of the disclosure, cooling with the addition of heat is intended to mean for example that cooling is carried out at a temperature of more than 100° C.

For the purposes of the disclosure, the term "press molding" is to be understood for example as pressing a (for example optically effective) surface in such a way that subsequent finishing of the contour of this (for example optically effective) surface can be omitted or is omitted or is not provided for. It is thus particularly intended that a press molded surface is not ground after the press molding. Polishing, which does not affect the surface finish but the contour of the surface, may be provided. By press molding on both sides it is to be understood for example that a (for example optically effective) light exit surface is press molded and a (for example optically effective) light entrance surface for example opposite the (for example optically effective) light exit surface is also press molded.

In one embodiment, the blank is placed on an annular support surface of a carrier body with a hollow cross section and is heated on the carrier body, for example in such a way that a temperature gradient is established in the blank in such a way that the blank is cooler in the interior than in its outer region, the support surface being cooled by means of a cooling medium flowing through the carrier body, wherein the blank of glass is press molded after heating to the optical element, for example on both sides, wherein the carrier body comprises at least two flow channels for the cooling medium flowing through, each extending only over a portion of the annular support surface, and wherein two flow channels are connected with metallic filling material, for example solder, in a region in which they leave the support surface.

A guide rod as defined in the present disclosure may be a rod, tube, profile, or the like.

Fixed in the sense of this disclosure means for example directly or indirectly fixed to a foundation of the pressing station or the press or a foundation on which the pressing station or the press stands. Two elements in the sense of this disclosure are fixed to each other for example if for pressing it is not intended that they are moved relative to each other.

For pressing, the first and the second mold are for example moved towards each other in such a way that they form a closed mold or cavity or a substantially closed mold or cavity. Moving towards each other in the sense of this disclosure means for example that both molds are moved. However, it can also mean that only one of the two molds is moved.

A recess in the sense of the disclosure comprises for example a bearing which couples or connects the recess with the corresponding guide rod. A recess in the sense of the present disclosure can be extended to a sleeve or be designed as a sleeve. A recess in the sense of the present disclosure can be extended to a sleeve comprising an inner bearing or be designed as a sleeve comprising an inner bearing.

In a matrix headlight, the optical element or a corresponding headlight lens is used, for example, as a secondary lens for imaging an attachment optics. An attachment optics in the sense of this disclosure is arranged for example between the secondary optics and a light source arrangement. An attachment optics in the sense of the present disclosure is for example arranged in the light path between the secondary optics and the light source arrangement. An attachment optics within the meaning of the present disclosure is, for example, an optical component for shaping a light distribution as a function of light generated by the light source arrangement and irradiated by the latter into the attachment optics. In this context, the generation or shaping of a light distribution is performed, for example, by TIR, i.e., by total reflection.

The optical element according to the disclosure or a corresponding lens is also used, for example, in a projection headlight. In the design as a headlight lens for a projection headlight, the optical element or a corresponding headlight lens reproduces the edge of a shield in the form of a the bright-dark-boundary on the road.

Motor vehicle in the sense of the disclosure is for example a land vehicle which can be used individually in road traffic. Motor vehicles within the meaning of the disclosure are for example not limited to land vehicles with internal combustion engines.

DETAILED DESCRIPTION OF THE DRAWINGS

Figure 1A:
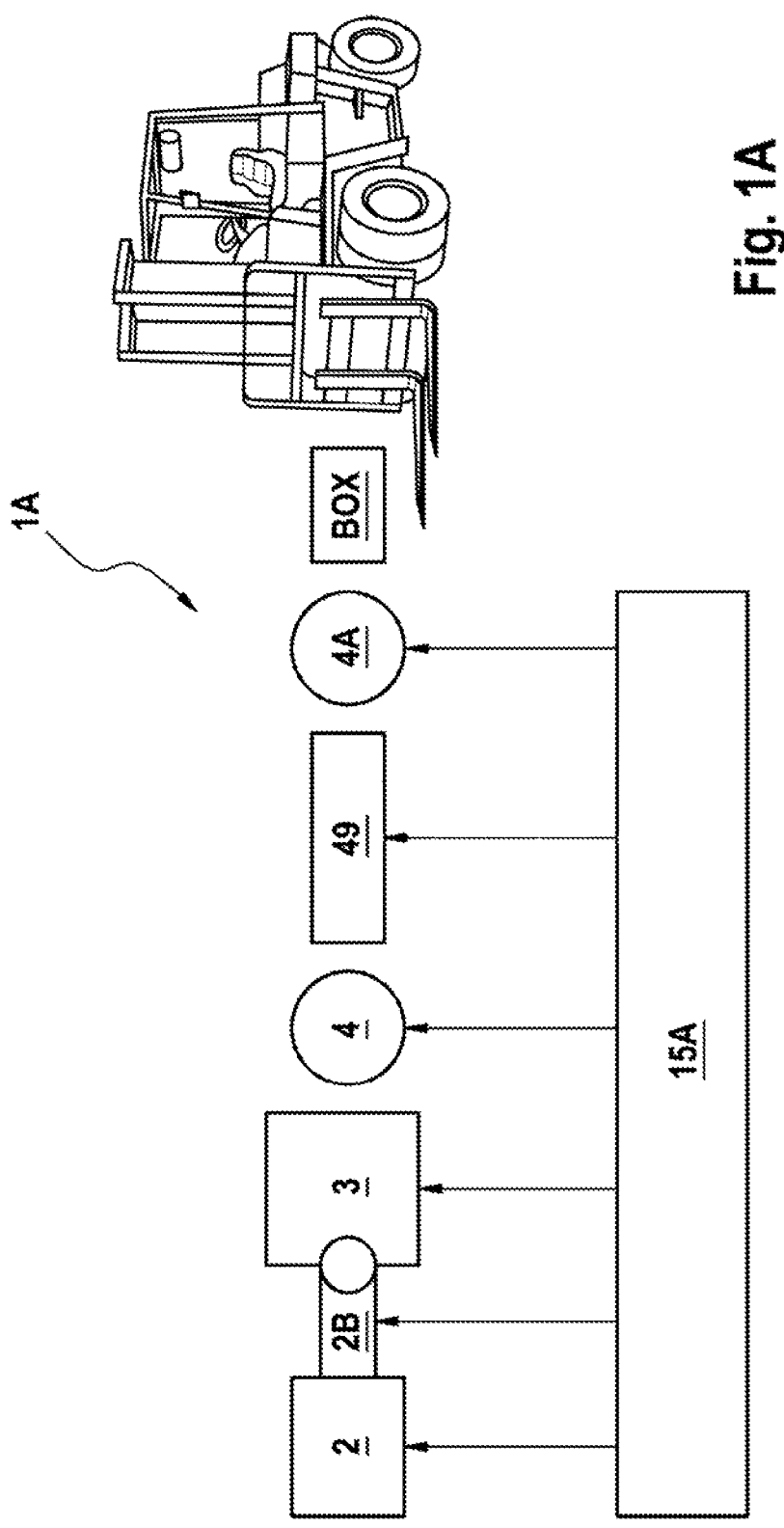
FIG. 1A shows a schematic view of a device for producing gobs or optical elements made of glass.

FIG. 1 as well as FIG. 1A and FIG. 18 show a device 1 or 1A and 1B—shown in a principle representation—for carrying out a method shown in FIG. 2A or FIG. 26 for producing optical elements, such as e.g. optical lenses, such as motor vehicle headlight lenses, e.g., such as the (motor vehicle) headlight lens 202 shown in FIG. 34—in a principle representation—or (lens-like) freeforms, for example for motor vehicle headlights, for example the use thereof as described below with reference to FIG. 45.

FIG. 34 shows a schematic diagram of a motor vehicle headlight 201 (projection headlight) of a motor vehicle 20, having a light source 210 for generating light, a reflector 212 for reflecting light that can be generated by means of the light source 210, and a shield 214.

The motor vehicle headlight 201 also comprises a headlight lens 202 for imaging an edge 215 of the shield 214 as a bright-dark-boundary 220 for light that can be generated by means of the light source 210. Typical requirements placed on the bright-dark-boundary or on the light distribution taking into account or incorporating the bright-dark-boundary are disclosed, for example, in Bosch—Automotive Handbook, $9^{th}$ edition, ISBN 978-1-119-03294-6, page 1040. A headlight lens in within the meaning of the disclosure is, for example, a headlight lens by means of which a bright-dark-boundary can be generated, and/or a headlight lens by means of which the requirements according to Bosch—Automotive Handbook, $9^{th}$ edition, ISBN 978-1-119-03294-6 (incorporated by reference in its entirety), page 1040 can be met. The headlight lens 202 comprises a lens body 203 made of glass, which comprises a substantially planar (for example optically effective) surface 205 facing the light source 210 and a substantially convex (for example optically effective) surface 204 facing away from the light source 210. The headlight lens 202 further comprises a (for example circumferential) edge 206, by means of which the headlight lens 202 may be fixed in the motor vehicle headlight 201. The elements in FIG. 34 are drawn with simplicity and clarity in mind, and not necessarily to scale. For example, the dimensions of some elements are exaggerated relative to other elements to enhance understanding of the embodiment of the present disclosure.

FIG. 35 shows the headlight lens 202 from below. FIG. 36 shows a cross-section through an embodiment of the headlight lens. FIG. 37 shows a detail of the headlight lens 202 marked in FIG. 36 by a dash-dotted circle. The planar (for example optically effective) surface 205 projects in the form of a step 260 in the direction of the optical axis 230 of the headlight lens 202 beyond the lens edge 206 or beyond the surface 261 of the lens edge 206 facing the light source 210, wherein the height h of the step 260 being, for example, not more than 1 mm, for example not more than 0.5 mm. For example, the nominal value of the height h of the step 260 is 0.2 mm.

The thickness r of the lens edge 206 according to FIG. 36 is at least 2 mm but not more than 5 mm. According to FIG. 35 and FIG. 36, the diameter DL of the headlight lens 202 is at least 40 mm but not more than 100 mm. The diameter DB of the substantially planar (for example optically effective) surface 205 is equal to the diameter DA of the convexly curved optically effective surface 204. In an embodiment, the diameter DB of the substantially planar optically effective surface 205 is not more than 110% of the diameter DA of the convexly curved optically effective surface 204. Moreover, the diameter DB of the substantially planar optically effective surface 205 is for example at least 90% of the diameter DA of the convexly curved optically effective surface 204. For example, the diameter DL of the headlight lens 202 is about 5 mm larger than the diameter DB of the substantially planar optically effective surface 205 or the diameter DA of the convexly curved optically effective surface 204. The diameter DLq of the headlight lens 202 orthogonal to DL is at least 40 mm but not more than 80 mm and is smaller than the diameter DL. For example, the diameter DLq of the headlight lens 202 is about 5 mm larger than the diameter DBq orthogonal to DB.

FIG. 39 shows an adaptive headlight or vehicle headlight F20 for situation-dependent or traffic-dependent illumination of the surroundings or the roadway in front of the motor vehicle 20 depending on a surround sensor system F2 of the motor vehicle 20. For this purpose, the vehicle headlight F20 shown schematically in FIG. 39 has an illumination device F4 which is activated by means of a controller F3 of the vehicle headlight F20. Light L4 generated by the illumination device F4 is emitted from the vehicle headlight F20 as an illumination pattern L5 by means of an objective F5, which may comprise one or more optical lens elements or headlight lenses. Examples of corresponding illumination patterns are shown in FIG. 40 and FIG. 41, as well as the websites web.archive.org/web/20150109234745/http://www.audi.de/content/de/brand/de/vorsprung_durch_technik/content/2013/08/Audi-AB-erstraht-in-neuem-Licht.html (accessed Sep. 5, 2019) and www.all-electronics.de/matrix-led-und-laserlicht-bietet-viele-vorteile/ (accessed Sep. 2, 2019). In the embodiment shown in FIG. 41, the illumination pattern L5 includes dazzled areas L51, dimmed areas L52, and cornering lights L53.

FIG. 42 shows an embodiment for the illumination device F4, wherein it comprises a light source assembly F41 with a plurality of individually adjustable areas or pixels. For example, up to 100 pixels, up to 1000 pixels, or not less than 1000 pixels may be provided, which in the sense are individually controllable by means of the controller F3 such that they can be individually switched on or off, for example. It may be provided that the illumination device 4 further comprises an attachment optics F42 for generating an illumination pattern (such as e.g. L4) at the light emitting surface F421 in accordance with the correspondingly controlled areas or pixels of the light source arrangement F41 or in accordance with the light L41 irradiated into the attachment optics F42.

Matrix headlights within the meaning of the present disclosure may also be matrix SSL HD headlights. Examples of such headlights are shown in the Internet link www.springerprofessional.de/fahrzeug-lichttechnik/fahrzeugsicherhei/hella-bringt-neues-ssl-hd-matrixlichtsystem-auf-den-markt/17182758 (accessed May 28, 2020), the Internet link www.highlight-web.de/5874/helia-ssi-hd/ (accessed May 28, 2020), and the Internet link www.hella.com/techworld/de/Lounge/Unser-Digital-Light-SSL-HD-Licht-system-ein-neuerMeilenstein-der-automobilen-Lichttechnik-55548/ (accessed May 28, 2020).

FIG. 43 shows a one-piece attachment optics array V1 in a side view. FIG. 44 shows the attachment optics array V1 in a top view from behind. The attachment optics array V1 includes a base member V20 and attached thereto are lenses V2011, V2012, V2013, V2014, and V2015 and an attachment optics V11 having a light entrance surface V111, an attachment optics V12 having a light entrance surface V121, an attachment optics V13 having a light entrance surface V131, an attachment optics V14 having a light entrance surface V141, and an attachment optics V15 having a light entrance surface V151. The side surfaces V115, V125. V135, V145, V156 of the attachment optics V11, V12, V13, V14, V15 are press molded and designed in such a way that light which enters the respective light entrance surface V111, V121, V131, V141 or V151 by means of a light source is subjected to total reflection (TIR), such that this light emerges from the base part V20 or the surface V21 of the base part V20, which forms the common light exit surface of the attachment optics V11, V12, V13, V14 and V15. The rounding radii between the light entrance surfaces V111, V121, V131, V141 and V151 at the transition to the side surfaces V115, V125, V135, V145 and V 155 are, for example, 0.16 to 0.2 mm.

FIG. 45 shows a vehicle headlight V201 or motor vehicle headlight in a principle representation. The vehicle headlight V201 comprises a light source arrangement VL, for example comprising LEDs, for irradiating light into the light entrance surface V111 of the attachment optics V11 or the light entrance surfaces V121, V131, V141 and V151 of the attachment optics V12, V13, V14 and V15, which are not shown in greater detail. In addition, the vehicle headlight V201 comprises a secondary lens V2 for imaging the light exit surface V21 of the attachment optics array V1.

Another suitable field of application for lenses produced according to the disclosure is disclosed, for example, in DE 10 2017 105 888 A1 or the headlight described with reference to FIG. 46. Thereby. FIG. 46 exemplarily shows a light module (headlight) M20 comprising a light emitting unit M4 with a plurality of point-shaped light sources arranged in a matrix-like manner, each emitting light ML4 (with a Lambertian radiation characteristic), and further comprising a concave lens M5 and a projection optics M6. In the example shown in DE 10 2017 105 888 A1 according to FIG. 46, the projection optics M6 comprises two lenses arranged one behind the other in the beam path, which have been manufactured according to a method corresponding to the aforementioned method. The projection optics M6 reproduces the light ML4 emitted by the light emitting unit M4 and, after passing through the concave lens M5, further shaped light ML5 as a resulting light distribution ML6 of the light module M20 on a roadway in front of the motor vehicle in which the light module or the headlight is (have been) installed.

The light module M20 has a controller designated with reference sign M3, which controls the light emitting unit M4 as a function of the values of a sensor system or surround sensor system M2. The concave lens M5 has a concavely curved exit surface on the side facing away from the light emitting unit M4. The exit surface of the concave lens M5 deflects light ML4 irradiated into the concave lens M5 by the light emitting unit M4 with a large irradiation angle toward the edge of the concave lens by means of total reflection, such that said light is not transmitted through the projection optics M6. According to DE 10 2017 105 888 A1, light beams emitted at a 'large emission angle' by the light emitting unit M4 are referred to as those light beams which (without arrangement of the concave lens M5 in the beam path) would be poorly imaged, for example blurred, on the roadway by means of the projection optics M6 due to optical aberrations and/or which could lead to stray light which reduces the contrast of the image on the roadway (see also DE 10 2017 105 888 A1). It may be provided that the projection optics M6 can only sharply image light with an aperture angle limited to approximately +/−20°. Light beams with aperture angles greater than +/20°, for example greater than +/−30°, are thus prevented from hitting the projection optics M6 by the arrangement of the concave lens M5 in the beam path.

The light emitting unit M4 may be designed differently. According to one embodiment, the individual point-shaped light sources of the light emitting unit M4 each comprise a semiconductor light source, for example a light emitting diode (LED). The LEDs may be selectively controlled individually or in groups to switch the semiconductor light sources on or off or to dim them. For example, the light module M20 comprises more than 1,000 individually controllable LEDs. For example, the light module M20 may be designed as a so-called μAFS (micro-structured adaptive front-lighting system) light module.

According to an alternative option, the light emitting unit M4 comprises a semiconductor light source and a DLP or micromirror array comprising a plurality of micromirrors that can be individually controlled and tilted, each of the micromirrors forming one of the point light sources of the light emitting unit M4. For example, the micromirror array comprises at least 1 million micromirrors that may be tilted, for example, at a frequency of up to 5,000 Hz.

Another example of a headlight system or light module (DLP system) is disclosed by the Internet link www.al-lighting.com/newslarticle/digital-light-millions-of-pixels-on-the-road/ (accessed Apr. 13, 2020). A schematically illustrated corresponding headlight module or vehicle headlight for generating an illumination pattern designated GL7A in FIG. 48 is shown in FIG. 47. The adaptive headlight G20 schematically illustrated in FIG. 47 for illuminating the surroundings or roadway in front of the motor vehicle 20 depending on the situation or traffic as a function of a surround sensor system G2 of the motor vehicle 20. Light GL5 generated by the illumination device G5 is shaped into an illumination pattern GL6 by means of a system of micromirrors G6, as also shown for example in DE 10 2017 105 888 A1, which in turn radiates light GL7 suitable for adaptive illumination in front of the motor vehicle 20 or in an environment on the roadway in front of the motor vehicle 20 by means of projection optics G7. A suitable system G6 of movable micromirrors is disclosed by the link www.al-lighting.com/news/artide/digital-light-millions-of-pixels-on-the-road/ (accessed Apr. 13, 2020).

A controller G4 is provided for controlling the system G6 comprising movable micromirrors. In addition, the headlight G20 includes a controller G3 both for synchronization with the controller G4 and for controlling the illumination device G5 in response to surround sensor system G2. Details of the controllers G3 and G4 can be obtained from the Internet link www.al-lighting.com/news/article/digital-light-millions-of-pixels-on-the-road/ (accessed Apr. 13, 2020). The illumination device G5 may comprise, for example, an LED arrangement or a comparable light source arrangement, an optical system such as a field lens (which, for example, has also been produced according to the above-described method), and a reflector.

The vehicle headlight G20 described with reference to FIG. 47 may be used for example in conjunction with other headlight modules or headlights to achieve a superimposed overall light profile or illumination pattern. This is shown by way of example in FIG. 49, where the overall illumination pattern is composed of the lighting patterns GL7A, GL7B and GL7C. For example, the illumination pattern GL7 B may be generated by means of the headlight 20 and the illumination pattern GL7C can be generated by means of the headlight V201.

Sensor technology for the aforementioned headlights comprises for example a camera and an evaluation or pattern recognition system for evaluating a signal supplied by the camera. A camera comprises for example an objective lens or a multi-lens objective and an image sensor for imaging an image generated by the objective on the image sensor. In a particularly suitable manner, a lens such as that disclosed in U.S. Pat. No. 8,212,689 B2 (incorporated by reference in its entirety) and shown by way of example in FIG. 50 is used. Such an objective is particularly suitable because of the avoidance or considerable reduction of reflected images, since by means of such an objective it is possible, for example, to avoid confusion of a reflected image of an oncoming vehicle with light with a vehicle ahead with light. A suitable objective, for example for infrared light and/or visible light, images an object in an image plane, wherein, with respect to the imaging of an object, it is applicable for each point within the image circle of the lens or for at least one point within the image circle of the lens, Pdyn≥270 dB, for example Pdyn≥80 dB, for example Pdyn≥290 dB, where Pdyn as illustrated in FIG. 51 is equal to 10·log(Pmax/Pmn), wherein Pmax is the maximum light power of a point in the image plane for imaging a point of the object, and wherein Pmin is the light power of another point in the image plane for imaging the point of the object, whose light power with respect to imaging the point of the object is greater than the light power of any further point in the image plane with respect to imaging the point of the object, or where Pmin is the maximum light power of the reflected image signals of the point of the object imaged in a further point. The lenses or a part of the lenses of the objective shown in FIG. 50 can be produced according to the claimed or disclosed method, it being provided for example that the correspondingly manufactured lenses have a circumferential or partially circumferential edge in deviation from the representation in FIG. 50.

Another example of the use of the method described below is the production of microlens arrays, for example microlens arrays for projection displays. Such a microlens array or its use in a projection display is shown in FIG. 52. Such microlens arrays or projection displays are described, for example, in WO 2019/072324, DE 10 2009 024 894, DE 10 2011 076 083 and DE 10 2020 107 072. The microlens array according to FIG. 52 is a one-piece (from a gob) pressed glass part, which integrally combines the substrate or carrier P403 and the projection lenses P411, P412, P413, P414, P415. Moreover, the projection lenses P411, P412, P413, P414, P415 are arranged following a concave contour or a parabolic contour with respect to each other. Due to this arrangement, for example, the optical axis P4140 of the projection lenses such as the projection lens P414 is tilted with respect to the orthogonal P4440 of the object structure P444 (see below). On one of the sides of the carrier P403 facing away from the projection lenses P411, P412, P413, P414, P415, a metal mask P404 is arranged, wherein said mask comprises recesses in which object structures P441, P442, P443, P444 and P445 are arranged. An illumination layer P405 is arranged above the object structures. It may also be provided that the illumination layer P405 comprises a transparent electrode, a light-emitting layer, and a reflective back electrode. Furthermore, a light source such as disclosed in U.S. Pat. No. 8,998,435 B2 may be considered as an alternative illumination means.

Figure 2A:
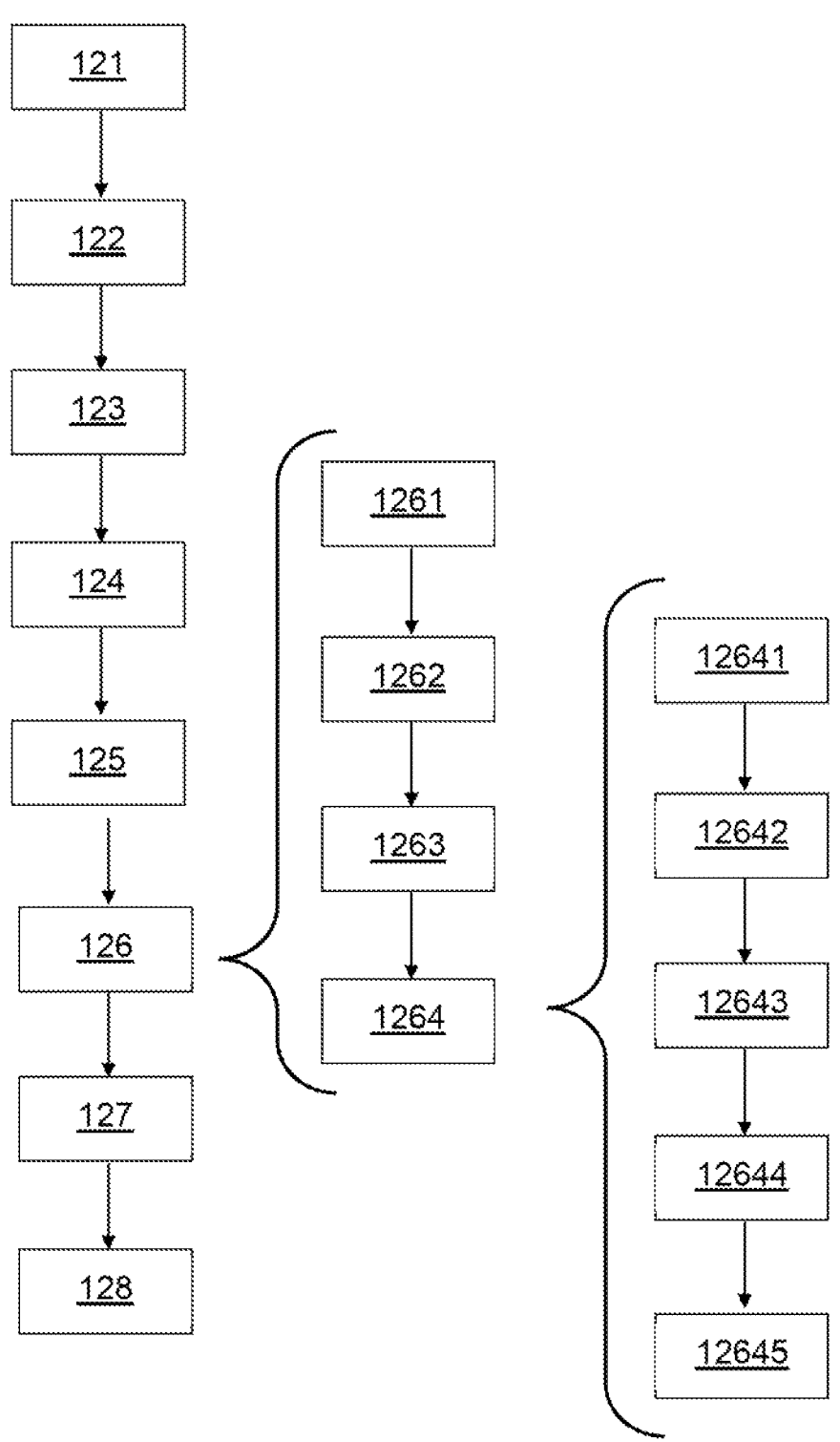
FIG. 2A shows an exemplary sequence of a process for producing motor vehicle headlight lenses or lens-like free-forms for a motor vehicle headlight or optical elements made of glass.

The device 1 according to FIG. 1 for producing optical elements such as the headlight lens 202 comprises a melting unit 2, such as a trough, in which soda-lime glass, in the present embodiment DOCTAN®, is melted in a process step 120 according to FIG. 2A. The melting unit 2 may comprise, for example, an adjustable outlet 28. From the melting unit 2, liquid glass is transferred in a process step 121 to a preform device 3 for producing a preform, such as a gob, or a close to end contour preform (a close to end contour preform has a contour that is similar to the contour of the motor vehicle headlight lens or lens-like freeform for motor vehicle headlight to be pressed), for example having a mass of 10 g to 400 g, for example a mass of 50 g to 250 g. This may include, for example, molds into which a defined quantity of glass is poured. By means of the preform device 3, the preform is produced in a process step 122.

The process step 122 is followed by a process step 123, in which the preform is transferred to the cooling apparatus 5 by means of a transfer station 4 and is cooled by means of the cooling apparatus 5 at a temperature between 300° C. and 500° C., for example between 350° C. and 450° C. In the present embodiment example, the preform is cooled for more than 10 minutes at a temperature of 400° C. so that its temperature in the interior is approximately 500° C. or more, for example 600° C. or more, for example $T_G$ or more.

In a subsequent process step 124, the preform is heated by means of the heating apparatus 6 at a temperature not lower than 700° C. and/or not higher than 1600° C., for example between 1000° C. and 1250° C., it being for example provided that the preform is heated in such a way that the temperature of the surface of the preform after heating is at least 100° C., for example at least 150° C., higher than $T_G$ and for example is 750° C. to 900C, for example 780° C. to 850° C. A combination of the cooling apparatus 5 with the heating apparatus 6, is an example of a temperature control unit for adjusting the temperature gradient.

Figure 15:
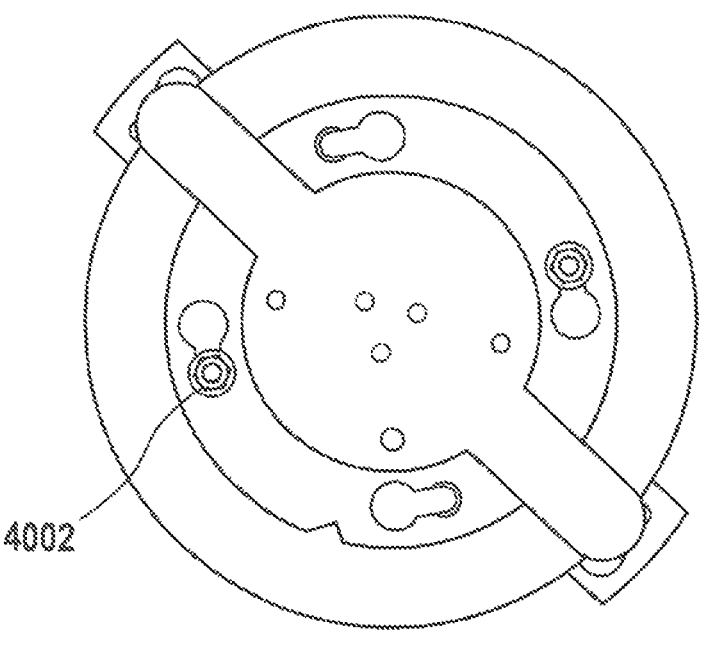
FIG. 15 shows a view of the hood-type annealing furnace according to FIG. 14 from below.

In one embodiment, this temperature control unit or the combination of heating apparatus 5 and 6 is designed as a hood-type annealing furnace 5000, as shown in FIG. 14. FIG. 14 shows a preform to be heated in the form of a gob 4001 on a support device 400 in the form of a lance. Heating coils 5001 are provided for heating the gob 4001. To protect these heating coils 5001 from bursting of a defective gob, the interior of the hood-type annealing furnace 5000 is lined with a protective cap 5002. FIG. 15 shows a view of the hood-type annealing furnace 5000 according to FIG. 14 from below. FIG. 16 shows a cross-section through the protective cap 5002 according to FIG. 14, FIG. 17 shows a view into the interior of the protective cap 5002 according to FIG. 14. In the embodiment according to FIG. 14, this protective cap 5002 is cup-shaped. In this case, the protective cap 5002 has a cylindrical region 5112 which merges into a covering region 5122 via a rounded region 5132. The radius of curvature of the curved region 5132 is, for example, between 5 mm and 20 mm. In the embodiment example according to FIG. 16, the radius of curvature of the curved region 5132 is approximately 10 mm. The protective cap 5002 is secured in the hood-type annealing furnace 5000 and fixed by a nut 4002. In another preferred embodiment, a bayonet lock is provided by means of which the replacement of a protective cap can be performed even more quickly.

Figures 19, 20, 21, 22, 23:
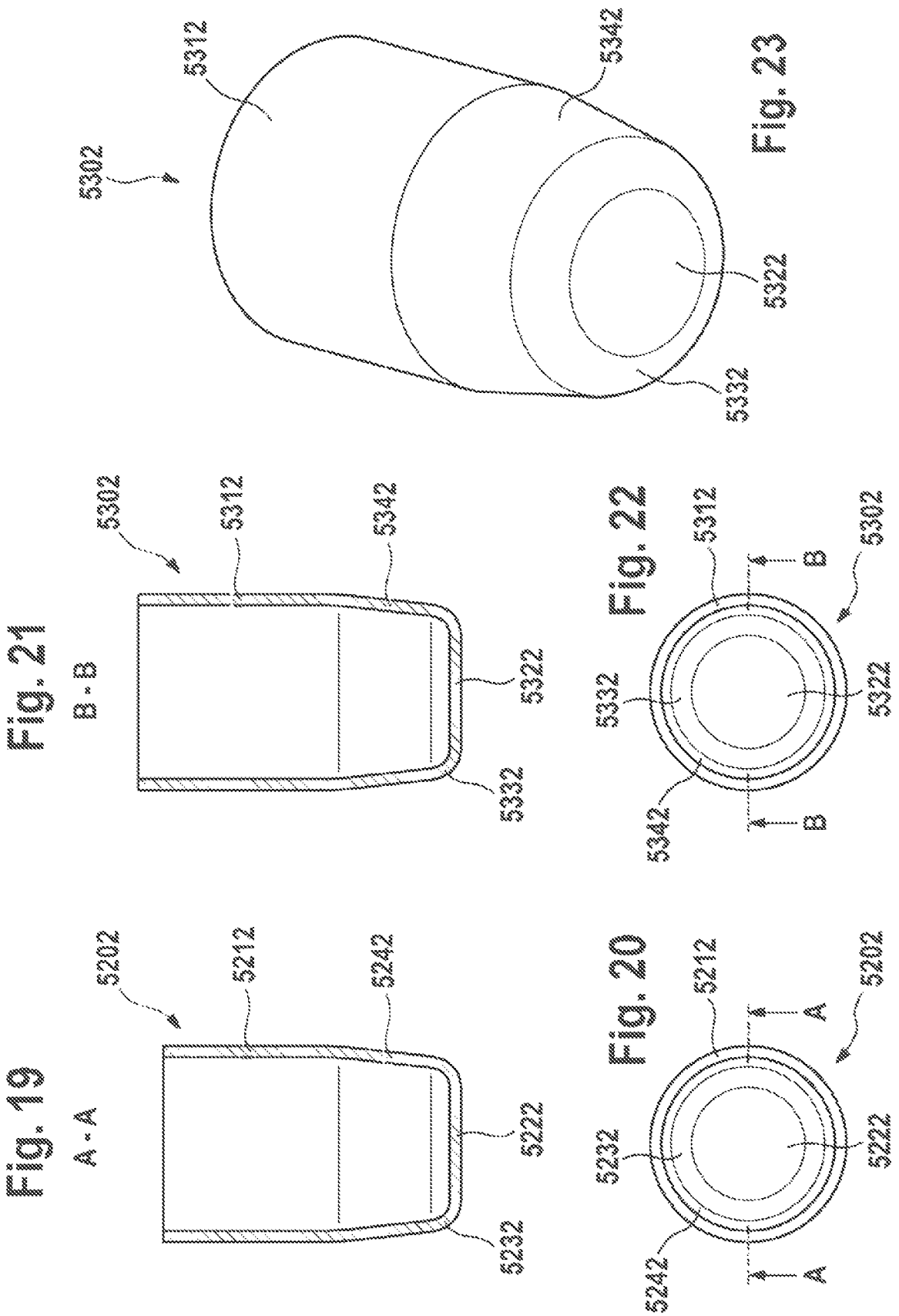
FIG. 19 shows a cross-section through another protective cap.
FIG. 20 shows a view into the interior of the protective cap according to FIG. 19.
FIG. 21 shows a cross-section through another protective cap.
FIG. 22 shows a view into the interior of the protective cap according to FIG. 21.
FIG. 23 shows a perspective view of the protective cap according to FIG. 21.

FIG. 19 shows a cross-section through an embodiment of a further protective cap 5202. FIG. 20 shows a view into the interior of the protective cap 5202 according to FIG. 19. The protective cap 5202 is also cup-shaped, but in addition to a cylindrical region 5212 also has a conical region 5242. The conical region 5242 transitions to a covering region 5222 via a curvature 5232. The conical region 5242 defines a volume that is between 30% and 50% of the volume of the cavity of the protective cap 5202.

FIG. 21 shows a cross-section through an embodiment of a further protective cap 5302, FIG. 22 shows a view into the interior of the protective cap 5302 according to FIG. 21, FIG. 23 shows a perspective view of the protective cap 5302. The protective cap 5302 is also cup-shaped, but in addition to a cylindrical region 5312 also has a conical region 5342. The conical region 5342 transitions to a covering region 5322 via a curvature 5332. The conical region 5342 defines a volume that is between 30% and 50% of the volume of the cavity of the protective cap 5302.

The protective caps 5002, 5202, 5302 have the particular purpose of protecting the heating coils 5001 in the furnace from shattering glass. If a gob bursts in the furnace without this protective cap, part or a large part of the glass remains stuck to the heating coils 5001 and thus significantly disturbs the heating process of the next gobs or even destroys the heating coils 5001 and thus the complete function of the furnace. The protective caps 5002, 5202, 5302 are removed after a gob burst and replaced by other protective caps. The protective caps 5002, 5202, 5302 are adapted to the size of the furnace.

The heating coil 5001 may consist of or comprise several independently controllable heating coils 5001A and 5001B.

Because said coils are independently controllable, a particularly suitable, for example homogeneous, temperature (distribution) may be obtained within the furnace or within the protective caps 5002, 5202, 5303. The protective caps 5002, 5202, 5303 contribute to this desired temperature distribution in addition to their function of reducing the extent of gob bursting. For example, the protective caps consist of or comprise silicon carbide.

Figure 5:
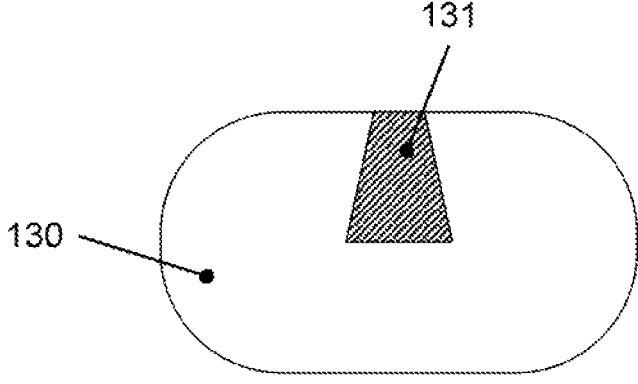
FIG. 5 shows an exemplary preform before entering a temperature control unit.
Figure 6:
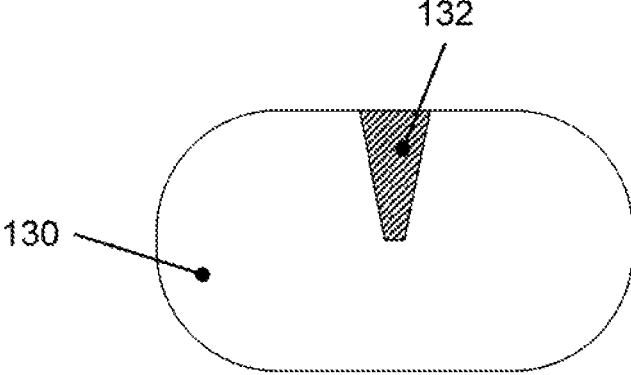
FIG. 6 shows an exemplary preform with an inverted temperature gradient after leaving a temperature control unit.

The process steps 123 and 124 are coordinated with each other—as explained below with reference to FIG. 5 and FIG. 6—in such a way that a reversal of the temperature gradient is obtained. FIG. 5 shows an exemplary preform 130 before entering the cooling apparatus 5 and FIG. 15 shows the preform 130 with a reversed temperature gradient after leaving the heating apparatus 6. While the blank is warmer on the inside than on the outside before process step 123 (with a continuous temperature curve), it is warmer on the outside than on the inside after process step 124 (with a continuous temperature curve). The wedges designated by reference signs 131 and 132 symbolize the temperature gradients, with the width of a wedge 131 or 132 symbolizing a temperature.

In order to turn over its temperature gradient, in an embodiment a preform lying on a cooled lance not shown is moved (for example essentially continuously) through the temperature control unit comprising the cooling apparatus 5 and the heating apparatus 6 or is held in one of the cooling apparatus 5 and/or one of the heating apparatus 6. A cooled lance is disclosed in DE 101 00 515 A1 and in DE 101 16 139 A1. Depending on the shape of the preform, FIG. 3 and FIG. 4 for example show suitable lances. For example, coolant flows through the lance in countercurrent flow. Alternatively or additionally, the coolant can be additionally or actively heated.

For the term "lance", the term "support device" is also used in the following. The support device 400 shown in FIG. 3 comprises a carrier body 401 with a hollow cross-section and an annular support surface 402. The carrier body 401 is tubular at least in the region of the support surface 402 and is uncoated at least in the region of the support surface 402. The diameter of the hollow cross-section of the carrier body 401 is not smaller than 0.5 mm and/or not larger than 1 mm, at least in the region of the support surface 402. The outer diameter of the carrier body 401 is not smaller than 2 mm and/or not larger than 3 mm at least in the area of the support surface The support surface 402 spans a square base surface 403 with rounded corners. The carrier body 401 comprises two flow channels 411 and 412 for the cooling medium flowing through, each of which extends only over a portion of the annular support surface 402, the flow channels 411 and 412 being connected in a region in which they leave the support surface 402 by metallic filler material 421 and 422, for example solder.

Figures 3, 4:
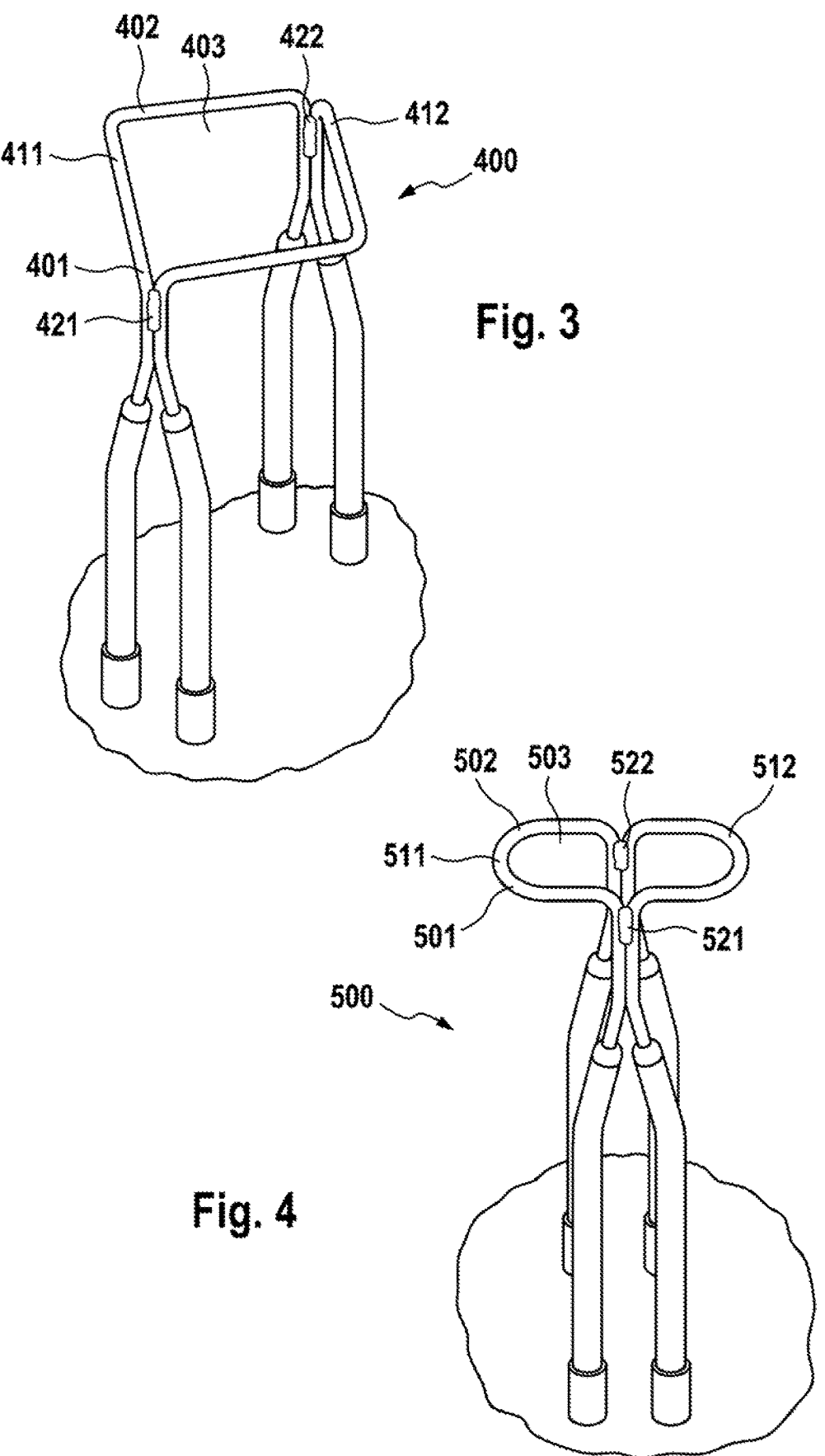
FIG. 3 shows an embodiment of a lance.
FIG. 4 shows another embodiment of a lance.

The support device 500 shown in FIG. 4 comprises a carrier body 501 with a hollow cross-section and an annular support surface 502. The carrier body 501 is tubular at least in the region of the support surface 502 and is uncoated at least in the region of the support surface 502. The diameter of the hollow cross-section of the carrier body 501 is not smaller than 0.5 mm and/or not larger than 1 mm, at least in the region of the support surface 502. The outer diameter of the carrier body 501 is not smaller than 2 mm and/or not larger than 3 mm at least in the area of the support surface The support surface 502 spans an oval base surface 503. The carrier body 501 comprises two flow channels 511 and 512 for the cooling medium flowing through, each of which extends only over a portion of the annular support surface

502, the flow channels 511 and 512 being connected in a region in which they leave the support surface 502 with metallic filler material 521 and 522, for example solder.

It may be provided that preforms are removed after passing through the cooling apparatus 5 (as a cooling path) and are fed by means of a transport device 41, for example to an intermediate store (e.g. in which they are stored at room temperature). In addition, it can be provided that preforms are fed to the transfer station 4 by means of a transport device 42 and are phased into the further process (for example starting from room temperature) by heating in the heating apparatus 6.

Deviating from the process described with reference to FIG. 2A, in the process described with reference to FIG. 2B, process step 121 is followed by process step 122', in which the cast gobs are transferred—by means of a transfer station 4—to a cooling path 49 of the device 1A shown in FIG. 1A. Cooling path in this sense is for example a conveyor device, such as a conveyor belt, through which a gob is guided and cooled in the process, for example with the addition of heat. The cooling is carried out to a certain temperature above room temperature or to room temperature, the gob being cooled down to room temperature in the cooling path 49 or outside the cooling path 49. It is provided, for example, that a gob in the cooling path 49 lies on a support comprising graphite or graphite.

Figure 2B:
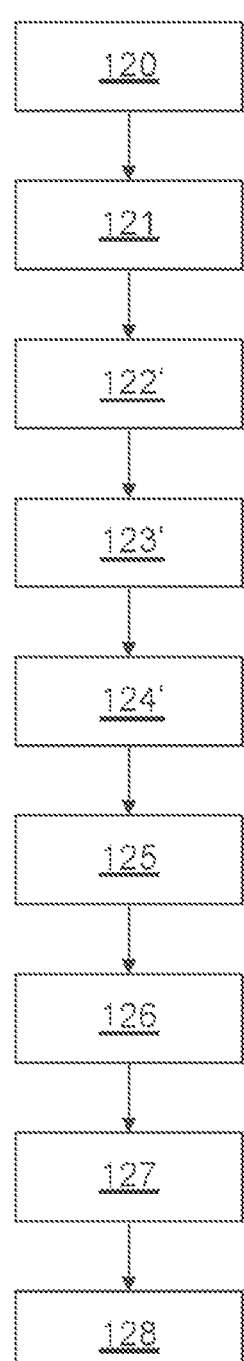
FIG. 2B shows an alternative sequence of a process for producing motor vehicle headlight lenses or lens-like free-forms for a motor vehicle headlight or optical elements made of glass.

In the subsequent process step 123' according to FIG. 2B, the gobs are fed to a device 1B. The devices 1A and 1B may be located in close proximity to each other or further away. In the latter case, a transfer station 4A transfers the gobs from the cooling path 49 into a transport container BOX. The gobs are transported in the transport container BOX to the device 16, in which a transfer station 4B removes the gobs from the transport container BOX and transfers them to a hood-type annealing furnace 5000. The gobs are heated in the hood-type annealing furnace 5000 (process step 124').

Flat gobs, wafers, or wafer-like preforms can also be used to fabricate microlens arrays. Such wafers can be square, polygonal or round, for example, with a thickness of 1 mm to 10 mm and/or a diameter of 4 inches to 5 inches. In a departure from the process described so far, these preforms are not heated on support devices as shown in FIG. 3 and FIG. 4, but are clamped in place as shown in FIG. 53. Here, reference sign T1 denotes a flat preform or wafer and reference signs T2 and T3 denote clamping devices for damping the flat preform T1 or wafer. In this clamping arrangement T5 comprising the clamping devices T2 and T3, this flat preform is heated in a heating device, such as, for example, the hood-type annealing furnace 5000. It may be provided that this preform T1 is not inserted into the heating device from below but laterally. It is further for example provided that the clamped flat preform T1 rotates in the heating device to prevent deflection of the flat preform T1. Thereby, the preform T1 is heated, for example rotating, in the heating device until the heated preform T1 can be pressed. The preform T1 is then placed in a, for example rotating, movement on a pressing mold described in more detail below, whereby the damping devices T 2 and T 3 of the clamping arrangement T 4 are opened so that the preform T1 rests on the pressing mold. During the pressing process, the clamping devices T 2 and T 3 may remain in the press. After the pressing process, the damping devices T 2 and T 3 again grip the pressed preform T1 and convey the preform T1 to an area outside the press.

A press 8 is provided downstream of the heating apparatus 6 or 5000, to which a preform is transferred by means of a transfer station 7. By means of the press 8, the preform is press molded, for example on both sides, in a process step 125 to form an optical element such as the headlight lens 202. A suitable mold set is disclosed, for example, in EP 2 104 651 61. FIG. 24 shows a principle sketch of a pressing station PS for pressing an optical element from a heated blank. The pressing station PS is a part of the press 8 according to FIG. 1 and FIG. 1B. The pressing station PS comprises an upper pressing unit PO and a lower pressing unit PU. For pressing, a mold OF (upper mold), which is moved by means of a press drive or by means of an actuator O10, and a mold UF (lower mold), which is moved by means of a press drive or by means of an actuator U10, are moved towards each other. The mold UF is connected to a movable connector U12 on the mold side, which in turn is connected to a movable connector U11 on the actuator side by means of movable guide rods U51, U52. The actuator U10 is in turn connected to the actuator-side movable connector U11, such that the mold UF is moveable by means of the actuator U10. The movable guide rods U51 and U52 extend through recesses of a fixed guide element UO in such a way that a deflection or movement of the movable guide rods U61 and U52 and thus of the mold UF perpendicular to the direction of movement is avoided or reduced or limited.

The pressing unit PO comprises an actuator O10, which moves the mold OF and is connected to a movable guide element O12. The pressing unit PO also comprises a frame formed by an actuator-side fixed connector O11 and a mold-side fixed connector O14 as well as fixed guide rods O51 and O52, which connect the actuator-side fixed connector O11 to the mold-side fixed connector O14. The fixed guide rods O51 and O52 are guided through recesses of the movable guide element O12 so that they prevent, reduce or avoid movement or deflection of the mold OF orthogonal to the direction of travel of the actuator O10 or the mold OF.

In the embodiment shown, the PO and PU pressing units are linked in that the fixed guide element UO is the same as the fixed connector O14 on the mold side. This linking or interlinking of the two pressing units PO and PU of the pressing station PS achieves a particularly high quality (especially in terms of contour accuracy) of the headlight lenses to be pressed.

The pressing station 800 comprises a lower pressing unit 801 and an upper pressing unit 802 (see FIG. 25), wherein FIG. 25 shows an embodiment of a pressing station 800 by means of which optical elements, such as headlight lenses, can be pressed in a particularly preferred and suitable manner. The pressing station 800 is an embodiment of the pressing station PS of FIG. 24, the pressing unit 801 is an embodiment of the lower pressing unit PU of FIG. 24, and the pressing unit 802 is an embodiment of the upper pressing unit PO of FIG. 24. The pressing station 800 comprises a pressing frame comprising, in an exemplary embodiment, interconnected rods 811 and 814 and interconnected rods 812 and 815. The rods 811 and 812 are interconnected by a lower plate 817 and an upper connecting part 816, forming a pressing frame that receives the lower pressing unit 801 and the upper pressing unit 802.

The lower pressing unit 801 comprises a press drive 840 corresponding to the actuator U10, by means of which three rods 841, 842, 843 are movable to move a lower press form 822 coupled to the rods 841, 842, 843, which corresponds to the form UF. The rods 841, 842, 843 are guided through holes or bores not shown in the plate 817 as well as a plate 821 which prevent or substantially reduce deviation or movement of the press mold 822 in a direction orthogonal to the direction of movement. The rods 841, 842, 843 are embodiments of the movable guide rods U51 and U52 according to FIG. 24. The plate 817 is an embodiment or implementation of the fixed guide element UO.

The upper pressing unit 802 shown in FIG. 26 comprises a press drive 850 corresponding to the actuator O10, which is held by the upper connecting part 816 corresponding to the fixed connector O11 on the actuator side. By means of the press drive 850, a plate 855 corresponding to the movable guide element O12 is guided by guide rods 851, 852 and 853 and an upper press mold 823. The guide rods 851, 852 and 853 correspond to the fixed guide rods OS1 and OS2 in FIG. 24. The press mold 823 corresponds to the mold OF in FIG. 24. For guiding, sleeves H851, H852 and H853 comprising bearings L851 and L853 are also provided as implementation of the recesses of the movable guide plate O12 of FIG. 24, which enclose the guide rods 851, 852 and 853. Plates 821 and 817 are fixed to each other to form the fixed guide element UO (plate 817) and the mold-side fixed connector O14 (plate 821).

Reference sign 870 denotes a movement mechanism by means of which an induction heater 879 comprising an induction loop 872 can be moved to the lower mold 822 in order to heat it by means of the induction loop 872. After heating by means of the induction loop 872, the induction heater 879 is moved back to its initial position. A gob or preform is deposited on the press mold 822 and is press molded (on both sides) by moving the press molds 822 and 823 towards each other to form a headlight lens.

FIG. 27 shows a further press station 800' also as an example of the press station PS according to FIG. 24. In a modification to press station 800, a reinforcement profile P811, P812 is provided, for example in each case, for a rod 811, 812 and for a rod 814, 815, respectively, the reinforcement profile P811, P812 being connected to the rods 811, 812, 814, 815 via clamps SP811, SP812, SP814, SP815. FIG. 28 shows an example of a detailed view of such a clamp SP811, with one half of the clamp welded to the reinforcement profile P811.

For example, the components are matched and/or dimensioned in such a way that the maximum tilting ΔKIPOF or the maximum angle of tilt of the mold OF (corresponding to the angle between the target pressing direction ACHSOF* and the actual pressing direction ACHSOF), as shown in FIG. 29, is not greater than 100° for example is not greater than $5 \cdot 10^{-3}$°. Furthermore, it is provided that the radial offset ΔVEROF, i.e. the offset of the mold OF from its target position in the direction orthogonal to the target pressing direction ACHSOF* is not more than 50 μm, for example not more than 30 μm, or not more than 20 μm, or not more than 10 μm.

For example, the components are matched to each other and/or dimensioned in such a way that the maximum tilting ΔKIPUF or the maximum angle of tilt of the mold UF (corresponding to the angle between the target pressing direction ACHSUF* and the actual pressing direction ACHSUF), as shown in FIG. 30, is not greater than $10^{-2}$° for example is not greater than $5 \cdot 10^{-3}$°. Furthermore, it is provided that the radial offset ΔVERUF, i.e. the offset of the mold UF from its target position in the direction orthogonal to the target pressing direction ACHSUF* is not more than 50 μm, for example not more than 30 μm, or not more than 20 μm, or not more than 10 μm.

Additionally or alternatively, it may be provided that the actuator O10 is decoupled in terms of torsion from the movable guide element O12 with the mold OF. Furthermore, it may be provided that the actuator U10 is also decoupled in terms of torsion from the mold-side movable connector U12 with the mold UF. Such decoupling is shown in FIG. 31 using the example of decoupling the actuator O10 from the mold OF with the movable guide element O12. The decoupling piece, which comprises the ring ENTR and the washers ENTS1 and ENT2, prevents torsion of the actuator O10 from acting on the mold OF.

The method described may also be carried out in conjunction with pressing under vacuum or near-vacuum or at least negative pressure in a chamber, as disclosed by way of example in JP 2003-048728 A. The described method can also be carried out in connection with pressing under vacuum or near vacuum or at least negative pressure by means of a bellows, as explained below by way of example in FIG. 32 with reference to the pressing station PS. In this case, it is envisaged that a bellows BALG is provided or arranged between the movable guide element O12 and the mold-side movable connector U12 for airtight sealing or at least substantially airtight sealing of the molds OF and UF. Suitable methods are disclosed, for example, in the above-mentioned JP 2003-048728 A (incorporated by reference in its entirety) and in WO 2014/131426 A1 (incorporated by reference in its entirety). In a corresponding embodiment, a bellows as at least similarly disclosed in WO 2014/131426 A1 may be provided. It may be provided that the pressing of an optical element such as a headlight lens is performed by means of at least one lower mold UF and at least one upper mold OF, (a) wherein the heated preform or blank or gob 4001 (glass) is placed in or on the lower mold UF, (b) wherein (subsequently or thereafter) the upper mold OF and the lower mold UF (positioned relative to one another and) are moved towards each other without the upper mold OF and the lower mold UF forming a closed overall mold, (for example to such an extent that the distance (for example the vertical distance) between the upper mold and the blank is not less than 4 mm and/or not more than 10 mm).

(c) wherein (subsequently or thereafter) the bellows BALG is closed to create an airtight space in which the upper form OF and the lower form UF are arranged, (d) wherein (subsequently or thereafter) a vacuum or near-vacuum or negative pressure is created in the airtight space, (e) wherein (subsequently or thereafter) the upper mold OF and the lower mold UF are moved (for example vertically) towards each other for (press) molding the optical lens element (for example two-sided or all-sided), wherein for example it is provided that the upper mold OF and the lower mold UF touch each other or form a closed overall mold (the upper mold OF and the lower mold UF can be moved towards each other in that the upper mold OF is moved (vertically) towards the lower mold UF and/or the lower mold UF is moved (vertically) towards the upper mold OF).

(f) with normal pressure being generated subsequently or thereafter in the airtight space, (g) wherein subsequently or thereafter, in a further embodiment, the seal is opened or returned to its initial position, (h) and wherein subsequently or thereafter or during steps (f and/or g) the upper mold OF and the lower mold UF are moved away from each other.

In a further embodiment, a predetermined waiting time is waited before pressing the optical element such as a headlight lens (or between step (d) and step (e)). In a further embodiment, the predetermined waiting time is not more than 3 s (minus the duration of step (d)). In a further embodiment, the predetermined waiting time is not less than is (minus the duration of step (d)).

Figure 7:
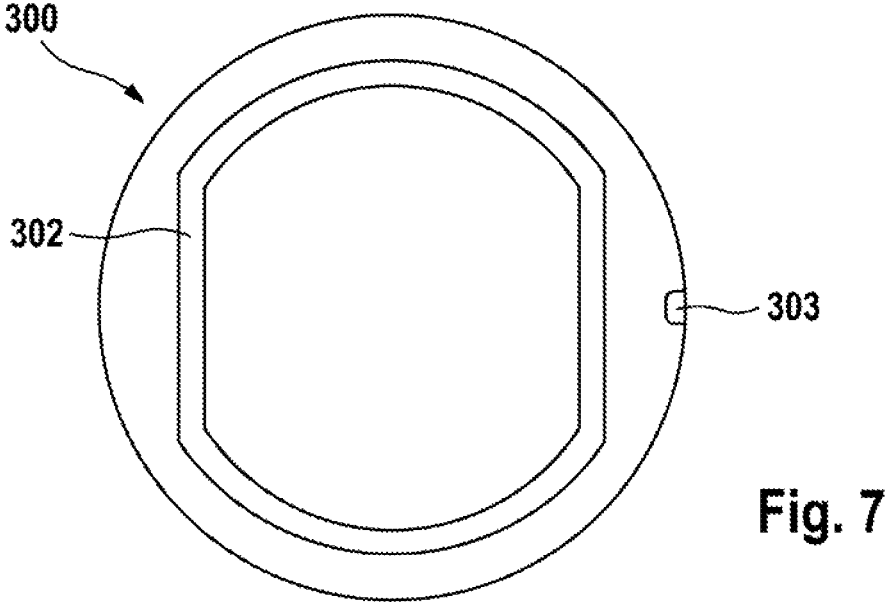
FIG. 7 shows an embodiment of a transport element.
Figure 10:
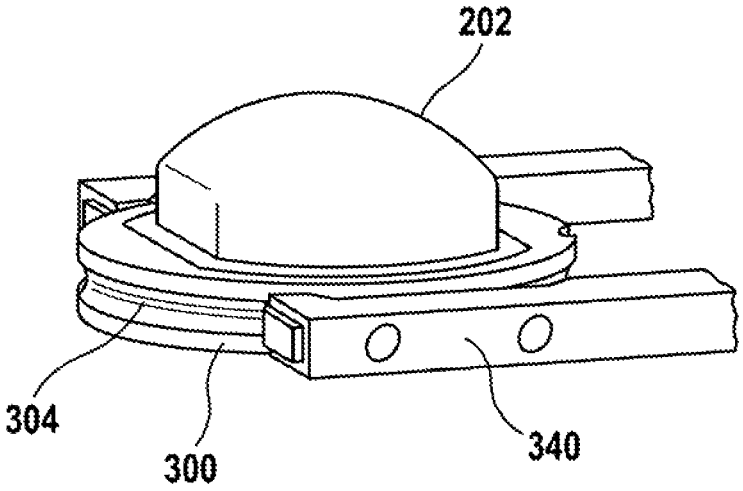
FIG. 10 shows a headlight lens on a transport element according to FIG. 7.

Following pressing, the optical element (such as a headlight lens) is deposited on a transport element 300 shown in FIG. 7 by means of a transfer station 9. The annular transport element 300 shown in FIG. 7 is made of steel, for example ferritic or martensitic steel. The annular transport element 300 has a (corresponding) support surface 302 on its inner side, on which the optical element to be cooled, such as the headlight lens 202, is placed with its edge, so that damage to the optical surfaces, such as the surface 205, is avoided. For example, the (corresponding) support surface 302 and the support surface 261 of the lens edge 206 come into contact, as shown, for example, in FIG. 38. In this regard. FIG. 10 and FIG. 38 show the fixation or alignment of the headlight lens 202 on the transport element 300 by means of a limiting surface 305 and a limiting surface 306, respectively. The limiting surfaces 305 and 306 are for example orthogonal to the (corresponding) support surface 302. It is provided that the limiting surfaces 305, 306 have sufficient clearance with respect to the headlight lens 202 so that the headlight lens 202 can be placed on the transport element 300, for example without the headlight lens 202 tilting or jamming on the transport element 300.

Figure 11:
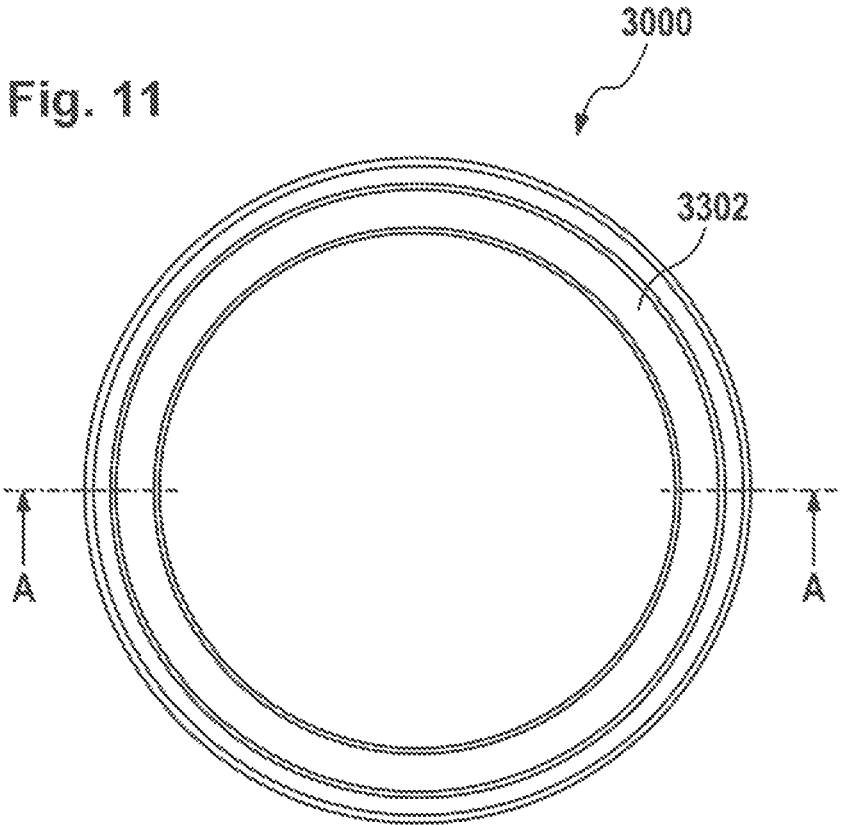
FIG. 11 shows another embodiment of a transport element.
Figure 11A:
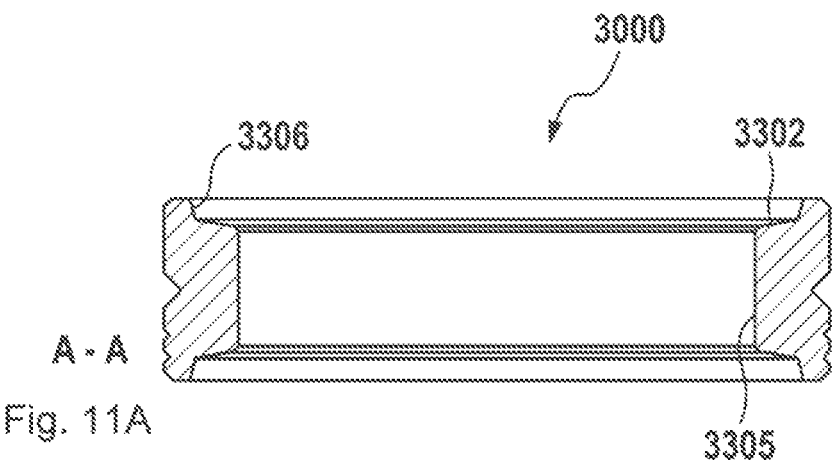
FIG. 11A shows the transport element according to FIG. 11 in a cross-sectional view.

FIG. 11 shows a transport element 3000 designed as an alternative to the transport element 300, which is shown in a cross-sectional view in FIG. 11A. Unless otherwise described, the transport element 3000 is configured similarly or identically or analogously to the transport element 300. The transport element 3000 (also) has limiting surfaces 3305 and 3306. In addition, a support surface 3302 is provided, which, however, in a modification to the support surface 302, is designed to slope downwards in the direction of the center of the transport element 3000. For example, it is provided that the limiting surfaces 3305 and 3306 have sufficient clearance with respect to the headlight lens 202, whereby a particularly precise alignment is achieved by the slope of the support surface 3302. The handling of the transport element 3000 is otherwise carried out in an analogous manner to the following description of the handling of the transport element 300. The angle of the slope or inclination of the support surface 3302 relative to the orthogonal of the axis of rotation or, in the case of intended use, relative to the support plane, is between 5° and 20°, In the shown embodiment 10°.

Figure 8:
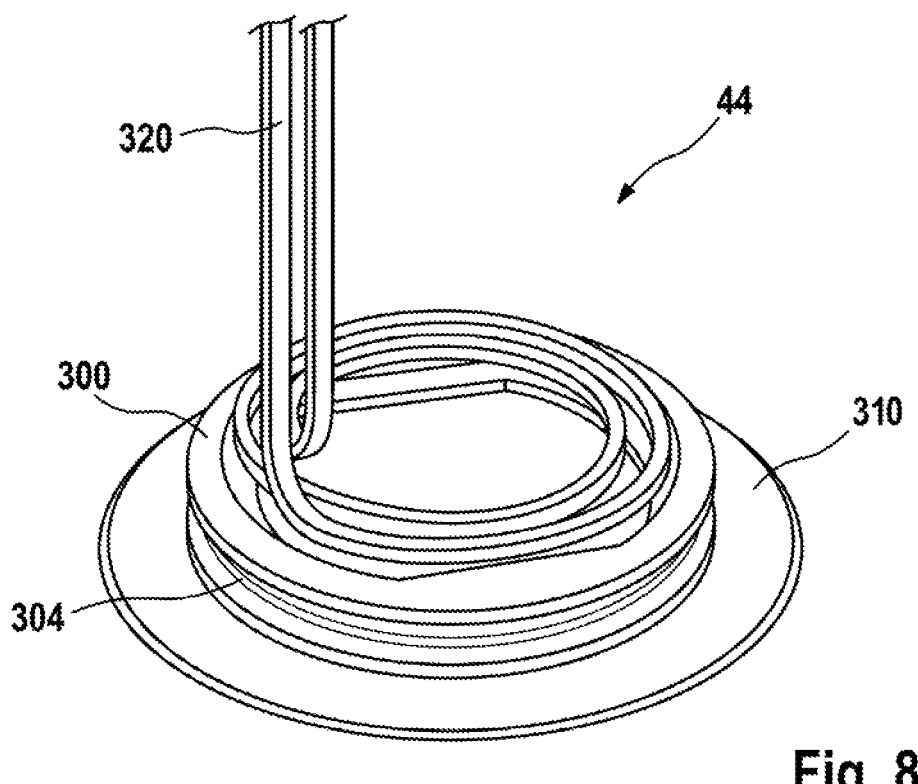
FIG. 8 shows an embodiment of a heating apparatus for a transport element according to FIG. 7.
Figure 9:
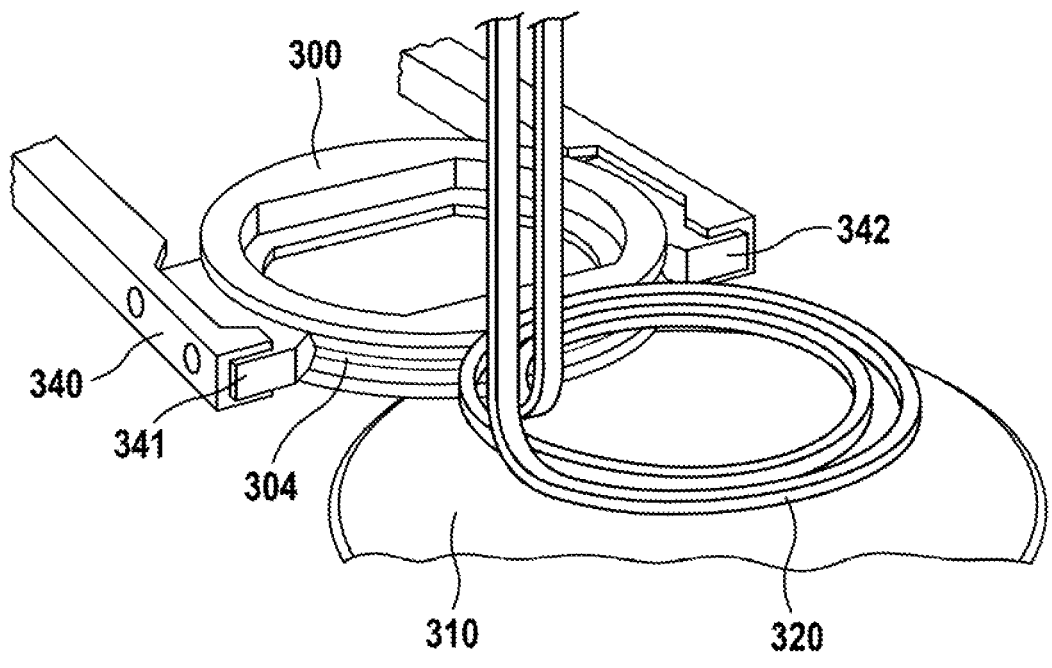
FIG. 9 shows an embodiment of removing a transport element according to FIG. 7 from a heating apparatus according to FIG. 8.

In addition, the transport element 300 is heated before the headlight lens 202 is placed on the transport element 300, so that the temperature of the transport element 300 is approximately +−50K of the temperature of the headlight lens 202 or the edge 206. For example, the heating is performed in a heating station 44 by means of an induction coil 320, as shown in FIG. 8 and FIG. 9. In this process, the transport element 300 is placed on a support 310 and heated by means of the induction coil/induction heater 320 for example at a heating rate of 30-50K/s, for example within less than 10 seconds. Subsequently, the transport element 300 is gripped by a gripper 340 as shown in FIG. 9 and FIG. 10, respectively. For example, the transport element 300 has an indentation 304 on its outer edge, which in an embodiment is designed to be circumferential. For correct alignment, the transport element 300 has a marking groove 303. By means of the gripper 340, the transport element 300 is moved to the press 8 and the headlight lens 202 is transferred from the press 8 to the transport element 300 and deposited on it, as shown in FIG. 10.

In a suitable embodiment, it is provided that the support 310 is configured as a rotatable plate. Thus, the transport element 300 is placed on the support 310, which is designed as a rotatable plate, by hydraulic and automated movement units (e.g. by means of the gripper 340). Subsequently, centering is performed by two centering jaws 341 and 342 of the gripper 340 and in such a way that the transport element undergoes the alignment defined by the marking groove 303, which is or can be detected by means of a position sensor. As soon as this transport element 300 has reached its linear end position, the support 340, which is configured as a rotatable plate, begins to rotate until a position sensor has detected the marking groove 303.

In a process step 126 following process step 125, a surface treatment of the optical element or the headlight lens 202 is carried out.

Figure 12:
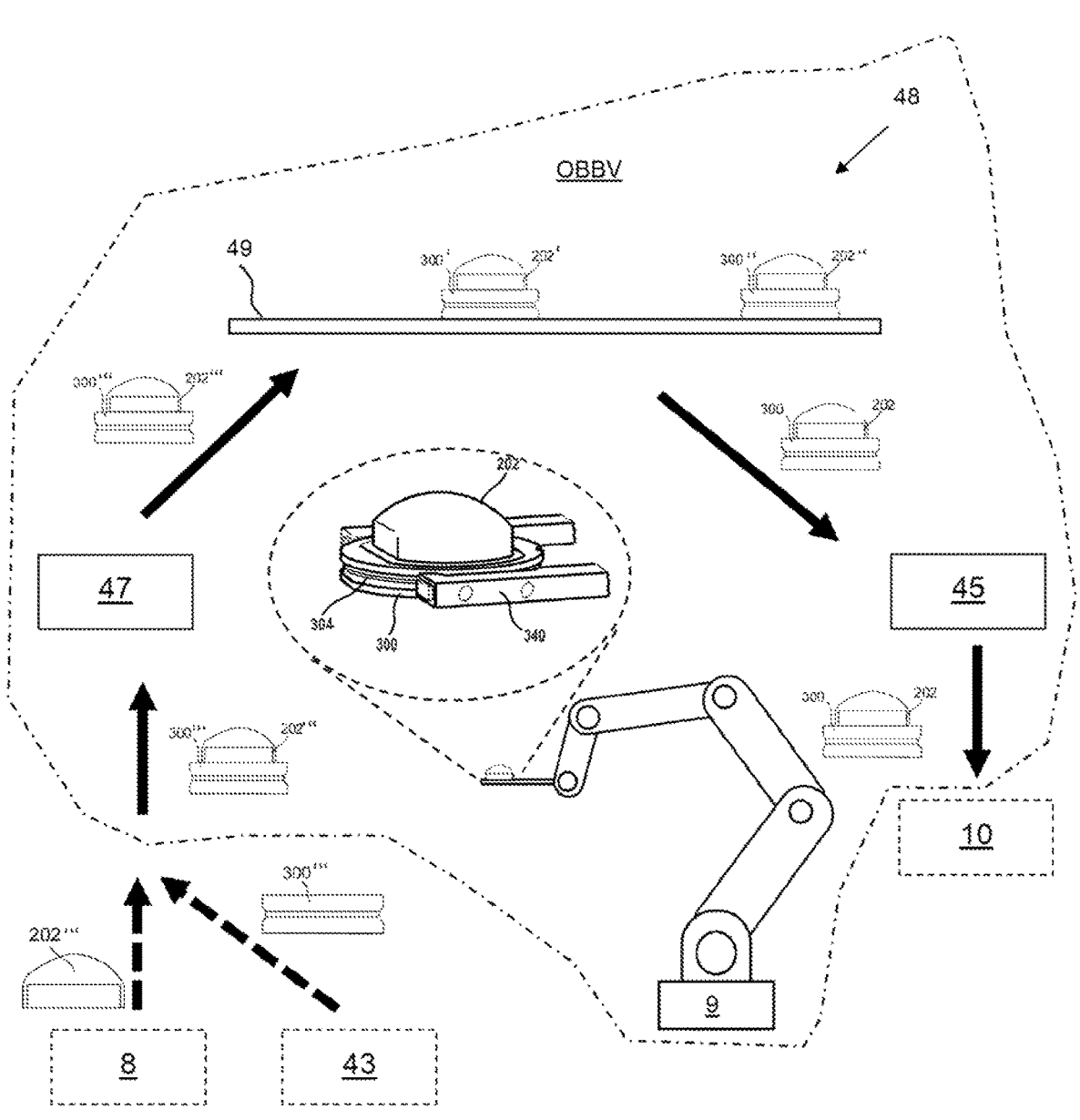
FIG. 12 shows an embodiment of a surface treatment assembly.

For this purpose, the optical element or the headlight lens 202 is first placed on the transport element 300 in a process step 1261. This is symbolized in FIG. 12 by the headlight lens 202''' and the transport element 300'''. FIG. 12 further shows a surface treatment device or surface treatment arrangement OBBV. In this embodiment example, the optical elements or headlight lenses 202, 202', 202'' and 202''' denote optical elements or headlight lenses formed successively by means of the pressing station 8. The respective transport elements are thereby designated with corresponding reference signs 300, 300', 300'' and 300'''. Thus, the pressing of the headlight lens 202 is followed by the pressing of the headlight lens 202'. This in turn is followed by pressing of the headlight lens 202'' and then of the headlight lens 202'''. The corresponding transport elements are designated with reference signs 300, 300', 300'' and 300'''.

Figure 12A:
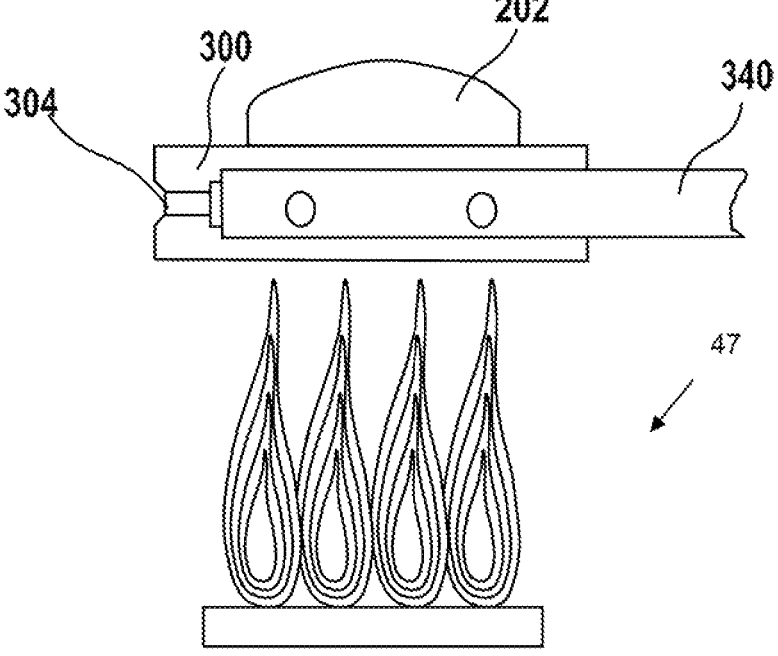
FIG. 12A shows an embodiment of a fire polishing device.

The surface treatment device OBBV comprises a fire polishing device 47 shown in FIG. 12A, a precooling 48 comprising a shelf 49, and a surface treatment station 45. Alternatively or in addition to the shelf 49, a conveyor belt may also be provided. The fire polishing device 47, the precooling 48 and the surface treatment station 45 are interlinked by means of the transfer station 9, which is shown in FIG. 12 in a simplified representation of an industrial robot, wherein the gripper 340 with the centering jaws 341 and 342 is part of the transfer station 9. By means of the transfer station 9, an optical element or a spotlight lens is fed to the fire polishing device 47 on a transport element. The optical element or headlight lens is moved by means of the transfer station 9 from the fire polishing device 47 to the precooling 48. From the precooling 48, the optical element or the headlight lens is transported to the surface treatment station 45 and from there to the cooling path 10.

Figure 12B:
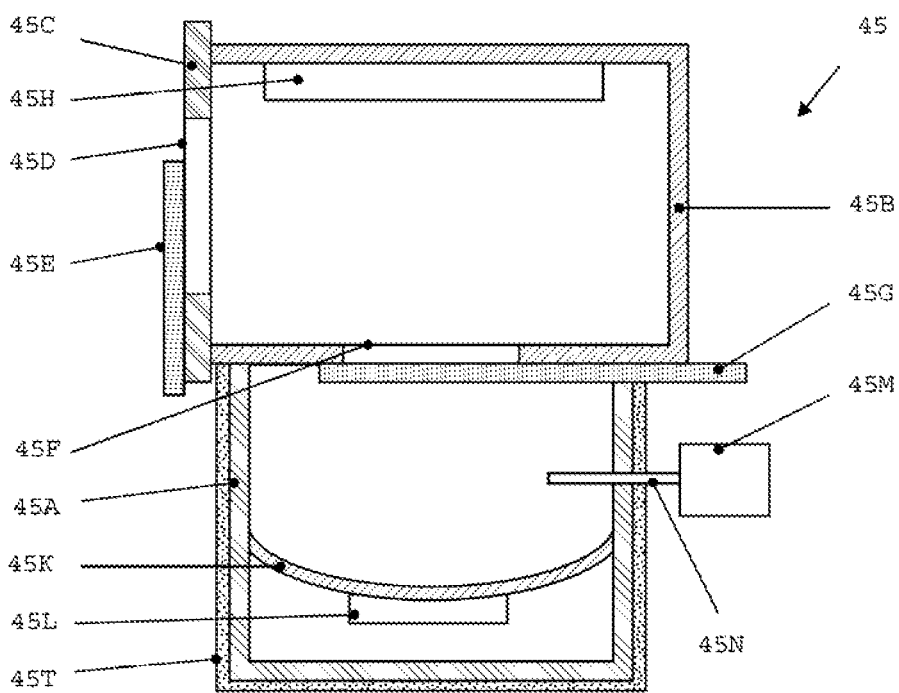
FIG. 12B shows an embodiment of a surface treatment station in a cross-sectional view.
Figure 12C:
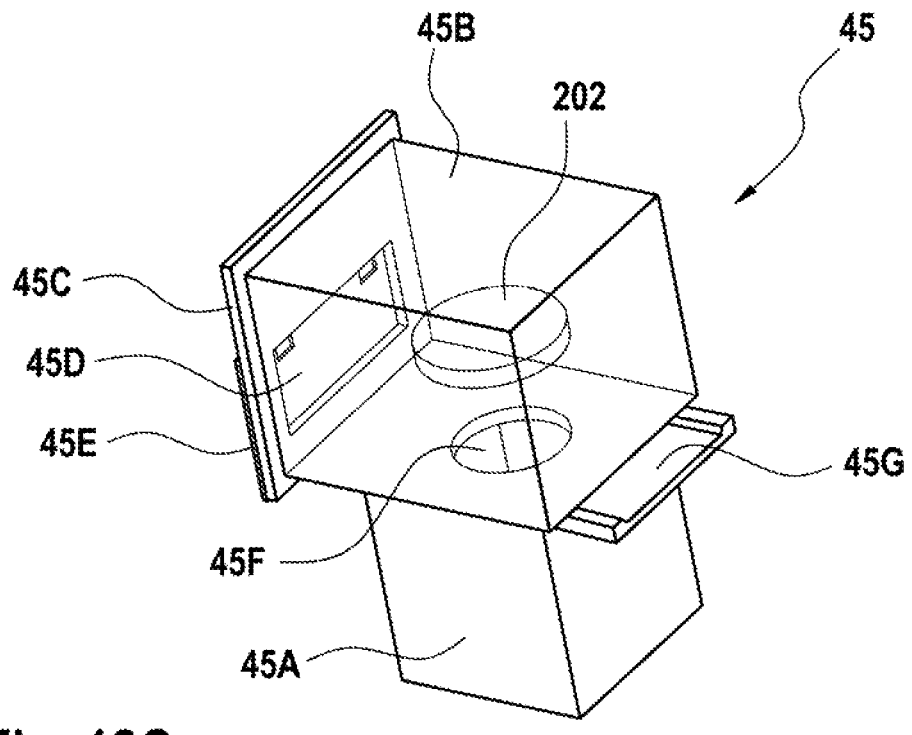
FIG. 12C shows the surface treatment station according to FIG. 12B in a partially transparent perspective view.
Figure 12D:
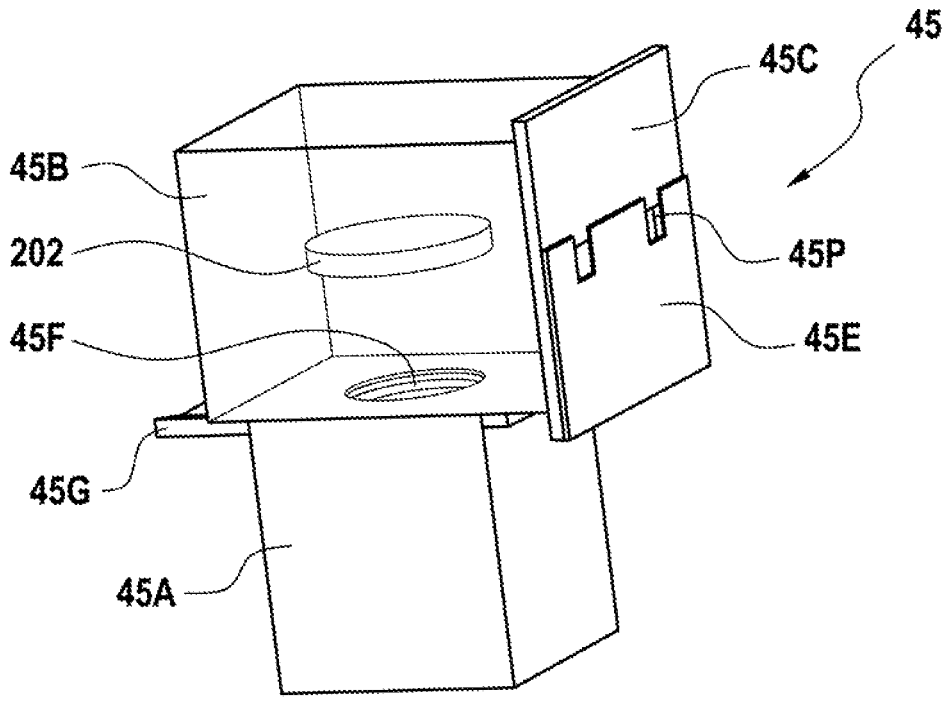
FIG. 12D shows the surface treatment station according to FIG. 12B in a further partially transparent perspective view.
Figure 12E:
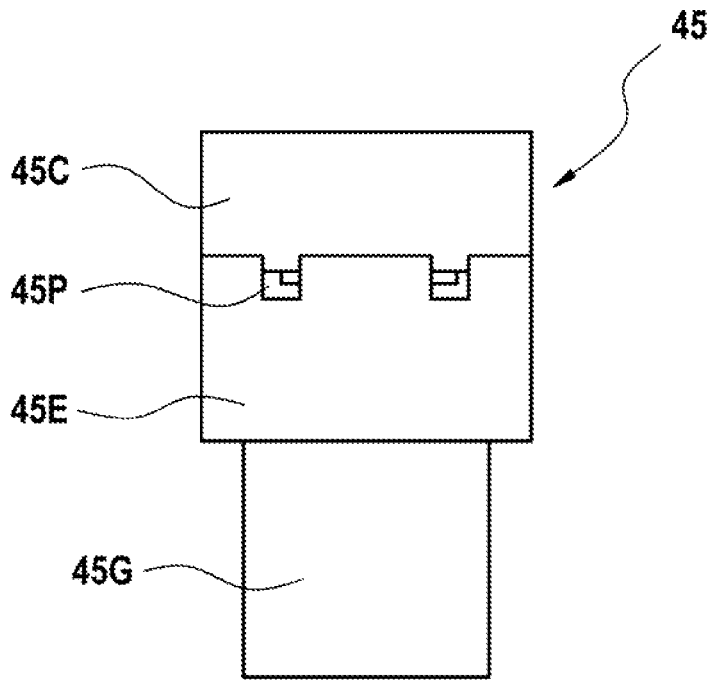
FIG. 12E shows the surface treatment station according to FIG. 12B in a front view.

FIG. 12B shows an embodiment of a surface treatment station 45 in a cross-sectional view. FIG. 12C shows the surface treatment station 45 according to FIG. 12B in a partially transparent perspective view. FIG. 12D shows the surface treatment station 45 according to FIG. 12B in another partially transparent perspective view, and FIG. 12E shows the surface treatment station 45 according to FIG. 12B in a front view.

The surface treatment station 45 according to FIG. 12B includes an evaporation chamber 45A and a treatment chamber 45B. The evaporation chamber 45A and the treatment chamber 45B are connected to each other by means of a passage 45F, which is closable by means of a passage closure 45G. In this way, the evaporation chamber 45A and the treatment chamber 45B can be separated from each other by means of the passage closure 45G. The treatment chamber 45B is closed on one side by means of a closure plate 45C having an opening 45D. The opening 45D is closable by means of an opening shutter 45E, so in the closed state, except for the recesses 45P, the side having the closing plate

45C is closed. The treatment chamber 45B further comprises a treatment chamber heating device 45H for heating the treatment chamber 458.

In an embodiment, the evaporation chamber 45A is thermally insulated by means of a thermal insulation 45T, for example double thermal insulation, the first insulation being implemented by means of fireclay (muffle) and the second insulation by means of micanite plates.

The evaporation chamber 45A includes an evaporation plate 45K heatable by means of an evaporation chamber heating device 45L. The evaporation plate 45K may be configured as a flat plate or may be somewhat concavely curved as shown. The evaporation chamber 45A further comprises a supply means 45N for surface treatment agent, which can be dripped in a metered manner onto the evaporation plate 45K of the evaporation chamber 45A by means of a metering device 45M. For example, the surface treatment agent comprises a solvent and a solid dissolved in the solvent. In an exemplary embodiment, the solid comprises a sulfate, for example ammonium sulfate, or consists (essentially) of ammonium sulfate (see FIG. 33). It is provided, for example, that the proportion of solid in the solvent is not less than 10% by weight and/or not more than 40% by weight. The solvent comprises (essentially) water or consists (essentially) of water.

An embodiment example for a surface treatment is described below with reference to the process steps 1262, 1263, 1264 or the detailed process steps 12641, 12642, 12643, 12644 and 12645. In this process, the plane side of the headlight lens 202'' deposited on the transport element 300'' (in process step 1261) is fire-polished in process step 1262. In this process, for example, the surface of the plane side or the surface of the underside or the surface of the headlight lens 202''' pressed by means of the lower mold is heated to 580° C. In the process step 1263, the transport element 300''' with the headlight lens 202'''—as previously the transport element 300'' with the headlight lens 202'', the transport element 300' with the headlight lens 202' and the transport element 300 with the headlight lens 202—is deposited on a shelf 49 and/or a conveyor belt without the plane side or the surface of the underside or the surface pressed by means of a or the lower mold touching the surface of the shelf 49 and/or the conveyor belt. It is envisaged that the headlight lenses 202, 202', 202'', 202'', are deposited on the shelf 49 or the conveyor belt between (and including) one cycle time and (and including) 5 cycle times, remain there and cool slightly. In order to maintain these values, a corresponding number of cycle times is waited for, the number of cycle times depending on the volume and shape of the headlight lenses 202, 202' 202'', 202'''. For example, a cycle time is not less than 25 s and not more than 35 s. Once the desired cooling is achieved, for example after waiting for the number of predetermined cycle times, the headlight lens 202 and one cycle later the headlight lens 202', yet another cycle later the headlight lens 202'' and yet another cycle later the headlight lens 202''' are subjected to a surface treatment in process step 1264.

In the process step 12641, the headlight lens 202 arranged on the transport element 300 is first introduced into the treatment chamber 45B and held in the treatment chamber 45B, for example, by means of the gripper 340. This is illustrated in FIG. 12C and in FIG. 12D with reference to the principle sketch of the headlight lens 202. Here, neither the gripper 340 nor the transport element 300 are shown for clarity. In one embodiment, it may be provided that the transport element 300 with the headlight lens 202 is deposited in the treatment chamber 45B, i.e. without the gripper 340 holding the transport element. However, in the present example, it is provided that the gripper 340 holds the transport element 300 with the headlight lens 202. In a process step 12642 that follows, the opening 45D is closed by means of the opening closure 45E, leaving only the recesses 45P. The gripper 340 is guided through these recesses 45P.

In the subsequent process step 12643, surface treatment agent is dropped onto the evaporation plate 45K, which has a temperature of 600° C. for example, and evaporated under the Leidenfrost effect so that a treatment atmosphere is created. Thereby, for each optical element or headlight lens, the surface treatment agent is supplied to the evaporation chamber 45A in a predetermined dosage or amount. In this process, the active solid dissolved in the surface treatment agent may comprise sulfate. The structural formula of sulfate is shown in FIG. 33.

In the subsequent process step 12644, the opening shutter 45E is moved so that the opening 45D is released and the treatment atmosphere flows into the treatment chamber 45B. In this manner, the headlight lens 202 is exposed to a metered treatment atmosphere, wherein the temperature of the optical element or headlight lens 202 while exposed to the treatment atmosphere (or while exposed to the treatment atmosphere) is about 560° C. at the top surface of the optical element or headlight lens 202, in exemplary embodiments, and 580-570° C. at the bottom surface of the optical element or headlight lens. Moreover, this is done in a predetermined time, which is for example not shorter than 1 second and not longer than 14 seconds. After the predetermined time has elapsed, in the subsequent process step 12645, the opening shutter 45E is opened to release the opening 45D and the transport element 300 with the headlight lens 202 is removed from the treatment chamber 45B.

Figure 13:
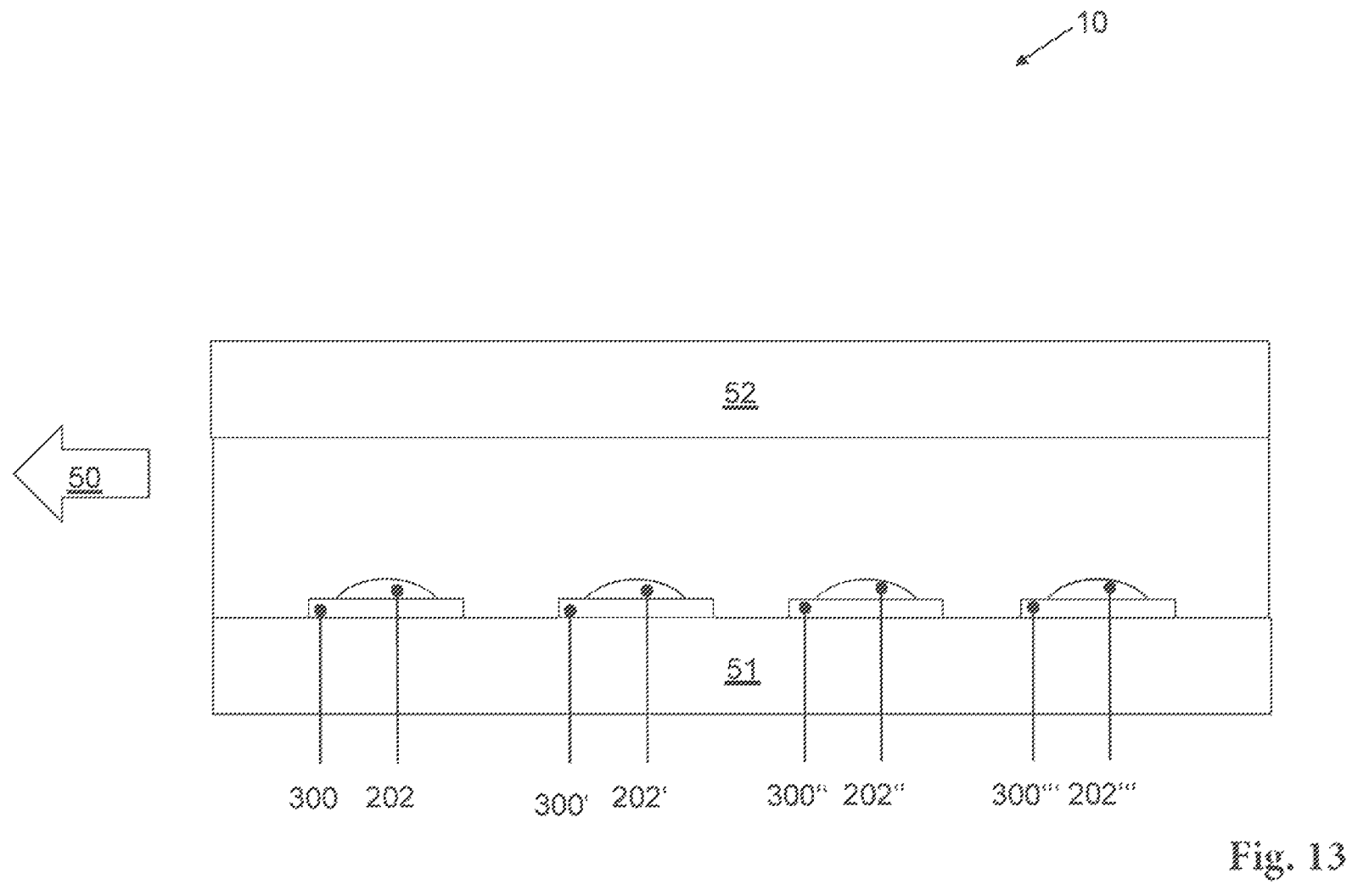

The transport element 300 with the headlight lens 202 is then placed on the cooling path 10 by means of the transfer station 9. The cooling track 10 is used to cool the headlight lens 202 in a process step 127. FIG. 13 shows a detailed schematic diagram of the exemplary cooling path 10 from FIG. 1. The cooling path 10 comprises a tunnel heated or heatable by means of a heating device 52, through which the headlight lenses 202, 202', 202", 202''' are slowly moved on transport elements 300, 300', 300", 300''' in the direction of movement indicated by an arrow 50. Thereby, the heating power decreases in the direction of movement of the transport elements 300, 300', 300", 300''' with the headlight lenses 202, 202', 202", 202'''. For moving the transport elements 300, 300', 300", 300''' with the headlight lenses 202, 202', 202", 202''', for example, a conveyor belt 51, for example made of chain links or implemented as an array of rollers, is provided.

At the end of the cooling path 10, a removal station 11 is provided, which removes the transport element 300 together with the headlight lens 202 from the cooling path 10. In addition, the removal station 11 separates the transport element 300 and the headlight lens 202 and transfers the transport element 300 to a return transport device 43. From the return transport device 43, the transport element 300 is transferred by means of the transfer station 9 to the heating station 44, in which the transport element 300 is placed on the support 310 designed as a rotatable plate and heated by means of the induction heating 320.

Finally, a process step 128 follows by washing off residues of the surface treatment agent on the lens in a washing station 46.

For example, it is intended that the optical element or lens has a transmission of greater than 90% after washing.

It may be envisaged that, with reference to the heating of a flat gob, microlens arrays are pressed which are not used as an array but their individual lenses. Such an array is shown, for example, in FIG. 54, which shows a plurality of individual lenses T50 on an array T 51 created by pressing. In such a case, it is provided to separate the individual lenses T 50 of the array T 51.

The device shown in FIG. 1 further comprises a control assembly 15, for controlling or regulating the device 1 shown in FIG. 1. The device 1A shown in FIG. 1A further comprises a control assembly 15A, for controlling or regulating the device 1A shown in FIG. 1A. The device 18 shown in FIG. 18 further comprises a control assembly 15B, for controlling or regulating the device 1B shown in FIG. 18. The control assemblies 15, 15A and 15B thereby for example ensure for a continuous linkage of the individual process steps.

By means of the proposed process for producing an optical element or headlight lens, a weathering resistance or hydrolytic resistance or type 1 comparable to borosilicate glass is achieved for soda-lime glass, for example. In addition, the costs for the manufacturing process increase only slightly compared to the manufacturing process of optical elements or headlight lenses with a weathering resistance or hydrolytic resistance corresponding to soda-lime glass. In addition, the optical elements or headlight lenses manufactured in this way have particularly precise optical properties. This is attributed for example to the special contour fidelity of the process described while at the same time ensuring sufficient surface quality in the form of a lower surface roughness Ra, e.g. a (surface) roughness of no more than 0.01 μm, for example no more than 0.005 μm without a mechanical polishing step. Roughness in the sense of the present disclosure is particularly defined as Ra, especially according to ISO 4287. The claimed or disclosed process is particularly suitable for extending the range of applications for press molded lenses, for example with respect to objectives, projection displays, microlens arrays and/or, for example, adaptive vehicle headlights. By means of the proposed process for producing an optical element or a headlight lens, it is furthermore possible to improve the surface finish of borosilicate glass so that a weathering resistance or hydrolytic resistance is achieved which is higher than that of untreated borosilicate glass.

As an alternative or modification to the supporting bodies 401 and 501 according to FIG. 3 and FIG. 4, respectively, FIG. 55 shows the support of a blank or preform 4400 made of glass on a molded part, which in the present embodiment is a partial lower mold UFT1. Here, for example, it is envisaged that the underside of the blank 4400 has a radius of curvature which is greater than the radius of curvature of the concave shaped partial lower mold UFT1. Accordingly, the blank or preform 4400 resting on the partial lower mold UFT1 can be heated by means of a hood-type annealing furnace 5000 described in FIG. 14. For details with respect to the hood-type annealing furnace 5000 described in FIG. 55, please refer to the description with respect to FIG. 14.

A cooling block 4501 is provided for cooling the partial lower mold UFT1, which can be cooled by at least one cooling channel 4502 or 4503 and thus cools the partial lower mold UFT1. At least one temperature sensor PTC is provided for controlling the cooling. In an embodiment, several, but at least two, independent cooling channels 4502 and 4503 are provided, which can be set independently of one another or whose flows can be set independently of one another. For example, it is provided that the independent adjustability serves to form a desired temperature distribution in the cooling block 4501 or/and thus in the partial lower mold UFT1. In the embodiment shown in FIG. 55, two independently adjustable cooling channels 4502 and 4503 are shown. However, more cooling channels may be provided that are independently adjustable. The independence of the cooling channels 4502 and 4503 or, if applicable, further cooling channels relates to (or may relate to), among other things, the cooling medium, the coolant quantity, the coolant speed and/or the coolant temperature.

Subsequently, the process step for pressing the preform or blank 4400 into an optical element 4402, which corresponds, for example, to the optical element 202, can take place. In this regard, pressing may be performed as described with reference to FIG. 24, FIG. 25, FIG. 26, FIG. 27 and FIG. 28. In addition or modification, a housing 4510 may be provided in which the heated blank 4400 is transported on the partial lower mold UFT1 for pressing. In this way, undesirable cooling of the preform 4400 between heating in the hood-type annealing furnace 5000 and the pressing unit or press 8 is reduced or avoided.

As an alternative or modification to the pressing provided with reference to FIG. 24, FIG. 25, FIG. 26, FIG. 27 or FIG. 28, it can be provided that the lower mold UF or 822 is (at least) in two parts. In this case, the lower mold UF1 corresponding to the lower mold UF or 822 may comprise the partial lower mold UFT1 and a further partial lower mold UFT2 surrounding the partial lower mold UFT1, as shown in FIG. 56 and in FIG. 57. The press shown in FIG. 57 also comprises an upper mold OF1, which may correspond to the upper mold OF shown in FIG. 24 or to the upper mold 823 shown in FIG. 25.

In a modification or supplement to the method described with reference to FIG. 24, FIG. 25, FIG. 26, FIG. 27 or FIG. 28, it can be provided that an intermediate molded part 4401 is first pressed from the preform or blank 4400 by the pressing process instead of an optical element, as shown in FIG. 58. In this process, the upper mold OF1 and the lower mold UF1 are moved toward each other, but without the upper mold OF1 and the lower mold UF1 touching each other or without the upper mold OF1 and the lower mold UFT2 touching each other. Thus, it can be seen in FIG. 58 that a gap SPLT is shown between the upper mold OF1 and the partial lower mold UFT2, which is not undercut. For example, it is provided that the gap SPLT is at least 0.5 mm. In a further embodiment, it may be provided that the gap SPLT is at least 2 mm. In further embodiment, it may be provided that the gap SPLT is at least 3 mm. However, it is particularly provided that the gap SPLT is not greater than 10 mm.

Following the process described with reference to FIG. 58, the upper mold OF1 and the lower mold UF1 are moved apart as described in FIG. 59. During this process, the intermediate molded part 4401 is removed from the lower mold by a vacuum in a channel of the upper mold OF1, which is not shown. Subsequently, that one is heated on the side facing the lower mold UF1 by means of heating devices 4470. This heating can be carried out, for example, by a gas flame or by means of heating coils.

Following the heating of the intermediate molded part 4401 by means of the heating device 4470, the upper mold OF1 and the lower mold UF1 are again moved towards each other, as shown in FIG. 60. Here, in contrast to the process step as described in FIG. 58, the mold formed by the lower mold UF1 and the upper mold OF1 is closed. For this purpose, the upper mold OF1 and the partial lower mold UFT2 are moved towards each other in such a way that they touch and thus form a closed mold. By post-pressing by means of the partial lower mold UFT1, for example the heated side or surface of the intermediate molded part 4401 is formed into the optically effective surface of the optical element 4402. The pressing step according to FIG. 60 presses the intermediate molded part 4401 into the optical element 4402.

The pressing step described with reference to FIG. 60 is followed by a process step as described in FIG. 61 in which the lower mold UF1 and the upper mold OF1 are moved apart. Subsequently, it may be provided that the optical element 4402 is removed from the mold or the lower mold UF1 or the partial lower mold UFT1 and is cooled analogously to the process described with reference to FIG. 7, FIG. 8, FIG. 9, FIG. 10, FIG. 11, FIG. 11A and/or FIG. 13. However, it may also be provided that the optical element 4402 is modified in a manner analogous to the method described with reference to FIG. 7, FIG. 8, FIG. 9, FIG. 10, FIG. 11, FIG. 11A and/or FIG. 13, as described in FIG. 62. In this case, the optical element 4402 is not removed from the partial lower mold UFT1 and is also not deposited on a transport element such as the transport element 300, but is removed from the press 8 together with the partial lower mold UFT1. Subsequently, the optical element 4402 on the partial lower mold UFT1 passes through a cooling path corresponding to the cooling path 10, in which the optical component 4402 is cooled according to a cooling regime.

It may also be provided that the optical element 4402 is further exposed to surface treatment means as described with reference to FIG. 12. Thereby, in modification to the surface treatment station 45 according to FIG. 12, it can be provided that only the surface of the optical element 4402 facing away from the partial lower mold UFT1 is exposed to the treatment atmosphere. The procedure is similar to that described in FIG. 12.

The processes described with reference to FIG. 65, FIG. 56, FIG. 57, FIG. 58, FIG. 59, FIG. 60, FIG. 61 and/or FIG. 62 can be integrated individually or in groups or as a plurality into the process sequence described with reference to FIG. 1 to FIG. 33. For example, the heating process ascribed with reference to FIG. 5 using a heat sink 4450 can be replaced or modified. In addition, the procedure for heating a preform described with reference to FIG. 14 may be followed by the procedure described in FIG. 56. It may also be provided that pressing the optical element 202 as described with reference to FIG. 24, FIG. 25, FIG. 26, FIG. 27, FIG. 28, FIG. 29. FIG. 30, FIG. 31 and/or FIG. 32 is replaced by pressing an intermediate molded part 4401, i.e., a two-stage pressing as described with reference to FIG. 58, FIG. 59 and FIG. 60. In this case, among other things, in a modification of the method described with reference to FIG. 25, the heating device 872 can be used or come into use instead of the heating device 4470.

It may be provided that the heating device 872 has a dual function. This is done, for example, when the process is implemented without transporting a partial lower mold UFT1, but when the partial lower mold remains in the press. For example, the heating device 872 serves to heat the partial lower mold UFT1 (and, if applicable, also the partial lower mold UFT2) before receiving a preform 4400. When implementing the process according to FIG. 57, FIG. 58, FIG. 59 and FIG. 60, i.e., pressing an intermediate molded part 4401, the heating device 872 serves, for example, or can serve, to implement the heating device 4470 (e.g., as an induction heater or radiant heater).

The described method, for example the method described with reference to the modification or partial modification according to FIG. 55, FIG. 56, FIG. 57, FIG. 58, FIG. 59, FIG. 60, FIG. 61 and/or FIG. 62, is particularly suitable for pressing biconvex lenses. For example, the method is particularly suitably or used for pressing biconvex lenses as disclosed in FIG. 63, as an example of an embodiment, or as disclosed in German patent application DE 11 2006 001 878.7.

The lens 4402 or the lens shown in FIG. 63 has a first convexly curved optically effective surface and a second convexly curved optically effective surface. It may be provided that the lens includes an integrally formed rim (having a volume). It may further be provided that a step is provided between the integrally formed lens edge and the second optically effective surface. The step may be configured to taper toward the second optically effective convexly curved surface. In this regard, the taper may be at a typical demolding angle. For example, a suitable angle is greater than 3 degrees. It may be provided that the height of the step is subject to tolerance to accommodate variations in gob volume. However, it may also be provided that the thickness of the formed lens edge. i.e. Its extension in orientation of the optical axis of the lens, is subject to tolerances. This is particularly the case if the mold OF1 is designed in two parts, for example similar to the division of the mold UF1 into a partial mold UFT1 and UFT2.

It may be envisaged that the lens is not rotationally symmetrical but has, for example, a narrow side as shown, for example, in FIG. 33 and FIG. 35. For example, the lens has a large diameter and a small diameter extending from narrow side to narrow side. It may be provided, as shown in FIG. 64, that on at least one narrow side there is an additional edge region ZRB formed on, which absorbs volume variations in the gob. This means that the above-mentioned tolerances can be dispensed with if, for example, the additional edge region ZRB completely absorbs the volume fluctuations.

Figure 1B:
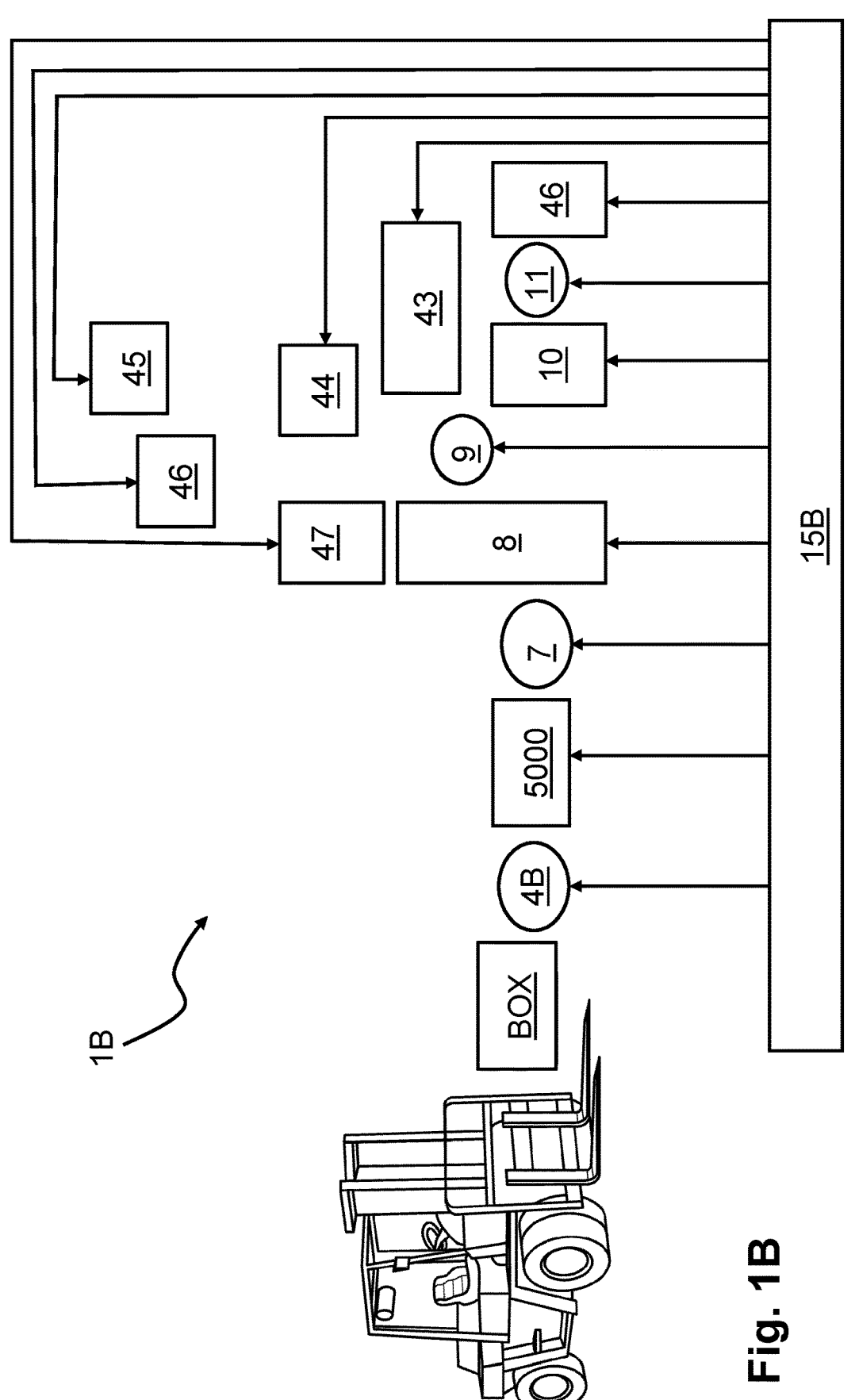
FIG. 1B shows a schematic view of a device for producing motor vehicle headlight lenses or lens-like free-forms for motor vehicle headlights or optical elements made of glass.

The elements in FIG. 1, FIG. 1A, FIG. 1B. FIG. 5, FIG. 6, FIG. 13, FIG. 24, FIG. 27, FIG. 28, FIG. 29, FIG. 30, FIG. 32, FIG. 33, FIG. 34. FIG. 38, FIG. 39, FIG. 42, FIG. 43, FIG. 44, FIG. 45, FIG. 46, FIG. 47, FIG. 52, FIG. 53. FIG. 54, FIG. 55. FIG. 56, FIG. 57, FIG. 58, FIG. 59, FIG. 60, FIG. 61, FIG. 62, FIG. 64 and FIG. 63 are drawn with simplicity and clarity in mind and not necessarily to scale. For example, the scales of some elements are exaggerated relative to other elements to enhance understanding of embodiments of the present disclosure.

LIST OF REFERENCE SIGNS

1, 1A, 1B device
2 melting unit
2B adjustable outlet
3 preform device
4, 4A, 46 transfer station
5 cooling apparatus
6 heating apparatus
7 transfer station
8 press
9 transfer station
10 cooling path
11 removal station
15, 15A, 15B control assembly
20 motor vehicle
41 transport device
42 transport device
43 return transport device
44 heating station
45 surface treatment station

45A evaporation chamber
456B treatment chamber
45C closing plate
45D opening
45E opening closure
45F passage
45G passage closure
45H treatment chamber heater
45K evaporation plate
45L evaporation chamber heater
45M dosing device for surface treatment agent
45N feeder for surface treatment agent
45P recess
45T thermal insulation
46 washing station
47 fire polishing device
48 pre-cooling
49 rack and/or conveyor belt
OBBV surface treatment device
50 arrow
51 conveyor belt
52 heating device
120 process step
121 process step
122, 122' process step
123, 123' process step
124, 124' process step
125 process step
126 process step
127 process step
128 process step
1261, 1262, 1263, 1264,
12641, 12642, 12643,
12644, 12646, process step
130 preform
131 temperature gradient
132 temperature gradient
201, 201', 201" motor vehicle headlight
202 headlight lens
203 lens body
204 substantially convex (especially optically effective) surface
205 substantially flat (especially optically effective) surface
206 lens edge
210 light source
212 reflector
214 shield
215 edge
220 bright dark boundary
230 optical axis from 202
260 step from 206
261 surface of the lens edge 206
300, 3000 transport element
302, 3302 support surface
303 marking groove
304 indentation
305, 3305 limiting area
306, 3306 limitating area
310 support
320 induction coil/induction heating
340 gripper
341, 342 centering jaws
400, 500 support devices
401, 501 carrier body
402, 502 support surface
403, 503 base space 411, 511 flow channels
412, 512 flow channels
421, 521 metallic metal filler material
422, 522 metal filler material
800 pressing station
801 pressing unit
802 pressing unit
811, 812, 814, 815 rod
816 upper connecting part
817 lower plate
821 plate
822 lower press mold
823 upper press mold
840 press drive
841, 842, 843 rods
850 press drive
851, 852, 853 guide rod
H851, H852, H853 sleeves
L851, L853 bearing
855 plate
870 movement mechanism
872 induction loop
879 induction heater
4001 gob
4002 nut
5000 hood-type annealing furnace
5001 heating coil
5002, 5202, 5302 protective cap
5112, 5212, 5312 cylindrical region
5132 rounded region
5122, 5222, 5322 covering region
5242, 5342 conical region
5232, 5332 curvature
DA diameter from 204
DB diameter from 205
DBq orthogonal diameter to DB
DL diameter from 202
DLq orthogonal diameter to DL
F2 surround sensor system
F3 controller
F4 illumination device
F5 objective
F20, F201 vehicle headlight
F41 light source assembly
F42 attachment optics
F421 light exit area of F4
L4 light
L41 light irradiated in F42
L5 illumination pattern
V1 attachment optics array
V2 attachment optics
V11, V12, V13, V14, V15 attachment optics
V20 base part
V21 surface from V20
V111, V121, V131,
V141, V151 light entrance area
V115, V125, V135,
V145, V155 side areas
V2011, V2012, V2013.
V2014, V2015 lenses
V11
VL light source assembly
M2 surround sensor system
M3 controller
M4 light emitting unit
ML4 light
M5 concave lens ML5 further shaped light
M6 projection optics
ML6 resulting light distribution
G20, M20 headlights
G2 surround sensor system
G3 controller
G4 controller
G5 illumination device
GL5 light generated by GL5
G6 system of micromirrors
GL6 illumination pattern
G7 projection optics
GL7 light
Pmax, Pmin luminous power
PS pressing station
PO upper pressing unit
PU lower pressing unit
OF upper mold
UF lower mold
U10, O10 actuator
U11, U12 movable connector
US1, U52 movable guide rods
UO fixed guide element
O11 actuator side connector
O12 movable guide element
O14 mold side connector
O51, O52 fixed guide rods
P811, P812 reinforcement profile
SP811, SP812,
SP814, SP815 clamps
ΔKIPOF, ΔKIPUF maximum tilting
ACHSOF, ACHSUF actual pressing direction
ACHSOF*, ACHSUF* target pressing direction
ΔVEROF, ΔVERUF
ENTR ring
ENTS1, ENTS2 washer
BALG bellows
T1 Preform
T2, T3 clamping devices
T4 clamping assembly
ZRB additional edge area

We claim:

1. A method for producing a headlight lens, the method comprising:

providing a transport element with a support surface;

providing a treatment chamber;

providing an evaporation chamber with a passage between the treatment chamber and the evaporation chamber;

providing a blank of glass;

providing a surface treatment agent comprising a solvent as well as an active solid dissolved in the solvent, wherein the active solid comprises sulfate;

press molding the blank to form a headlight lens comprising a light inlet surface within an intended light path of the headlight lens, a light outlet surface within the intended light path of the headlight lens, and a support surface outside the intended light path of the headlight lens;

depositing the headlight lens on the transport element such that the support surface of the transport element is in contact with the support surface of the headlight lens;

evaporating an amount of the surface treatment agent in the evaporation chamber to generate a treatment atmosphere, wherein the passage is closed;

placing the transport element together with the headlight lens in the treatment chamber;

afterwards opening the passage between the treatment chamber and the evaporation chamber such that treatment atmosphere flows into the treatment chamber to obtain a surface treated headlight lens;

afterwards withdrawing the headlight lens from the treatment chamber; and passing the transport element together with the headlight lens through a cooling path, without the light inlet surface of the headlight lens being touched and without the light outlet surface of the headlight lens being touched.

2. The method of claim 1, wherein the active solid comprises ammonium sulfate.

3. The method of claim 1, wherein the proportion of active solid in the solvent is not less than 10% by weight.

4. The method of claim 3, wherein the proportion of active solid in the solvent is not more than 40% by weight.

5. The method of claim 3, wherein the solvent comprises water.

6. The method of claim 5, wherein the headlight lens is exposed to the treatment atmosphere for no longer than 14 seconds.

7. The method of claim 6, wherein the surface treatment agent is evaporated in a predetermined dosage in the evaporation chamber for generating the treatment atmosphere.

8. The method of claim 7, wherein the headlight lens is exposed to the treatment atmosphere for not less than 1 second.

9. The method of claim 5, wherein the glass is a soda-lime silicate glass.

10. The method of claim 9, wherein the active solid essentially consists of ammonium sulfate.

11. A method for producing an optical element, the method comprising:

providing a treatment chamber;

providing an evaporation chamber with a passage between the treatment chamber and the evaporation chamber;

providing a blank of glass;

providing a surface treatment agent comprising a solvent as well as an active solid dissolved in the solvent;

press molding the blank to form an optical element;

evaporating an amount of the surface treatment agent in the evaporation chamber to generate a treatment atmosphere;

placing the optical element in the treatment chamber;

afterwards opening the passage between the treatment chamber and the evaporation chamber such that the treatment atmosphere flows into the treatment chamber to obtain a surface treated optical element;

withdrawing the surface treated optical element from the treatment chamber; and cooling of the surface treated optical element in a cooling path for cooling with an addition of heat.

12. The method of claim 11, wherein the treatment chamber is positioned on top of the evaporation chamber.

13. The method of claim 12, wherein the active solid comprises ammonium sulfate.

14. The method of claim 11, wherein the active solid comprises sulfate.

15. The method of claim 11, wherein the active solid comprises ammonium sulfate.

16. The method of claim 15, wherein the solvent comprises water, wherein the proportion of active solid in the solvent is not less than 10% by weight, and wherein the proportion of active solid in the solvent is not more than 40% by weight.

17. The method of claim 16, wherein the optical element is exposed to the treatment atmosphere for no longer than 14 seconds.

18. The method of claim 11, wherein the optical element is exposed to the treatment atmosphere for no longer than 14 seconds.

19. The method of claim 18, wherein the optical element is exposed to the treatment atmosphere for not less than 1 second.

20. The method of claim 18, wherein the glass is a soda-lime silicate glass.

21. A method for producing an optical element, the method comprising:

providing a treatment chamber;

providing an evaporation chamber with a passage between the treatment chamber and the evaporation chamber;

providing a blank of non-borosilicate glass is;

providing a surface treatment agent comprising a solvent as well as an active solid dissolved in the solvent, wherein the active solid comprises sulfate;

press molding the blank to form an optical element;

evaporating an amount of the surface treatment agent in the evaporation chamber to generate a treatment atmosphere;

placing the optical element in the treatment chamber;

afterwards opening the passage between the treatment chamber and the evaporation chamber such that the treatment atmosphere flows into the treatment chamber to obtain a surface treated optical element;

withdrawing the surface treated optical element from the treatment chamber; and cooling of the surface treated optical element in a cooling path for cooling with an addition of heat.

22. The method of claim 21, wherein the active solid comprises ammonium sulfate.

23. The method of claim 22, wherein the proportion of ammonium sulfate in the solvent is not less than 10% by weight and not more than 40% by weight.

24. The method of claim 22, wherein the optical element is exposed to the treatment atmosphere for no longer than 14 seconds.

* * * * *